(12) United States Patent
Hirasawa

(10) Patent No.: US 6,980,233 B1
(45) Date of Patent: Dec. 27, 2005

(54) IMAGE PICKUP CONTROL APPARATUS, IMAGE PICKUP CONTROL METHOD, IMAGE PICKUP CONTROL SYSTEM, AND STORAGE MEDIUM

(75) Inventor: Masahide Hirasawa, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/348,500

(22) Filed: Jul. 7, 1999

(30) Foreign Application Priority Data

Jul. 10, 1998 (JP) .................................. 10-210261

(51) Int. Cl.[7] .......................................... H04N 5/225
(52) U.S. Cl. .............................. 348/207.1; 348/207.11
(58) Field of Search ..................... 348/207.99, 207.1, 348/207.11, 552, 211.99, 211.1, 211.4, 211.6, 348/211.8, 211.9, 211.14, 239; 396/242, 396/243, 429

(56) References Cited

U.S. PATENT DOCUMENTS

| | | | | |
|---|---|---|---|---|
| 5,184,169 A | * | 2/1993 | Nishitani ..................... | 396/211 |
| 5,264,921 A | | 11/1993 | Jinnai | |
| 5,402,170 A | * | 3/1995 | Parulski et al. ........... | 348/211.6 |
| 5,479,206 A | * | 12/1995 | Ueno et al. ............... | 348/211.5 |
| 5,543,885 A | * | 8/1996 | Yamano et al. ............. | 396/300 |
| 5,576,800 A | | 11/1996 | Takagi et al. | |
| 5,619,265 A | | 4/1997 | Suzuki et al. | |
| 5,734,425 A | * | 3/1998 | Takizawa et al. ......... | 348/231.9 |
| 5,887,193 A | | 3/1999 | Takahashi et al. | |
| 5,903,700 A | | 5/1999 | Fukushima | |
| 5,999,213 A | | 12/1999 | Tsushima et al. | |
| 6,005,613 A | * | 12/1999 | Endsley et al. .......... | 348/231.6 |
| 6,046,769 A | * | 4/2000 | Ikeda et al. .............. | 348/222.1 |
| 6,285,398 B1 | * | 9/2001 | Shinsky et al. .......... | 348/223.1 |
| 6,400,392 B1 | * | 6/2002 | Yamaguchi et al. ..... | 348/14.12 |
| 6,545,775 B1 | * | 4/2003 | Watanabe et al. ........... | 358/442 |
| 6,573,931 B1 | * | 6/2003 | Horii et al. ............ | 348/211.14 |
| 6,628,325 B1 | * | 9/2003 | Steinberg et al. ........ | 348/211.1 |
| 6,630,949 B1 | * | 10/2003 | Yamagishi ............. | 348/207.99 |
| 2001/0001563 A1 | * | 5/2001 | Tomaszewski .............. | 348/552 |
| 2003/0158979 A1 | | 8/2003 | Tateyama et al. ............. | 710/33 |

FOREIGN PATENT DOCUMENTS

| | | |
|---|---|---|
| EP | 0 674 435 | 9/1995 |
| EP | 0 754 994 | 1/1997 |
| EP | 0 786 715 | 7/1997 |
| EP | 0 812 092 | 10/1997 |
| EP | 0 822 510 | 2/1998 |
| EP | 0 859 326 | 8/1998 |
| JP | 4-4679 | 1/1992 |
| JP | 7-44291 | 2/1995 |
| JP | 7-135627 | 5/1995 |

(Continued)

OTHER PUBLICATIONS

Slater, M. "Universal Serial Bus to Simplify PC I/O: New Interface to Service Keyboards, Mice, Telecom, and More", Microprocessor Report: The Insiders' Guide to Microprocessor Hardware, vol. 9, No. 5, Apr. 17, 1996, pp. 5-9.*

(Continued)

*Primary Examiner*—David L. Ometz
*Assistant Examiner*—Yogesh Aggarwal
(74) *Attorney, Agent, or Firm*—Fitzpatrick, Cella, Harper & Scinto

(57) ABSTRACT

In an image pickup control apparatus capable of remotely and reliably controlling an image pickup apparatus from another apparatus, control data for controlling the image pickup apparatus is stored in advance and is transmitted to the image pickup apparatus when the image pickup apparatus is connected via data communications interface units.

9 Claims, 30 Drawing Sheets

FOREIGN PATENT DOCUMENTS

| | | |
|---|---|---|
| JP | 8-335102 | 12/1996 |
| JP | 10-285246 | 10/1998 |

OTHER PUBLICATIONS

European Search Report dated Oct. 24, 2002 (Ref. No. 2668430).

Partial translation of JP-A-4-4679.

IEEE 1394—das Tor zu Multimedia, Sep., 1997, pp. 54 and 56.

IEEE 1394—The Cable Connection to Complete The Digital Revolution, Oct. 18, 1999 [Nov. 10, 1996?], pp. 1 to 8.

European Search Report dated Jun. 13, 2002 (Ref. No. 2668430).

* cited by examiner

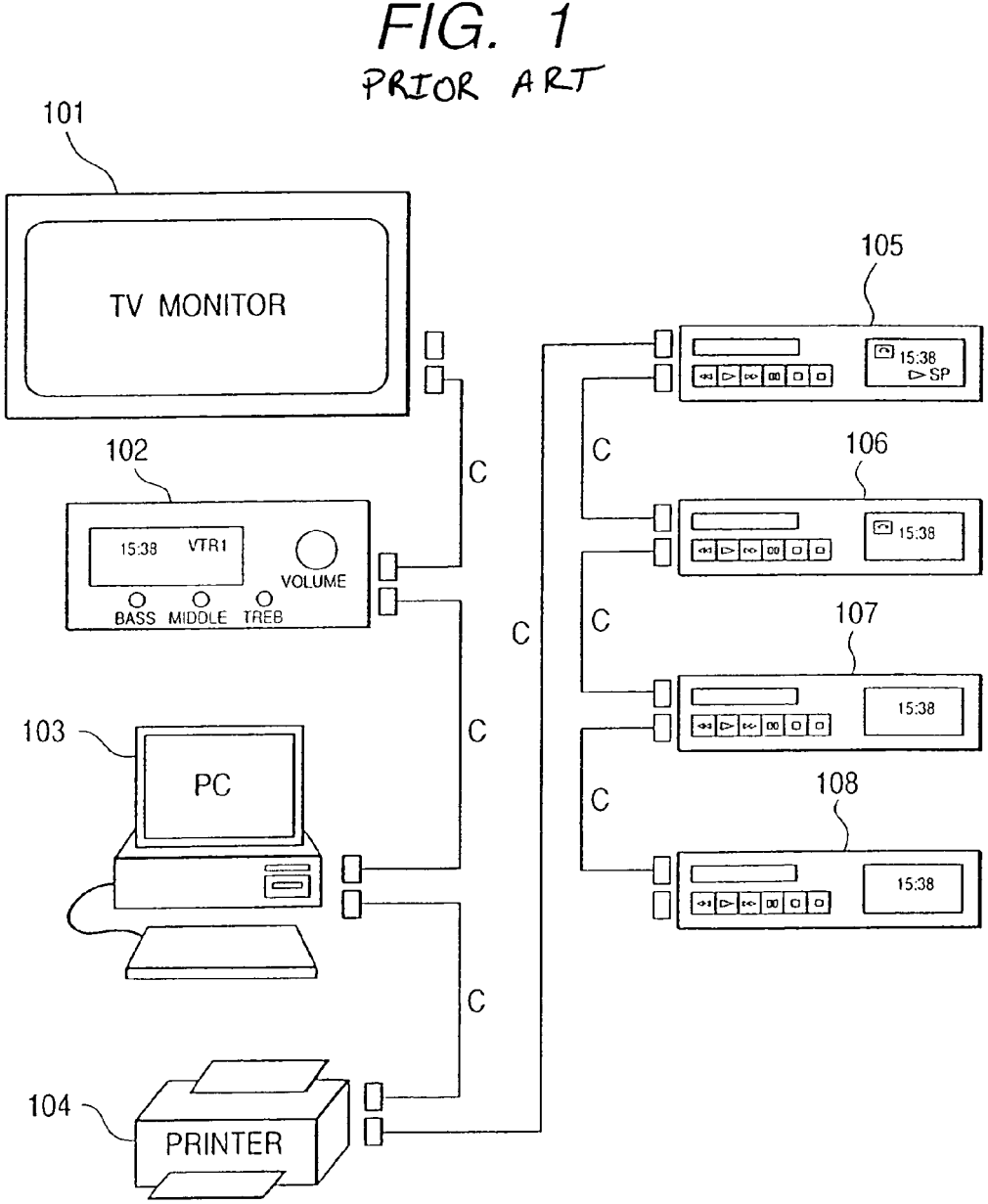

ELECTRIC POWER
SUPPLY CONDUCTOR
(8-40V MAX. DC CURRENT 1.5A)

TWO TWISTED
PAIR SIGNAL
CONDUCTORS

SIGNAL
CONDUCTOR
SHIELD (SIGNAL OF EXCLUSIVE OR BETWEEN
Data AND Strobe)

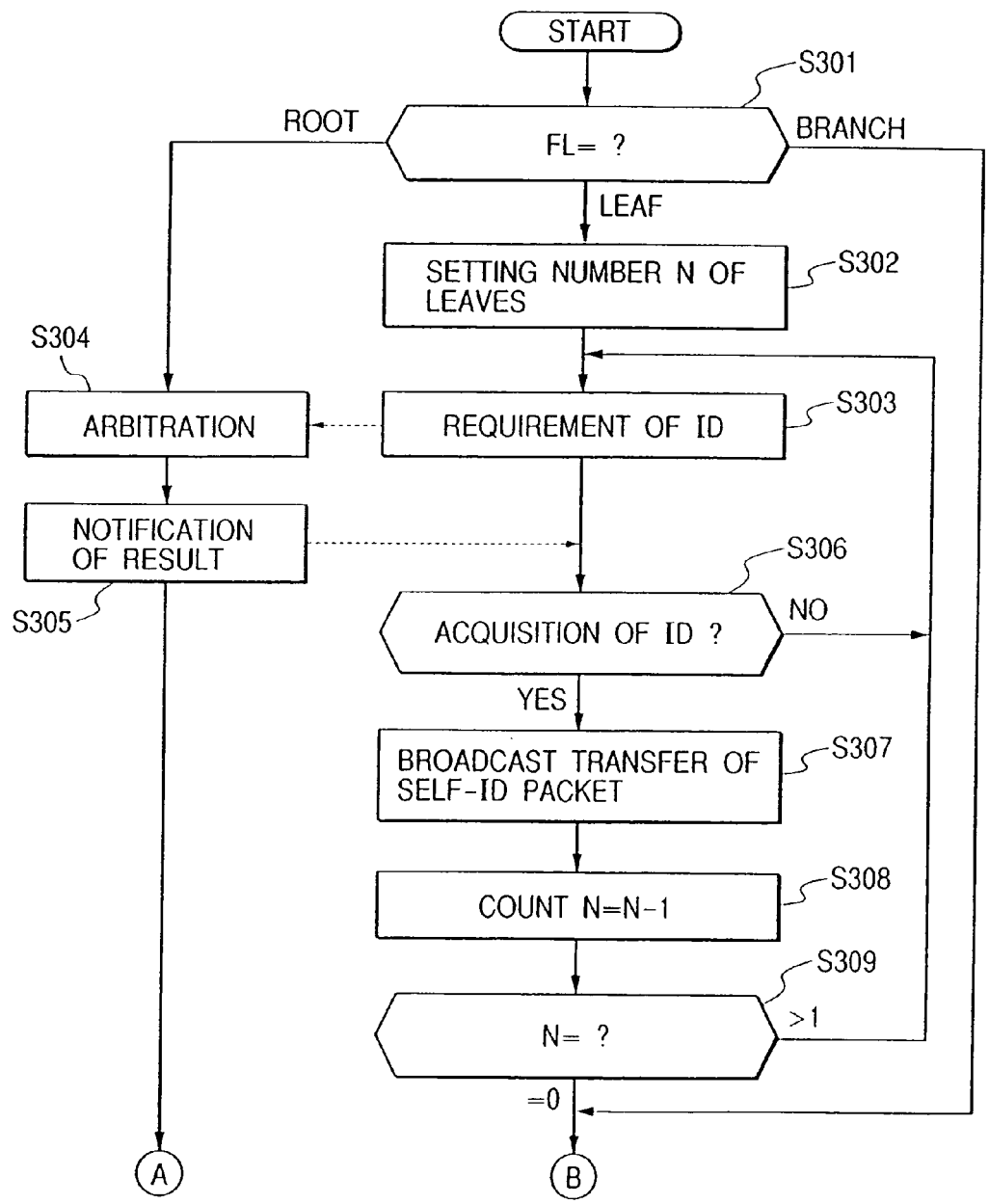

BRANCH: NODE HAVING MORE THAN TWO NODE CONNECTIONS
LEAF: NODE HAVING CONNECTION WITH ONLY ONE PORT
  c: PORT CORRESPONDING TO NODE OF CHILD
  p: PORT CORRESPONDING TO NODE OF PARENT

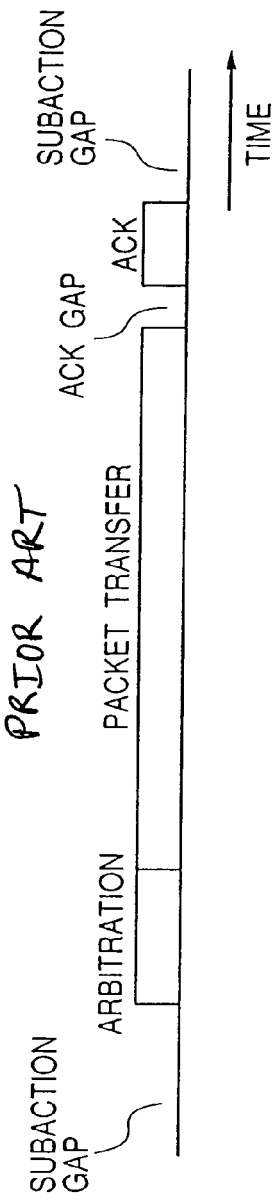
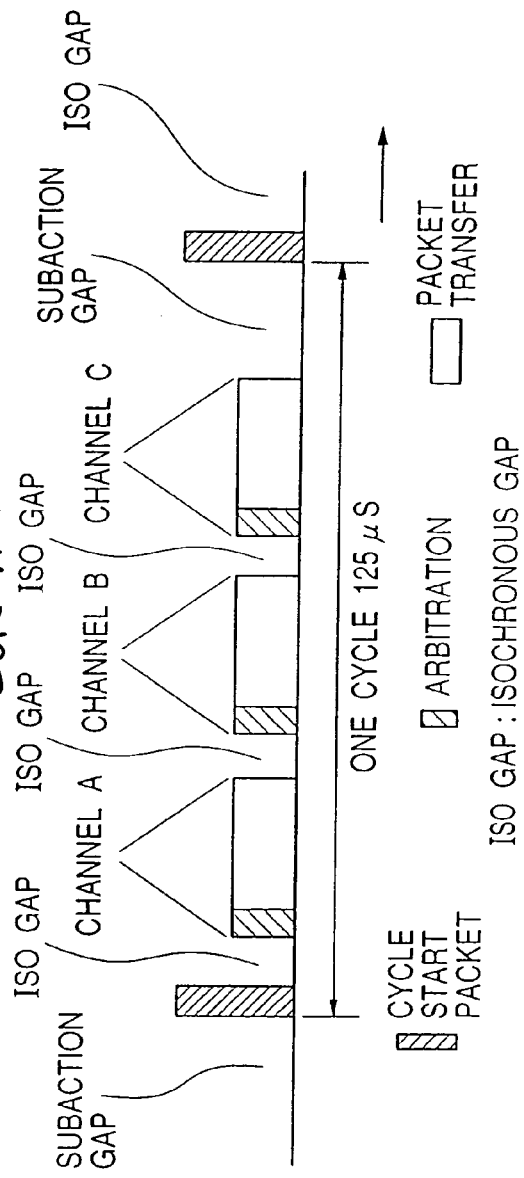
FIG. 14 PRIOR ART
FIG. 16 PRIOR ART

FIG. 26

| PC COMMAND | MEANING OF COMMAND |
|---|---|
| AE MODE | MODE SELECTION OF PROGRAM AE |
| DIGITAL ZOOM | MAX ELECTRONIC ZOOM MAGNIFICATION SETTING ELECTRONIC ZOOM PERMISSION/INHIBITION |
| ZOOMING POSITION | SETTING OF ZOOM POSITION |
| ZOOM | SETTING OF ZOOM DRIVING DIRECTION AND DRIVING SPEED |
| FOCUS | SETTING OF FOCUS DRIVING DIRECTION AND DRIVING SPEED |
| FOCUSSING MODE | AUTO-FOCUS/MANUAL FOCUS SELECTION |
| FOCUSSING POSITION | FOCUSING POSITION SETTING |
| GAMMA | GAMMA CHARACTERISTIC SETTING OF EACH OF Y/R/G/B |
| GAIN | AGC GAIN SETTING |
| IMAGE STABILIZER | VIBRATION PROOF EFFECTIVE AMOUNT SETTING AND ON/OFF SELECTION |
| IRIS | EXPOSURE CORRECTION AUTO/MANUAL SETTING AND F VALUE SETTING |
| SETUP LEVEL | SETUP LEVEL SETTING OF EACH OF Y/R/G/B |
| SHUTTER | SHUTTER SPEED SETTING |
| WHITE BALANCE | WHITE BALANCE AUTO/SET/PRESET SELECTION |
| AE SHIFT | SHIFT OF IRIS APERTURE DIAMETER |
| AE LOCK | EXPOSURE CORRECTION AUTO/LOCK SELECTION |
| COLOR GAIN | ADJUSTMENT OF COLOR DENSITY |
| TINT (HUE) | ADJUSTMENT OF HUE |
| ⋮ | ⋮ |

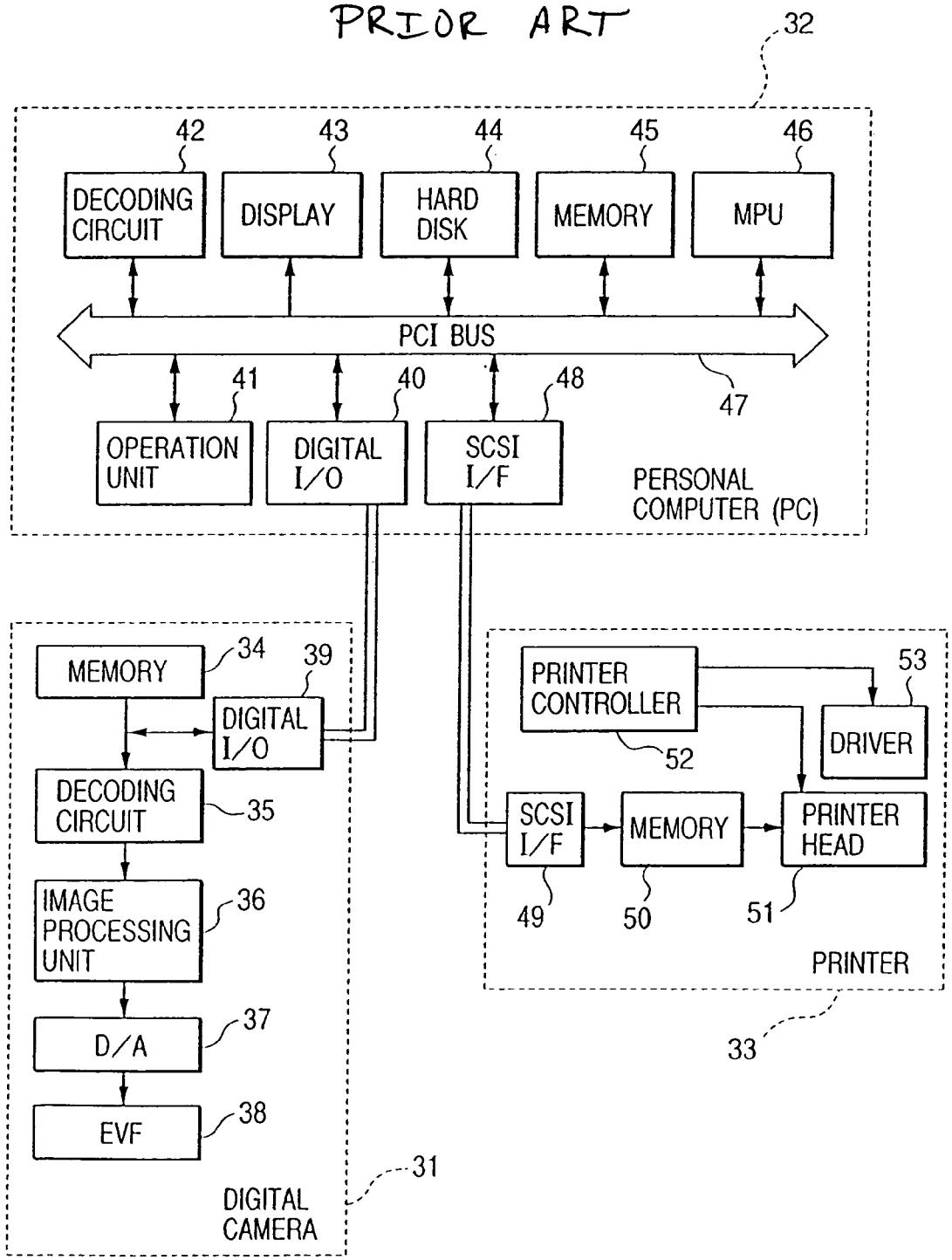

IMAGE PICKUP CONTROL APPARATUS, IMAGE PICKUP CONTROL METHOD, IMAGE PICKUP CONTROL SYSTEM, AND STORAGE MEDIUM

BACKGROUND OF THE INVENTION

1. Field of the Invention

The present invention relates to image pickup control techniques suitable for controlling, from an external apparatus, an image pickup apparatus such as a video camera for electronically performing an image pickup operation.

2. Related Background Art

Peripheral apparatuses of a personal computer (hereinafter abbreviated as PC), such as a hard disk drive and a printer, are connected to PC via a small computer general interface typically a SCSI (Small Computer System Interface) of a digital interface (hereinafter described as a digital I/F). Data communication between PC and peripheral apparatuses is performed via the digital I/F.

Recently, cameras for electronically performing an image pickup operation, such as digital cameras and digital video cameras, are positively used as peripheral apparatuses for inputting an image to PC. Specifically, a still image or moving image taken with a digital camera or video camera as well as associated sounds is entered to PC and stored in a hard disk, or edited and thereafter printed out by a color printer. Techniques in this field have been developed greatly and the number of users is increasing rapidly. With such techniques, when image data entered from a camera into PC is output to a printer or hard disk, data communication is performed via SCSI or the like. In this case, since image data having a large data amount is transferred, a digital I/F is required to have a high data transfer rate and be suitable for general use.

FIG. 33 shows a conventional system configuration of a digital camera and a printer both connected to a PC. In FIG. 33, reference numeral 31 represents a digital camera, reference numeral 32 represents a PC, and reference numeral 33 represents a printer. Reference numeral 34 represents a memory serving as a storage unit of the digital camera 31, reference numeral 35 represents a decoding circuit for image data, reference numeral 36 represents an image processing unit, reference numeral 37 represents a D/A converter, reference numeral 38 represents an EVF functioning as a display unit, and reference numeral 39 represents a digital I/O unit for the digital camera 31. Reference numeral 40 represents a digital I/O unit for PC 32 for the connection to the digital camera 31, reference numeral 41 represents an operation unit such as a keyboard and a mouse, reference numeral 42 represents a decoding circuit for image data, reference numeral 43 represents a display, reference numeral 44 represents a hard disk drive, reference numeral 45 represents a memory such as a RAM, reference numeral 46 represents a MPU as a computation unit, reference numeral 47 represents a PCI bus, and reference numeral 48 represents a SCSI interface (board) as a digital I/F. Reference numeral 49 represents a SCSI interface of the printer 33 connected to PC 32 via a SCSI cable, reference numeral 50 represents a memory, reference numeral 61 represents a printer head, reference numeral 52 represents a printer controller as a printer control unit, and reference numeral 53 represents a driver.

The following processes are executed in order to enter an image taken with the digital camera into PC 32 and output the image from PC 32 to the printer 33. Namely, in the digital camera, image data stored in the memory 34 and read therefrom is decoded by the decoding circuit 35, processed for image data display by the image processing circuit 36, and displayed on EVF 38 via the D/A converter 37. In order to output image data to PC 32, the image data is supplied to the digital I/O unit 40 of PC 32 via the digital I/O unit 39.

In PC 32, the PCI bus 47 is used as an internal transfer bus. The image data input from the digital I/O unit 40 is either stored in a hard disk of the hard disk drive 44, or displayed on the display 43 after it is decoded by the decoding circuit 42, stored in the memory 46 and converted into analog signals in the display 43. When image data is edited by PC 32, necessary data is input via the operation unit 41. The control of the whole system of PC 32 is performed by MPU 46.

When an image is to be printed out, the image data is transferred from PC 32 and via the SCSI interface unit 48 and SCSI cable to the SCSI interface unit 49 of the printer 33, and converted into print image data in the memory 50. The printer controller 52 controls the printer head 61 and driver 53 to print out the print image data in the memory 50.

As above, each peripheral apparatus is connected to PC which functions as a host, and image data picked up with a camera is printed out via PC. However, SCSI is associated with several problems including a low transfer data rate, a thick parallel communications cable, restrictions on the type of a connectable peripheral apparatus and on the connection method, and a necessity of I/F connectors same in number as the number of connection destinations.

Most of general home use PCes and digital apparatuses have connectors for connection to SCSI and cables on the back panel thereof. The size of such a connector is large and a work of inserting and removing the connector is cumbersome. Even a mobile or portable apparatuses which are not used as a mount-type, such as a digital camera and a video camera, is required to be connected to the connector on the back panel of PC and a user feels very cumbersome.

Digital data communications have been heretofore typically mutual communications between PC and its peripheral apparatus, and conventional communications systems are not so much inconvenient. However, it is expected that the number of types of apparatuses handling with digital data increases, and that not only PC peripheral apparatuses, but also other digital apparatuses such as digital video apparatuses and digital recording medium reproducing apparatuses can be connected to a network with the advent of improved I/F to realize network communications. Although network communications are very convenient, communications with a large data amount are performed often between some apparatuses. In such a case, the network traffics become congested and communications between other apparatuses in the network may be affected adversely, if a conventional communication method is used.

Digital I/F for general use (such as high performance serial bus IEEE 1394-1995 (The Institute of Electrical and Electronics Engineers)) has been proposed which is applicable to communications not only between PC and its peripheral apparatuses but also between digital apparatuses of various types and can solve problems of conventional digital I/F as much as possible. By using such digital I/F for general use, PCes, their peripheral apparatuses such as printers, digital cameras, digital VTRs with built-in camera, and the like are connected together to configure a network and realize data communications between these apparatuses.

Main characteristics of IEEE 1394 reside in that, as will be later detailed, its cable is relatively thin and rich in flexibility and its connector is very small as compared to a SCSI cable because of high speed serial communications, and that data having a large capacity such as image data can be transferred together with apparatus control data at high speed. With communications using IEEE 1394 I/F, even a portable apparatus which is not usually used as a mount-type, such as a digital camera and a video camera, can be connected easily with a considerably reduced conventional cumbersome work, and image data ca be transferred to PC smoothly.

As above, IEEE 1394 I/F has various advantages which overcome cumbersome works associated with a conventional data communications system. Data having a large capacity, particularly image data, can be transferred together with apparatus control data at high speed. It is therefore possible, for example, for PC to perform a remote real time control of an image pickup apparatus typically a video camera in accordance with image data transferred from the image pickup apparatus. There is therefore a high possibility to realize the conventional issue of remotely and reliably controlling an image pickup from another apparatus.

SUMMARY OF THE INVENTION

The present invention has been made under the above-described background and it is an object of the present invention to remotely and reliably control an image pickup apparatus from another apparatus.

In order to solve the above object, according to one aspect of the present invention, there is provided an image pickup control apparatus for controlling an image pickup apparatus via a data communications interface unit, comprising: storage means for storing control data for controlling the image pickup apparatus; connection detecting means for detecting a connection to the image pickup apparatus via the data communications interface unit; and transmission control means for transmitting the control data stored in the storage means to the image pickup apparatus when the connection detecting means detects a connection to the image pickup apparatus.

According to another aspect of the invention, there is provided an image pickup control method for controlling an image pickup apparatus via a data communications interface unit, comprising: a storage step of storing control data for controlling the image pickup apparatus; a connection detecting step of detecting a connection to the image pickup apparatus via the data communications interface unit; and a transmission control step of transmitting the control data stored at the storage step to the image pickup apparatus when the connection detecting step detects a connection to the image pickup apparatus.

According to another aspect of the invention, there is provided an image pickup control system for controlling an image pickup apparatus via a data communications interface unit, comprising: storage means for storing control data for controlling the image pickup apparatus; connection detecting means for detecting a connection to the image pickup apparatus via the data communications interface unit; and transmission control means for transmitting the control data stored in the storage means to the image pickup apparatus when the connection detecting means detects a connection to the image pickup apparatus.

According to another aspect of the invention, there is provided a storage medium storing a control program for controlling an image pickup apparatus via a data communications interface unit, wherein the program comprises: a storage routine of storing control data for controlling the image pickup apparatus; a connection detecting routine of detecting a connection to the image pickup apparatus via the data communications interface unit; and a transmission control routine of transmitting the control data stored at the storage routine to the image pickup apparatus when the connection detecting routine detects a connection to the image pickup apparatus.

According to another aspect of the invention, there is provided an image pickup control apparatus for controlling an image pickup apparatus via a data communications interface unit, comprising: storage means for storing a plurality set of control data corresponding to a plurality of photographing modes, the control data controlling the image pickup apparatus; connection detecting means for detecting a connection of the image pickup apparatus via the data communication interface unit; and transmission control means for transmitting the control data stored in the storage means to the image pickup apparatus when a connection to the image pickup apparatus is detected by the connection detecting means and if it is judged that the image pickup apparatus is in a controllable state.

The storage means, process and routine may store the control data for controlling a stop, a hue, a color density and a shutter speed.

The image pickup control apparatus, method, system and storage medium may further comprise reception detecting means, process and routine for detecting a control reception state of the image pickup apparatus, wherein the transmission control means, process and routine transmit the control data stored in and at the storage means, process and routine to the image pickup apparatus when the connection detecting means, process and routine detect a connection to the image pickup apparatus and when the reception detecting means, process and routine detect a control reception state of the image pickup apparatus.

The image pickup apparatus, method, system and storage medium may have storage means, process and routine for storing the control data transmitted from and at the transmission control means, process and routine as current control data.

The storage means, process and routine may store the control data for each of a plurality of photographing conditions, and the image pickup control apparatus, method, system and storage medium may further comprise guide means, process and routine for guiding to select a desired photographing condition by displaying a plurality of photographing conditions stored in and at the storage means, process and routine and the transmission control means, process and routine transmit the control data corresponding to the desired photographing condition selected by being guided by and at the guide means, process and routine.

The photographing condition may be based upon an environment and photographing state of a subject, the environment and photographing state including evening photographing, wedding reception photographing, closeup photographing, ski ground photographing, night scene photographing and other photographing.

The image pickup control apparatus, method, system and storage medium may further comprise display control means, process and routine for displaying a model image corresponding to the control data for the desired photographing condition selected by being guided by the guide means, process and routine.

The image pickup control apparatus, method, system and storage medium may further comprise change means, process and routine for changing the control data corresponding to the model image by referring to the model image displayed by the display control means, process and routine, wherein the transmission control means, process and routine transmit the control data changed by the change means, process and routine to the image pickup apparatus.

The display control means, process and routine may display the model image corresponding to the control data changed by the change means, process and routine.

The image pickup control apparatus, method, system and storage medium may further comprise rewrite means, process and routine for changing the control data stored in and at the storage means, process and routine to the control data changed by the change means, process and routine.

The image pickup control apparatus, method, system and storage medium may further comprise return instruction means, process and routine for transmitting the control data corresponding to the desired photographing condition selected by being guided by the guide means, process and routine and instructing the image pickup apparatus to return a photographed image corresponding to the control data.

The display control means, process and routine may display the photographed image returned from the image pickup apparatus in response to an instruction by the return instruction means, process and routine.

The change means, process and routine may change the control data corresponding to the photographed image by referring to the photographed image displayed by the display control means, process and routine, and the transmission control means, process and routine transmit the control data changed by the change means, process and routine to the image pickup apparatus.

The return instruction means, process and routine may transmit the control data changed by the change means, process and routine and transmitted by the transmission control means, process and routine to the image pickup apparatus and instruct the image pickup apparatus to return the photographed image corresponding to the changed control data.

According to another aspect of the invention, there is provided an image pickup control apparatus, method, system and storage mediums for a system in which an image pickup apparatus and a printer are connected via data communications interface units, comprising: detecting means, process and routine for detecting a print performance of the printer when a detection between the image pickup apparatus and the printer is detected; and transmission control means, process and routine for transmitting a photographed image from the image pickup apparatus to the printer, the photographed image having a definition corresponding to the printer performance detected by the detecting means, process and routine.

The data communications interface unit may comprise a general digital interface unit.

The data communications interface unit may conform with an IEEE 1394 interface bus.

The storage means may store the control data corresponding to the photographing mode for controlling a stop, a hue, a color density and a shutter speed.

The image pickup control apparatus, method, system and storage medium may further comprise control means for controlling to allow the control data to control the image pickup apparatus when the image pickup apparatus is in a manual setting mode, wherein the transmission control means transmits the control data stored in the storage means to the image pickup apparatus when the connection detecting means detects a connection to the image pickup apparatus and when the image pickup apparatus is controllable.

The photographing mode may be based upon an environment and photographing state of a subject, the environment and photographing state including evening photographing, wedding reception photographing, closeup photographing, ski ground photographing, night scene photographing and other photographing.

The control means may further comprise display control means for displaying a model image corresponding to the control data for a selected photographing mode, when the control data is set in accordance with the photographing mode.

The image pickup control apparatus, method, system and storage medium may further comprise change means for changing the control data corresponding to the model image by referring to the model image displayed by the display control means, wherein the transmission control means transmits the control data changed by the change means to the image pickup apparatus.

The display control means may display a model image corresponding to the control data changed by the change means.

The above, and other objects, features and advantages of the present invention will be apparent from the following detailed description of illustrative embodiments which is to be read in connection with the accompanying drawings.

BRIEF DESCRIPTION OF THE DRAWINGS

FIG. 26 is a diagram showing types of camera control commands.

DETAILED DESCRIPTION OF THE PREFERRED EMBODIMENTS

Preferred embodiments of the invention will be described with reference to the accompanying drawings.

Figure 1:
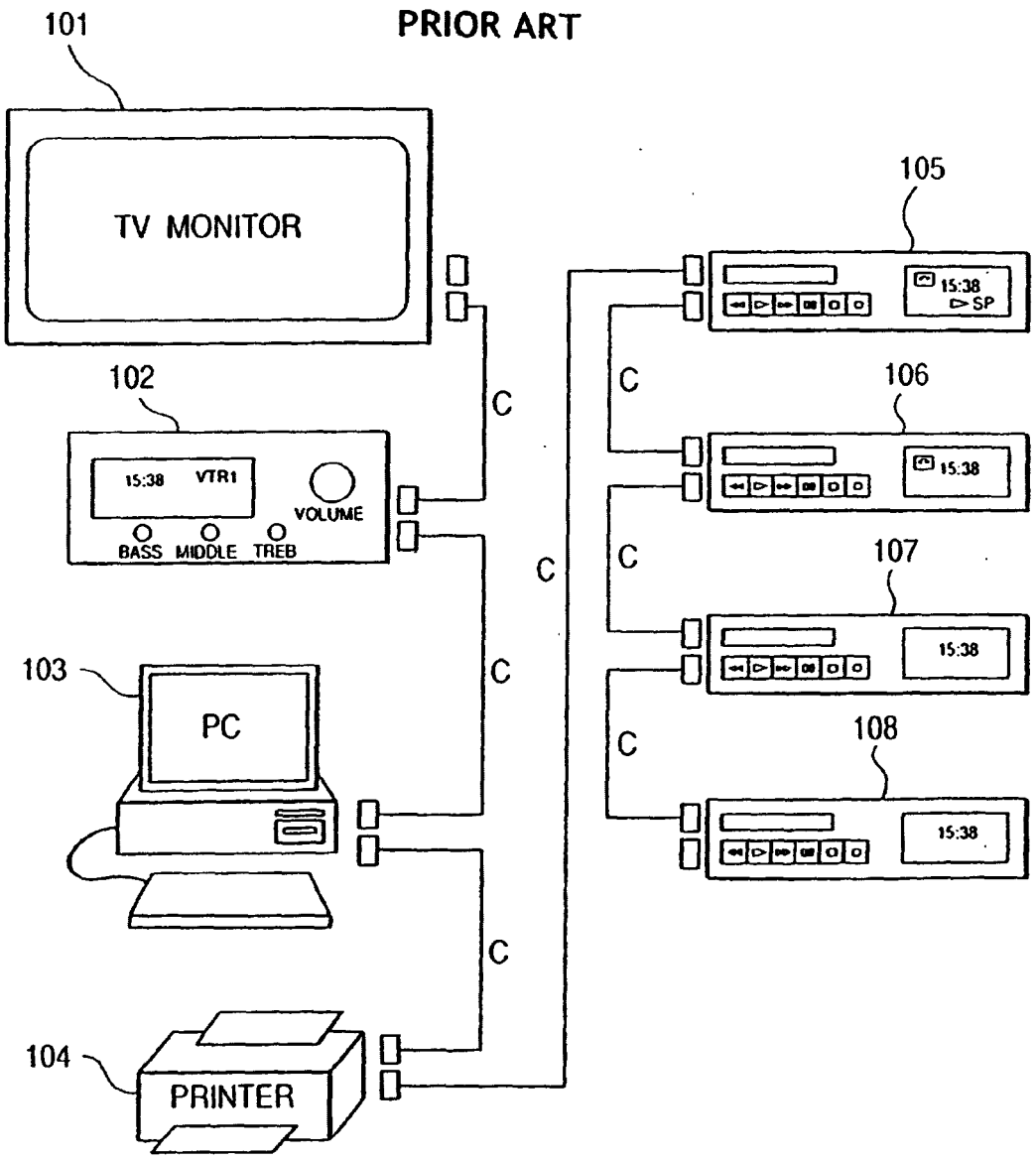
FIG. 1 is a schematic diagram showing an example of the configuration of a network of an IEEE 1394 communications system.
Figure 3:
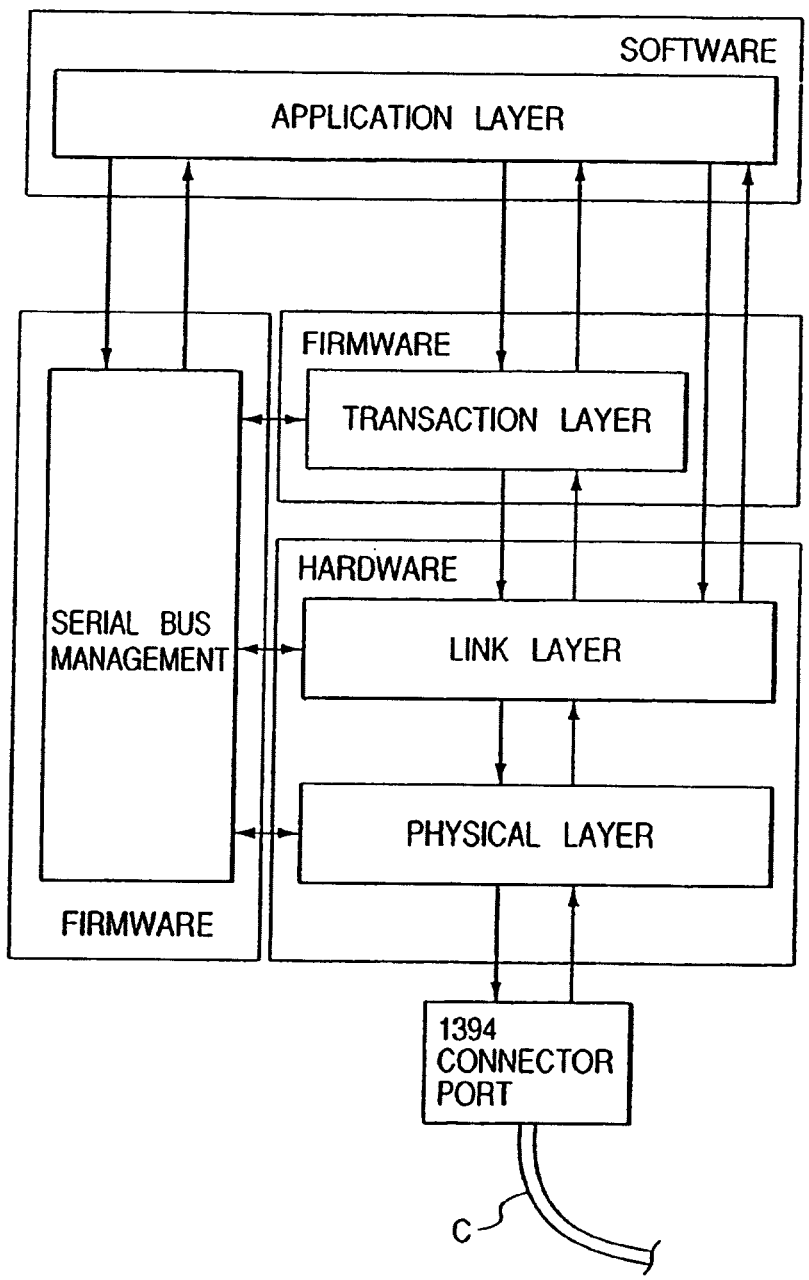
Figure 4:
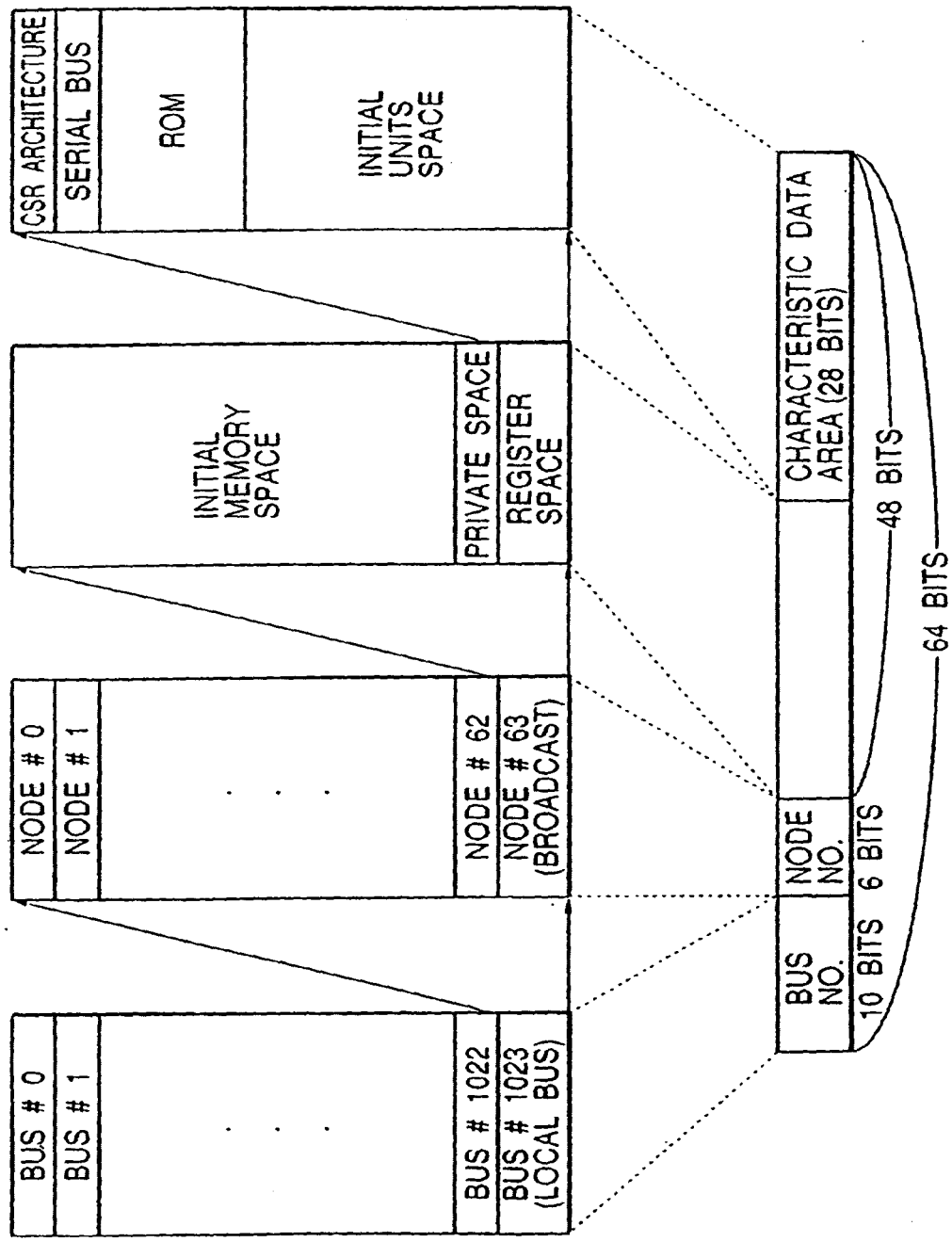
Figure 5:
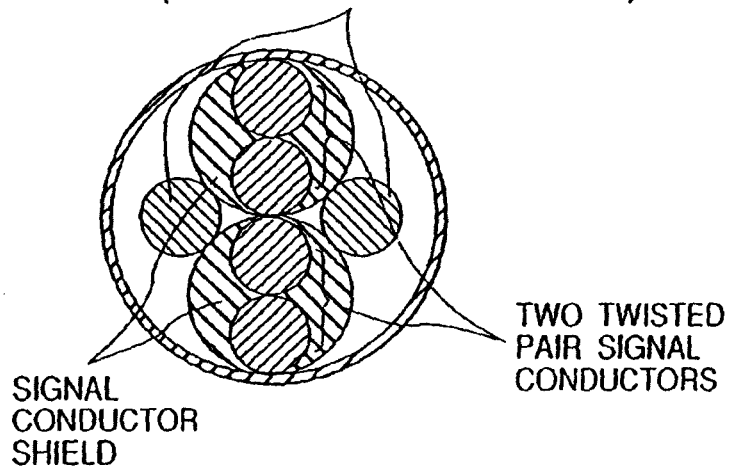
Figure 6:
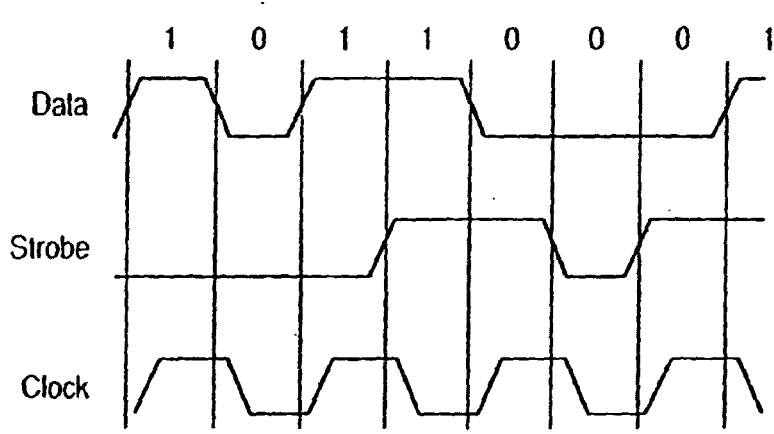
Figure 7:
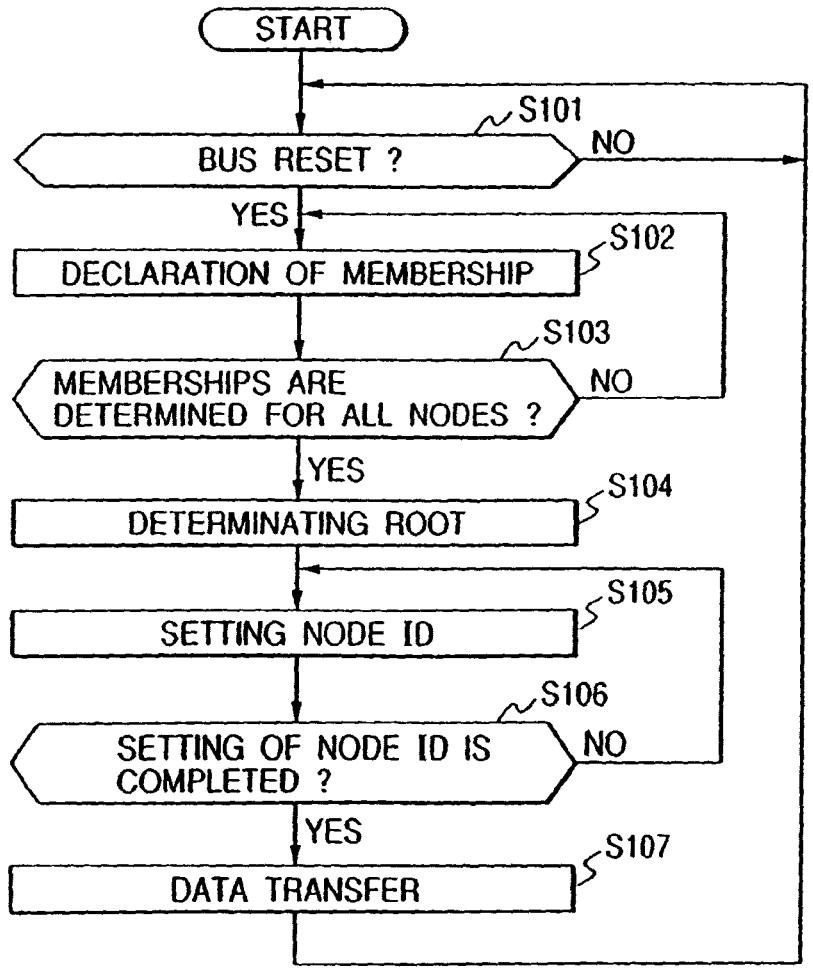

FIG. 1 is a diagram showing the system environment incorporating an image pickup apparatus of this invention. Under this system environment, the apparatuses are connected by serial bus cables C (hereinafter called 1394 bus cables) of IEEE 1394.

In FIG. 1, reference numeral 101 represents a TV monitor, and reference numeral 102 represents an AV amplifier connected to the TV monitor 101 via a 1394 bus cable C. The AV amplifier 102 selects a particular apparatus from various apparatuses connected by 1394 bus cables C, and transfers audio visual data from the selected apparatus to the TV monitor 101.

Reference numeral 103 represents a PC connected to the AV amplifier 102 via a 1394 bus cable C, and reference numeral 104 represents a printer connected to PC 103 via a 1394 bus cable C. PC 103 can receive an image from any of various apparatuses via 1394 bus cables C and print it out at the printer 104.

Reference numeral 105 represents a first digital VTR connected to the printer 1394 via a 1394 bus cable C, reference numeral 106 represents a second digital VTR connected to the first digital VTR via a 1394 bus cable C, reference numeral 107 represents a DVD player connected to the second digital VTR 106 via a 1394 bus cable C, and reference numeral 108 represents a CD player connected to the DVD player 107 via a 1394 bus cable C.

The network shown in FIG. 1 is only illustrative, and other apparatuses may be connected at the downstream of the TV monitor 101 and CD player 108. External storage devices such as hard disks, a second CD player, a second DVD player may also be connected by 1394 bus cables C.

In this embodiment, as digital I/F for connecting apparatuses, an IEEE 1394 serial bus is used. The details of the IEEE 1394 serial bus will be given first.

Outline of IEEE 1394 Technologies

With the advent of home digital VTR and DVD, it is becoming highly necessary to transfer in real time a great amount of data such as video and audio data. In order to transfer in real time video and audio data to PC or other digital apparatuses, an interface capable of high speed data transfer is necessary. An interface developed from this viewpoint is IEEE 1394-1995 (high performance serial bus: 1394 serial bus).

Figure 2:
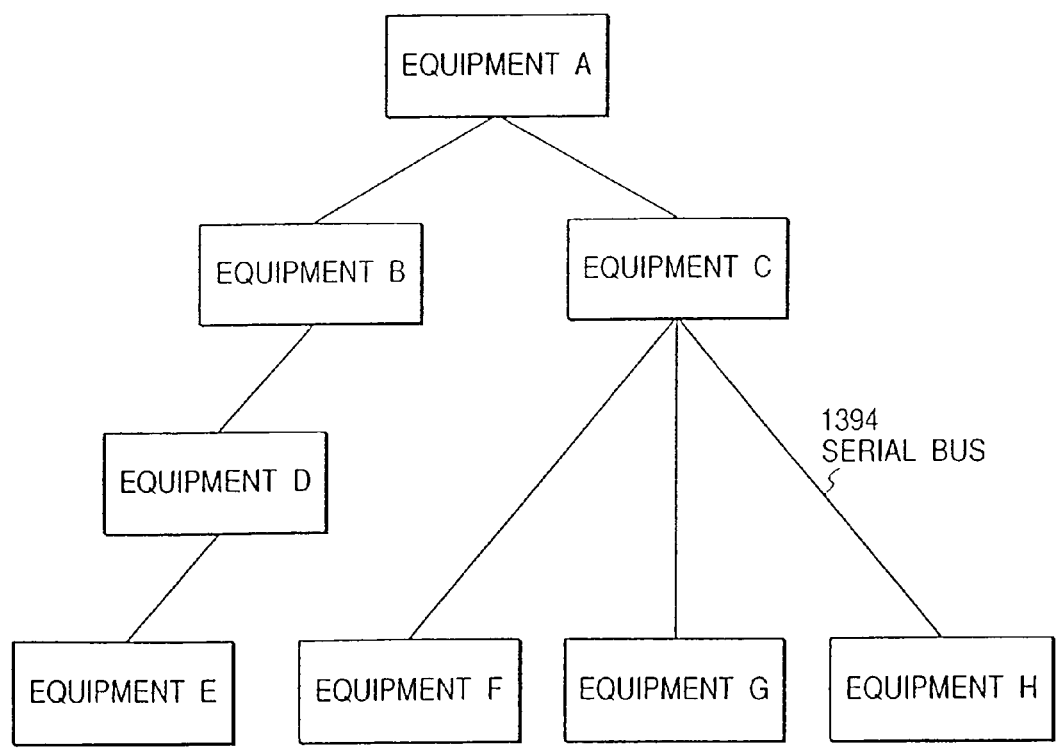
FIG. 2 is a diagram showing an example of connections between apparatuses using IEEE 1394 serial buses.

FIG. 2 shows an example of a network system using 1394 serial buses. This system has apparatuses A, B, C, D, E, F, G and H. Twist pair cables of the 1394 serial bus are connected between the apparatuses A and B, A and C, B and D, D and E, C and F, C and G, and C and H. These apparatuses A to H may be a PC, a digital VTR, a DVD, a digital camera, a hard disk, a monitor and the like.

A connection method for the apparatuses enables a mixture of a daisy chain method and a node branch method, which provides a high degree of connection freedom. Each apparatus has an ID specific thereto. One network is configured within the area connected by 1394 serial buses, while each apparatus confirms a partner ID. By sequentially connecting the digital apparatuses with 1394 serial buses, each apparatus can function as a relay apparatus to constitute one network. A Plug & Play function characteristic to the 1394 serial bus automatically recognizes an apparatus and its connection state when the cable is connected to the apparatus.

In the system shown in FIG. 2, when an apparatus is disconnected from or newly added to the network, a bus reset is automatically performed to reset the network configuration and reconfigure a new network. This function allows to always set and recognize the configuration of a network at that time.

Three data transfer speeds are provided including 100 Mbps, 200 Mbps, and 400 Mbps. An apparatus having a higher transfer speed supports an apparatus having a lower transfer speed to establish compatibility therebetween. Data transfer modes include an asynchronous transfer mode for transferring asynchronous data (Async data) such as a control signal and an isochronous transfer mode for transferring isochronous data (Iso data) such as real time video and audio data. The Async data and Iso data are transferred in a mixed state during each cycle (usually one cycle is 125 μs) after a cycle start packet (CSP) indicating a cycle start is transferred, with the Iso data transfer being given a priority over the Async data transfer.

Figure 3:
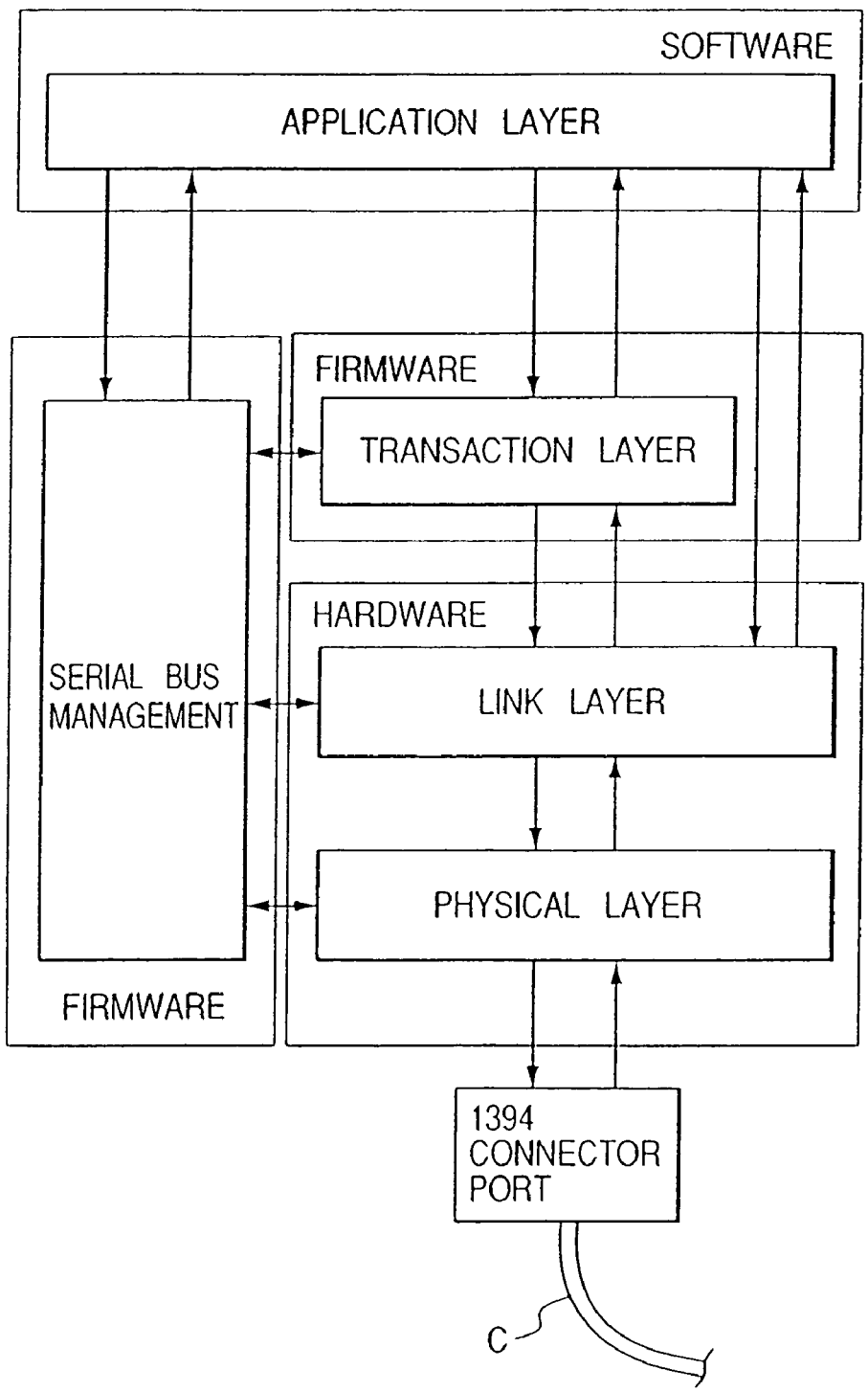
FIG. 3 is a block diagram showing constituent elements of an IEEE 1394 serial bus.

FIG. 3 shows the constituent elements of the 1394 serial bus. As shown, the 1394 serial bus has as a whole a layer (hierarchical) structure. The 1394 serial bus cable C is most like hardware. At the upper level of a connector port to which the cable C is connected, there is a hardware section of a physical layer and a link layer. This hardware section is substantially made of an interface chip. Of the hardware section, the physical layer performs coding, connector related control and the like, while the link layer performs packet transfer, cycle time control and the like.

A transaction layer in a firmware section manages data to be transferred (transacted) and issues a read/write command. A serial bus management in a firmware section manages the configuration of the network, such as a connection state and ID of each connected apparatus. The hardware and firmware sections constitute a substantial 1394 serial bus. An application layer in a software section changes with software to be used, and defines how data is placed on the interface, in accordance with a protocol such as an AV protocol.

Figure 4:
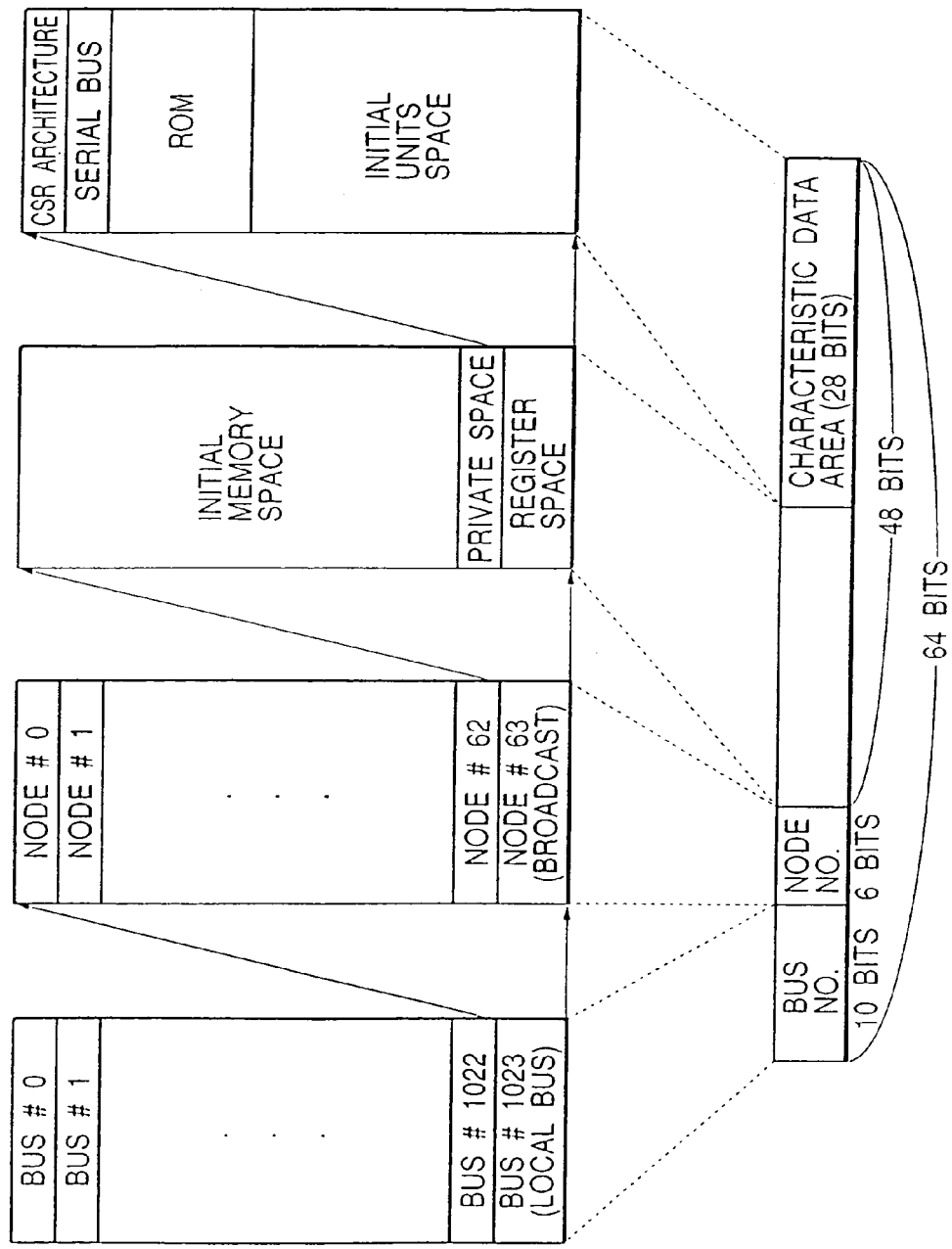
FIG. 4 is a diagram showing an address space of an IEEE 1394 serial bus.

FIG. 4 shows an address space of the 1394 serial bus. It is essential that each apparatus (node) connected to the 1394 serial bus has an address of 64 bits specific to the node. This address is stored in a ROM so that the addressees of each node and a partner node can be recognized always and communications with a designated partner can be performed. Addressing of the 1394 serial bus is in conformity with IEEE 1212. Of the 64-bit address space, the first 10 bits are used for designating the bus number, and the next 6 bits are used for designating the node ID. The remaining 48 bits are used as an address width assigned to the apparatus. Of these specific address space, the last 28-bit address space is used as a specific data area in which an identification code of the apparatus, use condition designation information, and the like are stored.

Technologies characteristic to the 1394 serial bus will be described in more detail.

Electrical Specifications of 1394 Serial Bus

Figure 5:
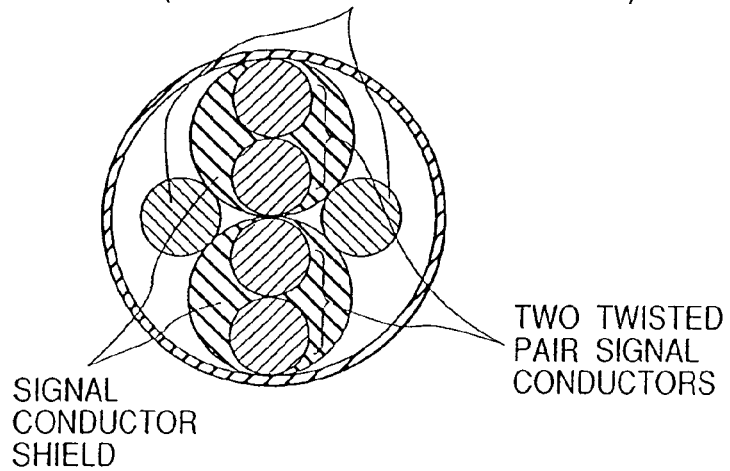
FIG. 5 is a cross sectional view of an IEEE 1394 serial bus cable.

FIG. 5 is a cross sectional view of a 1394 serial bus cable C. With the 1394 serial bus, a connection cable accommodates two pairs of twisted signal conductors as well as electric power supply conductors. A power can therefore be supplied to an apparatus without a power supply, an apparatus with a voltage lowered by accidents, and other apparatuses. A simple connection cable has no electric power supply conductor and is limited to a connection of a particular apparatus. A voltage at the electric power supply conductors is stipulated to be 8 to 40 V and a current is stipulated to be 1.5 A DC at the maximum.

DS-Link Coding

Figure 6:
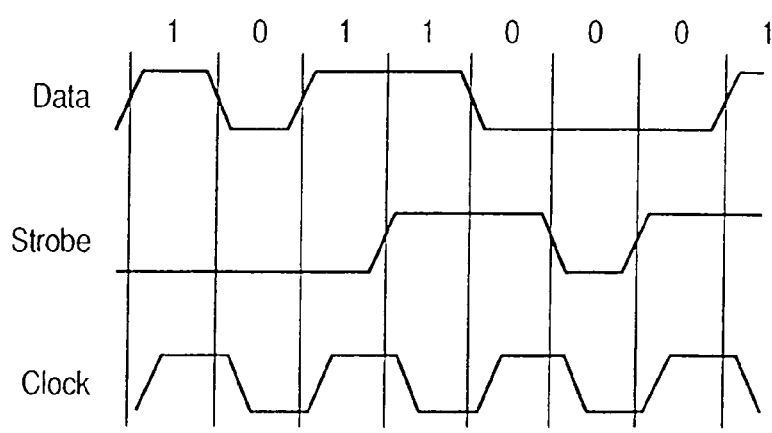
FIG. 6 is a timing chart illustrating a DS-Link coding method using a data transfer format of an IEEE 1394 serial bus.

The DS-Link coding method for data transfer adopted by the 1394 serial bus will be described with reference to FIG. 6. The 1394 serial bus adopts the DS-Link (Data/Strobe Link) coding method. This DS-Link coding method is suitable for high speed serial data communications and requires two pairs of twisted signal conductors. Main data is transferred via one pair of twisted conductors and a strobe signal is transferred via the other pair of twisted conductors. On the reception side, a clock signal can be reproduced through exclusive logical OR of the reception data and strobe signal.

The merits of using the DS-Link coding method are, for example, that the transfer efficiency is higher than other serial data transfer methods, that a circuit scale of a controller LSI can be made small because a PLL circuit is not necessary, and that since information representative of an idle state is not necessary when there is no data to be transferred, a transceiver circuit of each apparatus can be set to a sleep state and the consumption power can be lowered.

Sequence of Bus Reset

With the 1394 serial bus, each connected apparatus (node) is given a node ID so that each apparatus can be recognized as a constituent member of the network. If the network configuration changes, for example, if the number of nodes increases or decreases because of a node insertion or disconnection or power on/off, the new network configuration is recognized. In this case, the node which detected such a change transmits a bus reset signal to the bus to enter a mode of recognizing the new network configuration. A change can be detected by monitoring a change in the bias voltage at the board of the 1394 IF port.

After a bus reset signal is transmitted from one node and when the physical layer of another node receives it, the physical layer notifies a reception of the bus reset signal to the link layer and transmits the bus reset signal to another node. After all the nodes detect the bus reset signal, a bus reset process is activated. The bus reset process is activated not only through hardware detection such as cable insertion and disconnection and network abnormality but also through a command issued directly to the physical layer under the host control by a protocol. When the bus reset process is once activated, the data transfer is temporarily suspended, and after the bus reset process is completed, the data transfer resumes under the new network configuration.

Sequence of Node ID Determination

After completion of the bus reset process, each node is assigned a new ID in order to reconfigure the new network. The general sequence from the bus reset to node ID determination will be described with reference to the flow charts of FIGS. 7 to 10.

Figure 7:
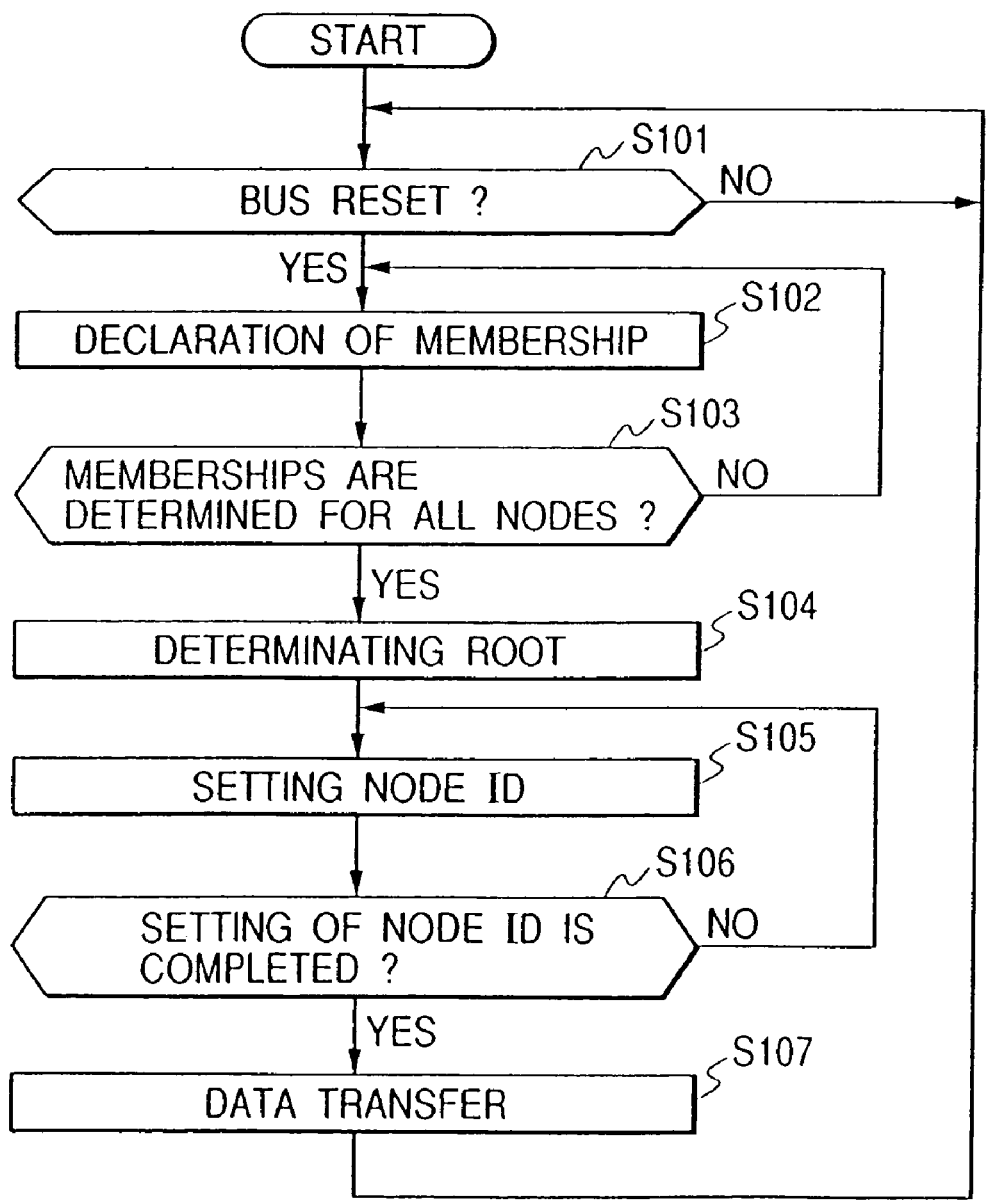
FIG. 7 is a flow chart illustrating the outline of processes from a bus reset to a node ID determination.

The flow chart shown in FIG. 7 illustrates a series of processes to be executed by the bus, from a bus reset occurrence to a node ID determination and a data transfer resumption. First at Step S101, an occurrence of a bus reset in the network is always monitored, and when a bus reset occurs because of a node power on/off or the like, the flow advances to Step S102. At Step S102 each node connected to the network declares a parent/child relation in order to know the new network connection state from the network reset state.

When the parent/child relation is determined for all nodes (Step S103), one node is determined which can function as a root node for all other nodes. Until the parent/child relation is determined for all nodes, the root node cannot be determined. After the root node is determined at Step S104, a node ID setting work is performed at Step S105 to assign each node a node ID. This node ID setting work is repetitively performed (Step S106) until all the nodes are assigned ID in the order of leaf node branch node leaf node to be described later. After all the nodes are assigned ID, the new network configuration can be recognized by all the nodes. Therefore, at Step S107 a data transfer between desired nodes is made possible and if necessary the data transfer is performed. In this state of Step S107, a mode of monitoring an occurrence of the bus reset starts again, and if the bus reset is detected, the setting work from Step S101 to Step S106 is repeated.

The details of the process from the bus reset to the root determination and the process after the root determination to the ID setting, illustrated in the flow chart of FIG. 7, will be given with reference to the flow charts of FIGS. 8 to 10.

First, the procedure from the bus reset to the root node determination will be described with reference to the flow chart of FIG. 8. When an occurrence of a bus reset is detected at Step S201, the flow advances to Step S202 whereat a flag indicating a leaf node is set at each apparatus, as a first step of a work for reconfirming the connection state of the reset network. Next, at Step S203 the number of other nodes connected to a port or ports of each node is checked.

The number of undefined ports (whose parent/child relation is still not determined) is checked (Step S204) in order to start the declaration of a parent/child relation in accordance with the check result of the number of connected ports. Although the number of ports is equal to the number of undefined ports immediately after the bus reset, the number of undefined ports checked at Step S204 changes as the parent/child relation is determined. Only a leaf node can declare the parent/child relation immediately after the bus reset. The node is judged as a leaf node if the number of undefined ports checked at Step S204 is "1".

If the node is a leaf node, at Step S205 a declaration that "this node is a child and the partner is a parent" is made to the node connected to the leaf node, to thereafter terminate the process. If a node is recognized as a branch node because of a plurality of connected ports at Step S203 and a plurality of undefined ports at Step S204 immediately after the bus reset, a flag indicating a branch is set at Step S206, and at Step S207 the routine stands by to receive "parent" of the parent/child relation declaration from the leaf node. The branch node received the parent/child relation declaration from the leaf node at Step S207, checks again the number of undefined ports at Step S204. If the number of undefined ports is "1", a declaration that "this node is a child" is issued to the node connected to the remaining port at Step S205.

If the branch node has two or more undefined nodes even at the second or later check at Step S204, the routine again stands by at Step S207 to receive "parent" from a leaf node or branch node. If the number of undefined ports checked at Step S204 becomes "0" at any branch node or a leaf node (in an unusual case of not quickly issuing a child declaration), it means that the parent/child declaration of the whole network was completed. A flag indicating a root is set at Step S208 for this single node having no undefined port (all ports determined as parent), and the node is confirmed as the root node at Step S209.

Next, the details of the process after the root node determination to the ID setting completion will be described with reference to the flow charts of FIGS. 9 and 10.

Figure 8:
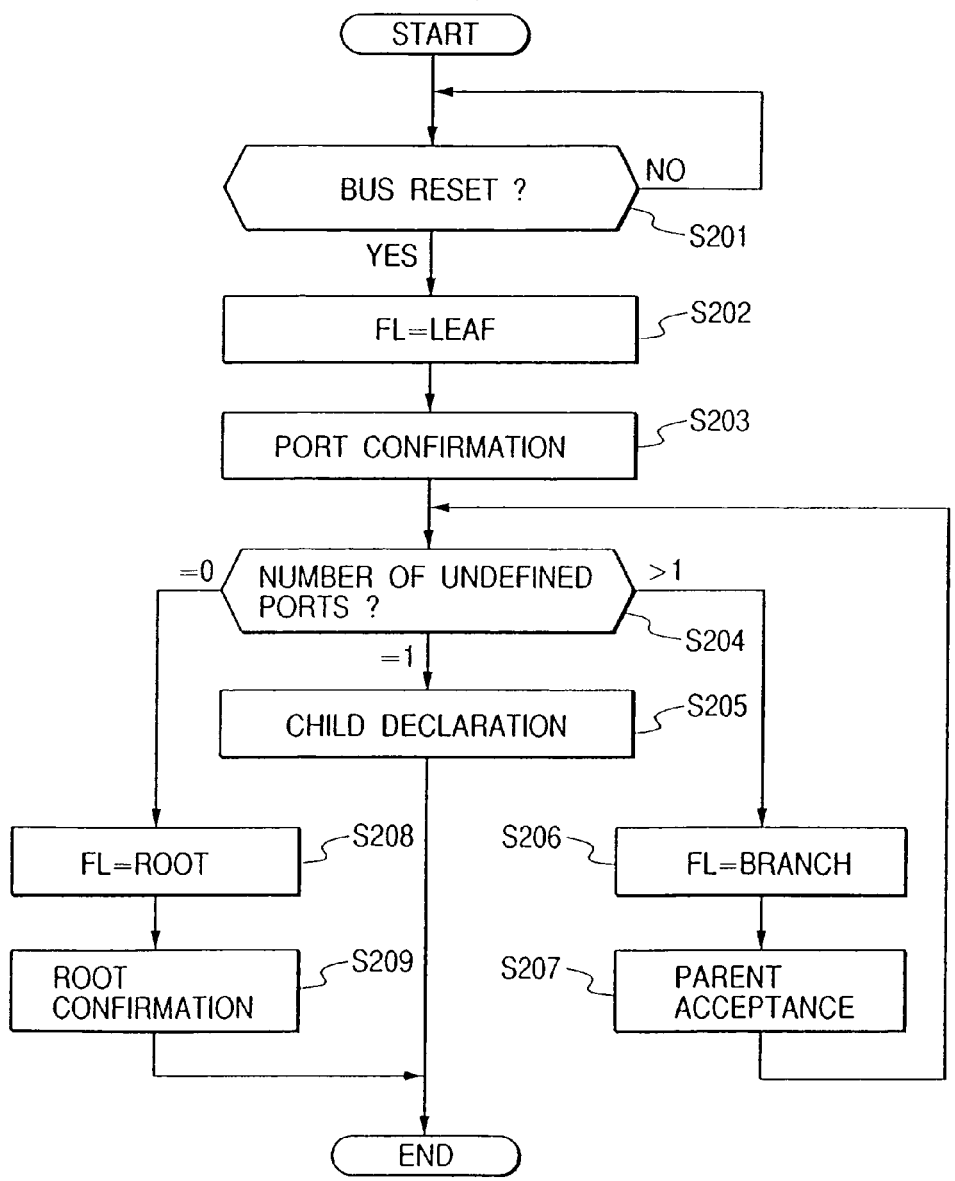
FIG. 8 is a flow chart illustrating the details of processes from the bus reset to a root determination shown in FIG. 7.

In accordance with the flag information for the leaf, branch and root determined by the sequence shown in FIG. 8, the nodes are classified into the leaf nodes, branch nodes and root node at Step S301. In the work of assigning each node an ID, a leaf node can be assigned ID at the first. IDes from a smaller number (starting from a node number=0) are set in the order of leaf node→branch node→root node.

In the case of the leaf node, the number N (natural number) of leaf nodes in the network is set at Step S302. Thereafter, at Step S303 each leaf node requests ID from the root node. Upon reception of the requests from a plurality of leaf nodes, the root node performs arbitration (to select one leaf node) at Step S304. At Step S305 one victory node is assigned an ID number and remaining defect nodes are notified of a failure.

Each leaf node checks at Step S306 whether ID was acquired. If not, the flow returns to Step S303 whereat an ID request is again issued to repeat the above operations. If ID is acquired, at Step S307 a self-ID packet is broadcast to all nodes. This self-ID packet contains information such as a node ID, the number of ports of the node, the number of already connected ports, whether each port is a parent or child, and whether the node has an ability of a bus manager (if the node has a bus manager ability, a contender bit in the self-ID packet is set to "1", whereas if not, it is set to "0").

Figure 11:
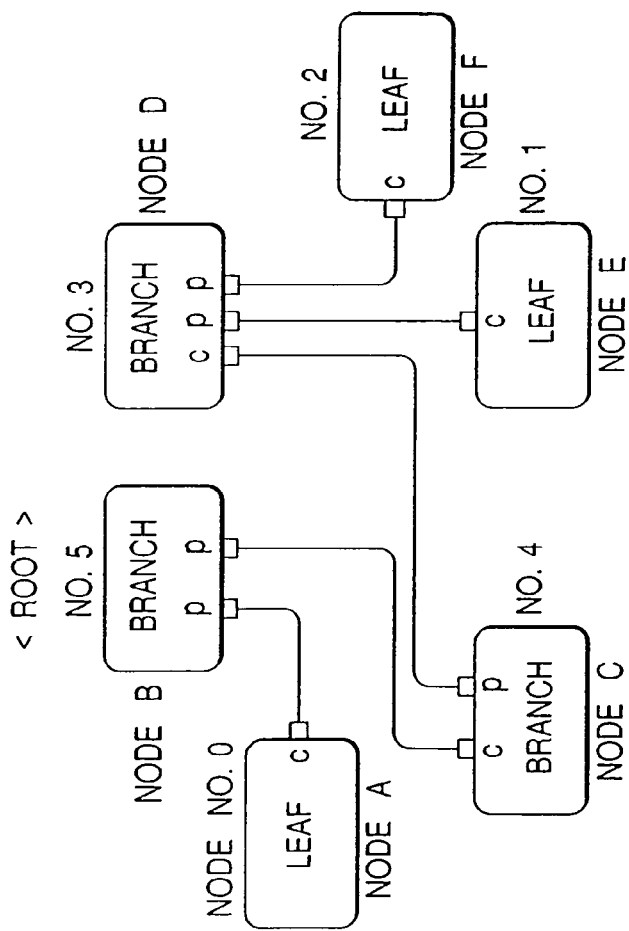
FIG. 11 is a diagram illustrating a specific example of determining a parent/child relation when node IDes are determined.

The bus manager ability allows the following bus managements:
(1) Bus power supply management: Management of whether each apparatus of the network shown in FIG. 1 is an apparatus which requires a power supply via the electric power supply conductors in the connection cable or an apparatus which has its own power supply.
(2) Maintenance of a speed map: Maintenance of communications speed information of each apparatus of the network.
(3) Maintenance of a network configuration (topology map): Maintenance of tree structure information such as shown in FIG. 11.
(4) Bus optimization based upon information acquired from the topology map.

The bus manager node performs a bus management of the whole network by using the procedure to be later described. The node having the ability of a bus manager, i.e., the node which broadcasts the self-ID packet having the contender bit of "1", stores information such as a communications speed in the self-ID packets broadcast from the other nodes. When the node becomes the bus manager, it forms the speed map and topology map in accordance with the stored information.

After the node-ID packet is broadcast, the number of remaining leaf nodes is decremented by "1" at Step S308. If it is judged at Step S309 that the number of remaining leaf nodes still not acquiring ID is "1" or larger, the flow returns to Step S303 to repeat the above operation. If the count N is "0", i.e., if the number of remaining leaf nodes still not acquiring ID is "0" and all the leaf nodes acquired ID and broadcast the self-ID packet, then the ID setting for branch nodes starts.

The ID setting for branch nodes is similar to the leaf nodes. First at Step S310 the number M (natural number) of branch nodes in the network is set. Thereafter, at Step S311 each branch node requests ID from the root node. In response to this, the root node performs arbitration at Step S312. Each victory node is assigned ID starting from the smaller number next to the last number assigned to the leaf node. At Step S313, the root node assigns ID to the branch node issued the ID request or notifies the branch node of a arbitration failure.

Each branch node issued the ID request checks at Step S314 whether ID was acquired. If not, the flow returns to Step S311 whereat an ID request is again issued to repeat the above operation. If ID is acquired, at Step S315 a self-ID packet is broadcast to all other nodes. After the self-ID packet of one branch node is broadcast, the number of remaining branch nodes is decremented by "1" at Step S316. If it is judged at Step S317 that the number of remaining branch nodes still not acquiring ID is "1" or larger, the flow returns to Step S311 to repeat the above operation.

If the count M is "0", i.e., if the number of remaining branch nodes still not acquiring ID is "0" and all the branch nodes acquired ID and broadcast the self-ID packet, it means that the node still not acquiring ID is only the root node. In this case, at Step S318 the ID number having the largest number still not assigned is set to the root node itself. At Step S319, a self-ID packet of the root node is broadcast.

With the above processes, a presence/absence of the bus manager ability of each node becomes clear. If a plurality of nodes have the bus manager ability, the node having the largest ID number becomes the bus manager. If the root node has the bus manager ability, it becomes the bus manager because it has the largest ID number in the network, whereas if the root node does not have the bus manager ability, the branch node having the largest ID number next to the root node and having the contender bit of "1" in the self-ID packet becomes the bus manager.

Figure 10:
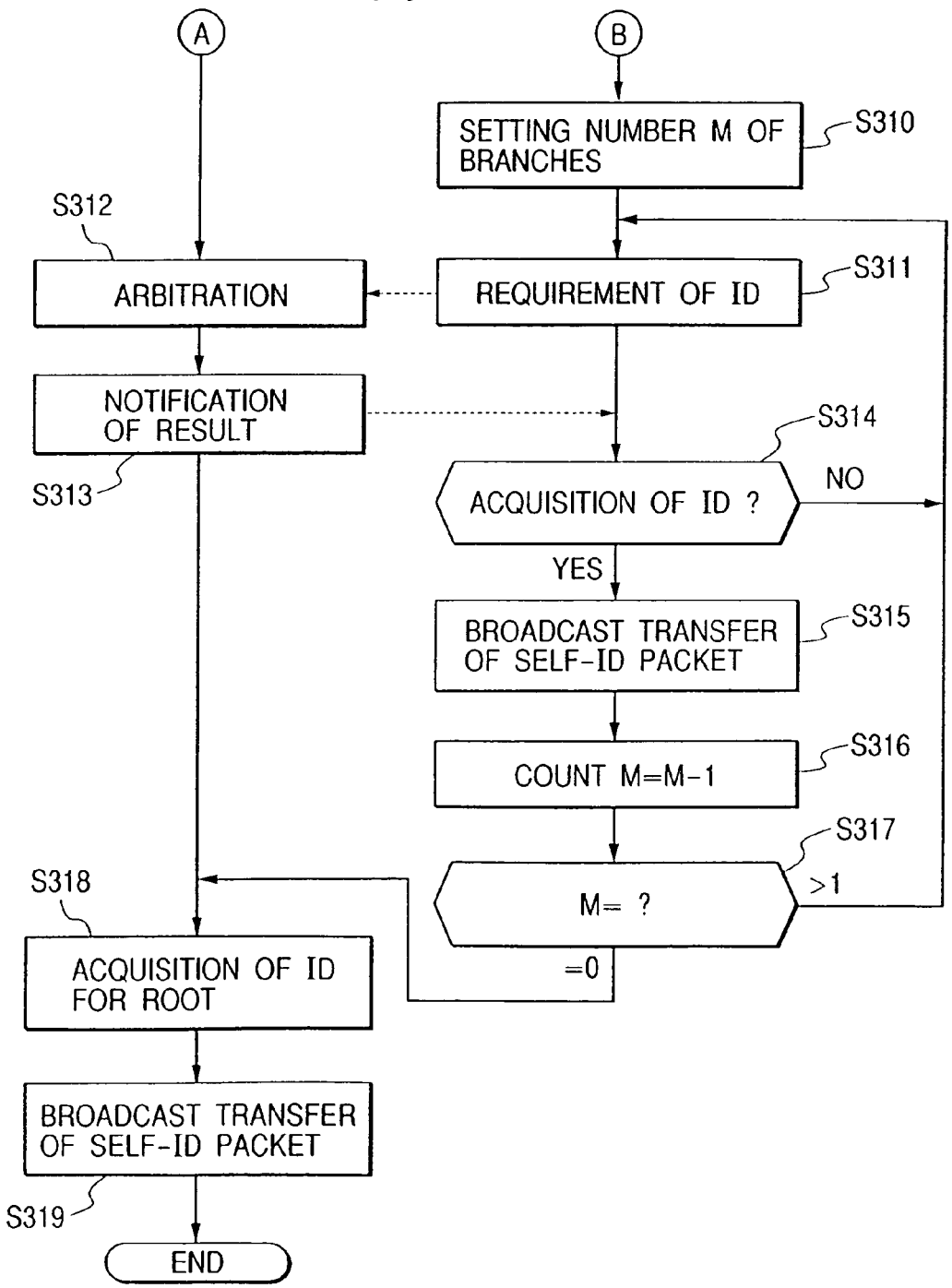
FIG. 10 is a flow chart illustrating processes to be followed by the flow chart shown in FIG. 9.
Figure 9:
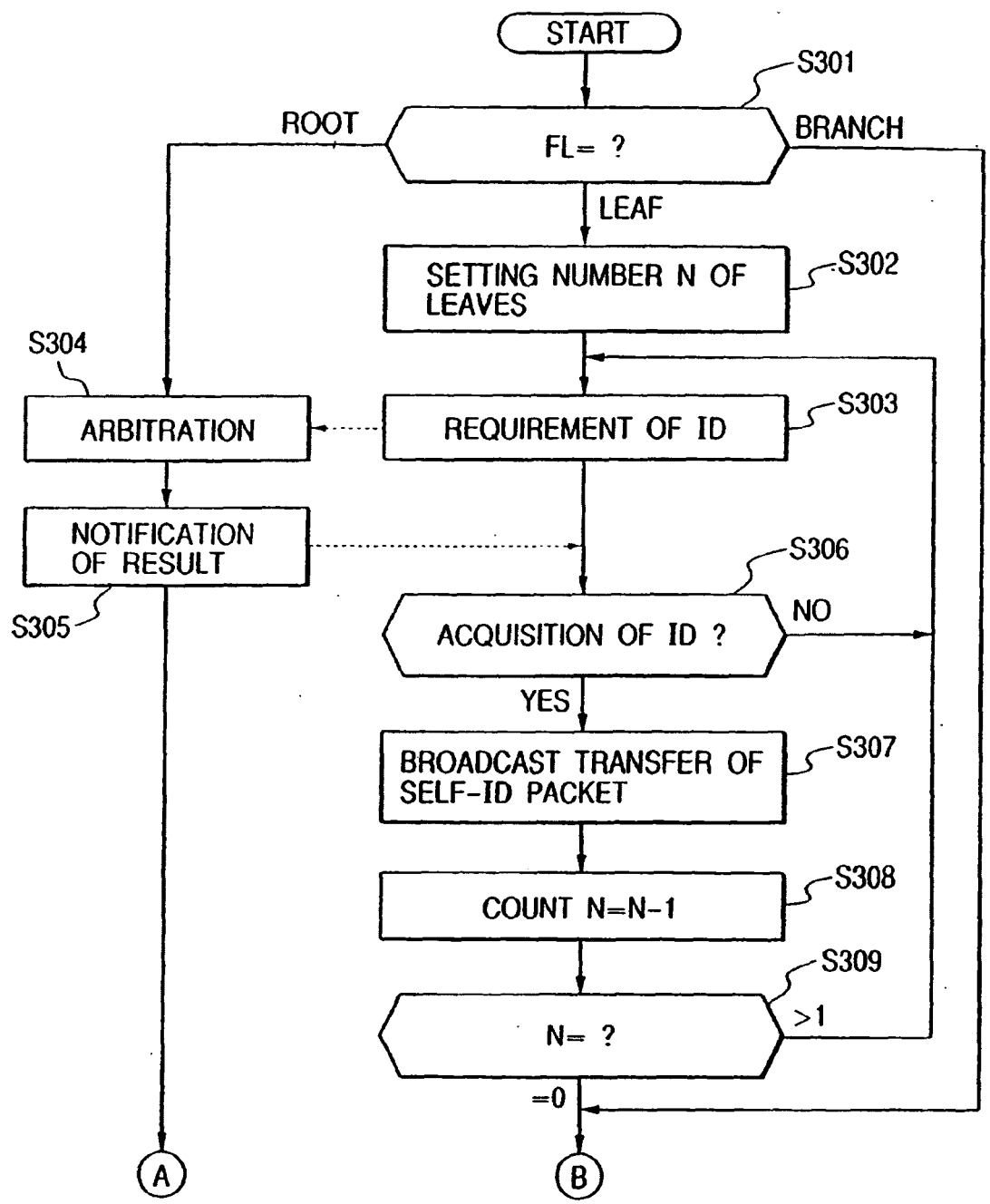
FIG. 9 is a flow chart illustrating the details of processes after the root determination to an ID setting shown in FIG. 7.
Figure 10:
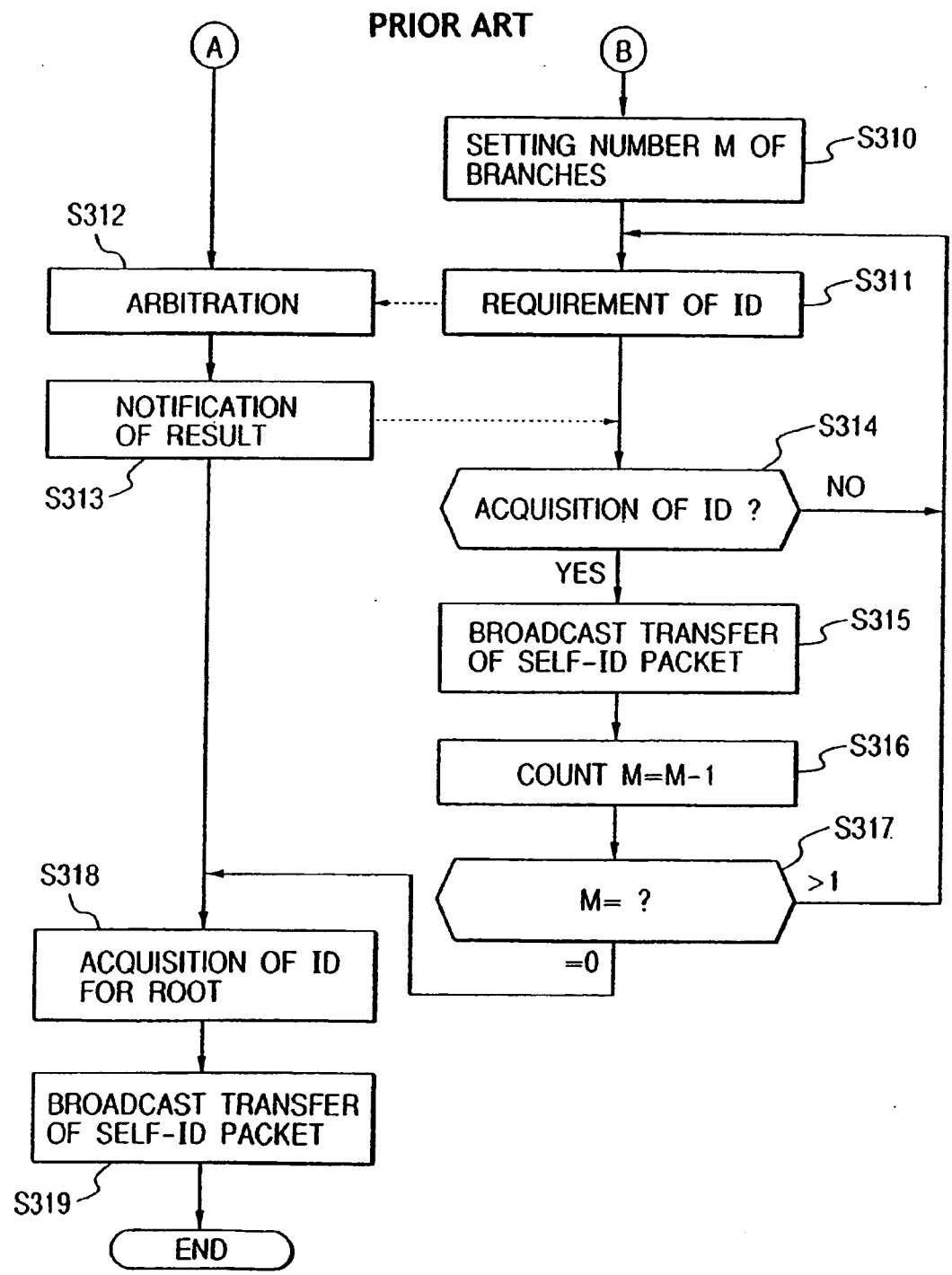
Figure 12A:
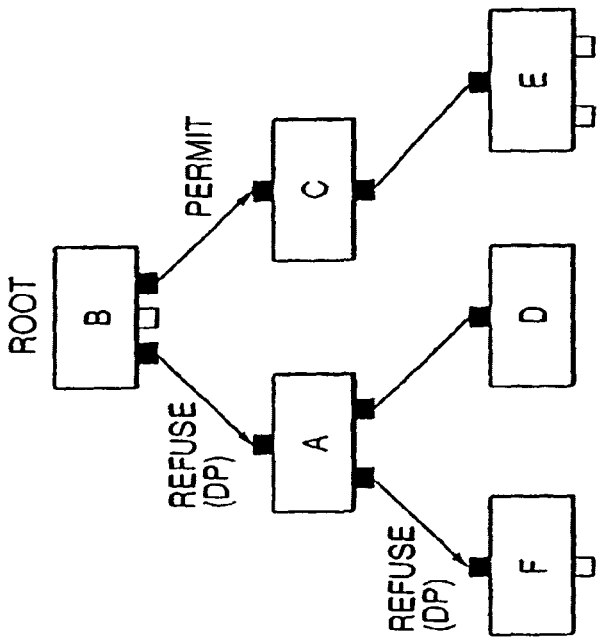
Figure 12B:
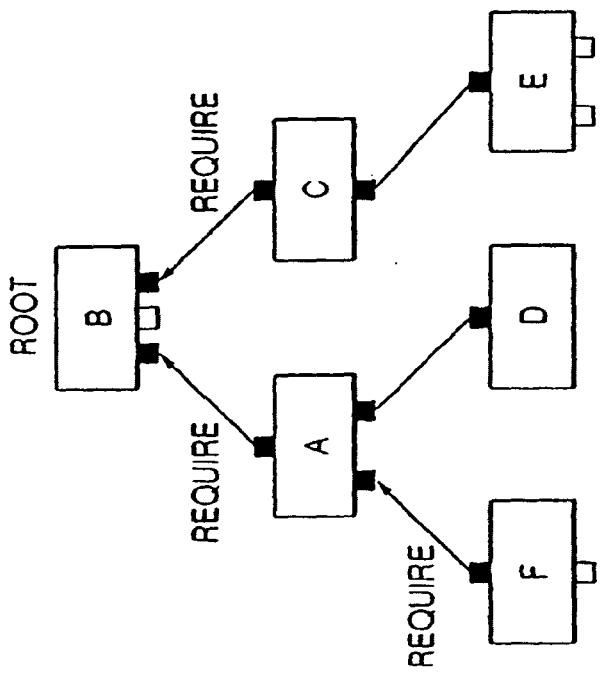

Which node is the bus manager can be recognized by each node by storing broadcasting information as to the information of the ID packets of all other nodes broadcast when the ID was acquired in the processing shown in FIGS. 9 and 10.

The above operations will be described more specifically by taking as an example the network shown in FIG. 11. In the network shown in FIG. 11, nodes A and C are directly connected to a root node B at its lower level. A node D is directly connected to the node C at its lower level. Nodes E and F are directly connected to the node D at its lower level. In this manner, a hierarchical structure of the network is formed.

The procedure of determining such a hierarchical structure, rood node and node IDes is as in the following. After a bus reset is detected, a parent/child relation declaration is made between ports directly connecting respective nodes, in order to confirm the connection state of respective nodes. A parent is at a higher level of the hierarchical structure, and a child is at a lower level. In the example shown in FIG. 11, after a bus reset is detected, the node A issues the parent/child relation declaration at the first time. Basically, the node having a connection at only one port, i.e., a leaf node, can issue the parent/child relation declaration at the first time. This is because a connection at only one port can be confirmed easily. A parent/child relation is determined starting from one of leaf nodes which confirmed that the node is at the end of the network and which operated first.

The port on the node side which made the parent/child relation declaration (node A between nodes A and B) is determined as a child, and the port on the partner side (node B) is determined as a parent. In this manner, child and parent are set to the nodes A and B, child and parent are set to the nodes E and D, and child and parent are set to the node F and D. At the level higher by one level, of the branch nodes having a plurality of connection ports, the parent/child relation declaration at a next higher level is made sequentially starting from the branch node received the parent/child relation declaration from other nodes. In the example shown in FIG. 11, after the parent/child relations between the nodes D and E and between the nodes D and F are determined, the node D issues a parent/child relation declaration to the associated branch node C so that child and parent are set to the nodes D and C. The branch node C received the parent/child relation declaration from the node D issues a parent/child relation declaration to the node B connected to the other port so that child and parent are set to the nodes C and B.

In the above manner, the hierarchical structure shown in FIG. 11 is formed. The node B as a parent for all the other connected nodes becomes the root node. There is only one root node in one network. In the example shown in FIG. 11, although the node B is determined as the root node, the root node may be another node if the node B received the parent/child relation declaration from the node A issues a parent/child relation declaration to the other node at the earlier timing. Namely, depending upon the timing of issuing a declaration, any node has a possibility of becoming the root node, and the root node is not determined unanimously even in the same network configuration.

After the root node is determined, a mode of determining each ID enters. All nodes notify the determined node IDes to other nodes (broadcast function). Self-ID information contains information such as the node number, the connection position, the number of ports, the number of connected ports, and the parent/child relation of each port.

As the procedure of distributing node ID numbers, the leaf node having a connection at only one port can activate the ID determination operation. The nodes numbers 0. 1. 2, . . . are sequentially assigned in the activation order. The node acquired the node ID broadcasts the information including the node number to other nodes. Therefore, each of the other nodes can recognize that the ID number was "already assigned". After all the leaf nodes acquire their IDes, branch nodes acquire IDes. The node IDes following the largest ID number assigned to the leaf node are assigned to branch nodes. Similar to the leaf node, the branch node broadcasts the node ID, sequentially starting from the branch node assigned the node ID number. Lastly, the root node acquires its ID and broadcasts the ID information. The root node has the largest node ID number in the network.

Arbitration

With the 1394 serial bus, prior to data transfer, arbitration for bus use right is essentially performed. The 1394 serial bus configures a logical bus type network in which each apparatus in the network relays a transferred signal to transfer it to all apparatuses (nodes) in the network. Arbitration is therefore necessary in order to avoid packet collision. Only one node can be permitted to transfer data during some period through arbitration.

Figure 12B:
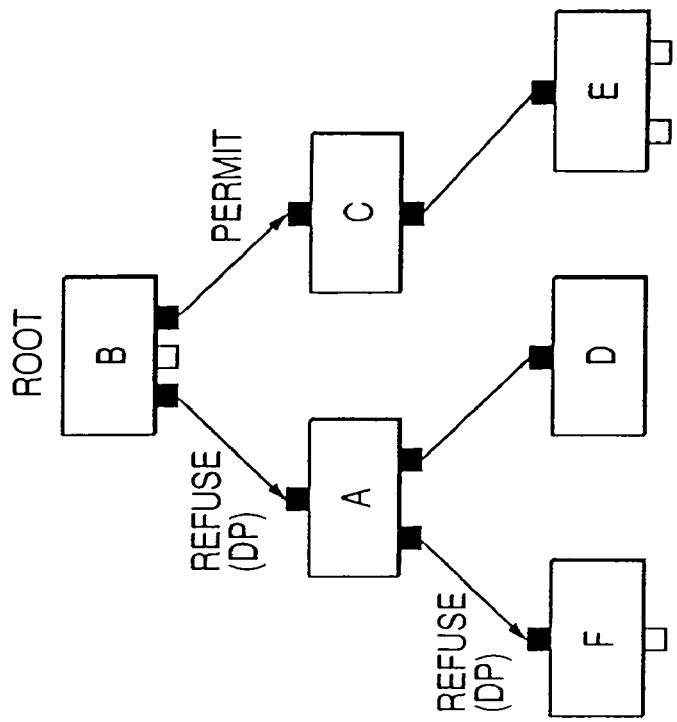
FIGS. 12A and 12B are diagrams illustrating a bus use request and a bus use permission.
Figure 12A:
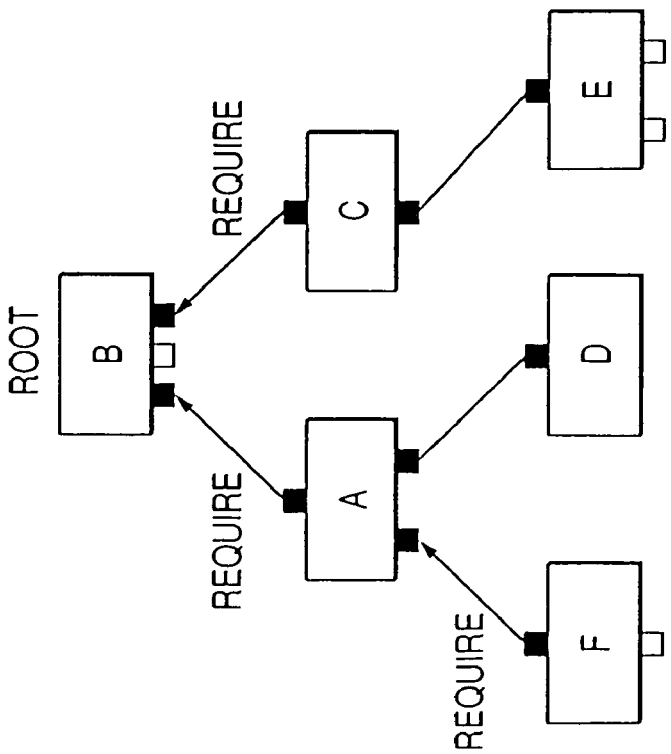

The arbitration operation will be described with reference to FIGS. 12A and 12B. FIG. 12A shows an example of a bus use request. As arbitration starts, one or a plurality of nodes request a bus use right to the parent node. In the example shown in FIG. 12A, nodes C and F request the bus use right. Upon reception of this request, the parent node (node A in FIG. 12A) further requests (relays) the bus user right to the parent node. This request is eventually received by the root node which performs a final arbitration. The root node received the requests for the bus use right determines the node which can use the bus.

This arbitration operation is performed only by the root node. The victory node of arbitration is given the bus use right. In the example shown in FIG. 12B, the node C is permitted to use the bus, and the node F is refused to use the bus. As shown in FIG. 12B, a DP (Data Prefix) packet is transmitted to the arbitration defeat nodes to notify them of a rejection of the bus use request. The bus use request at the rejected node is suspended until the next arbitration. In this manner, the arbitration victory node permitted to use the bus can start data transfer thereafter.

Figure 13:
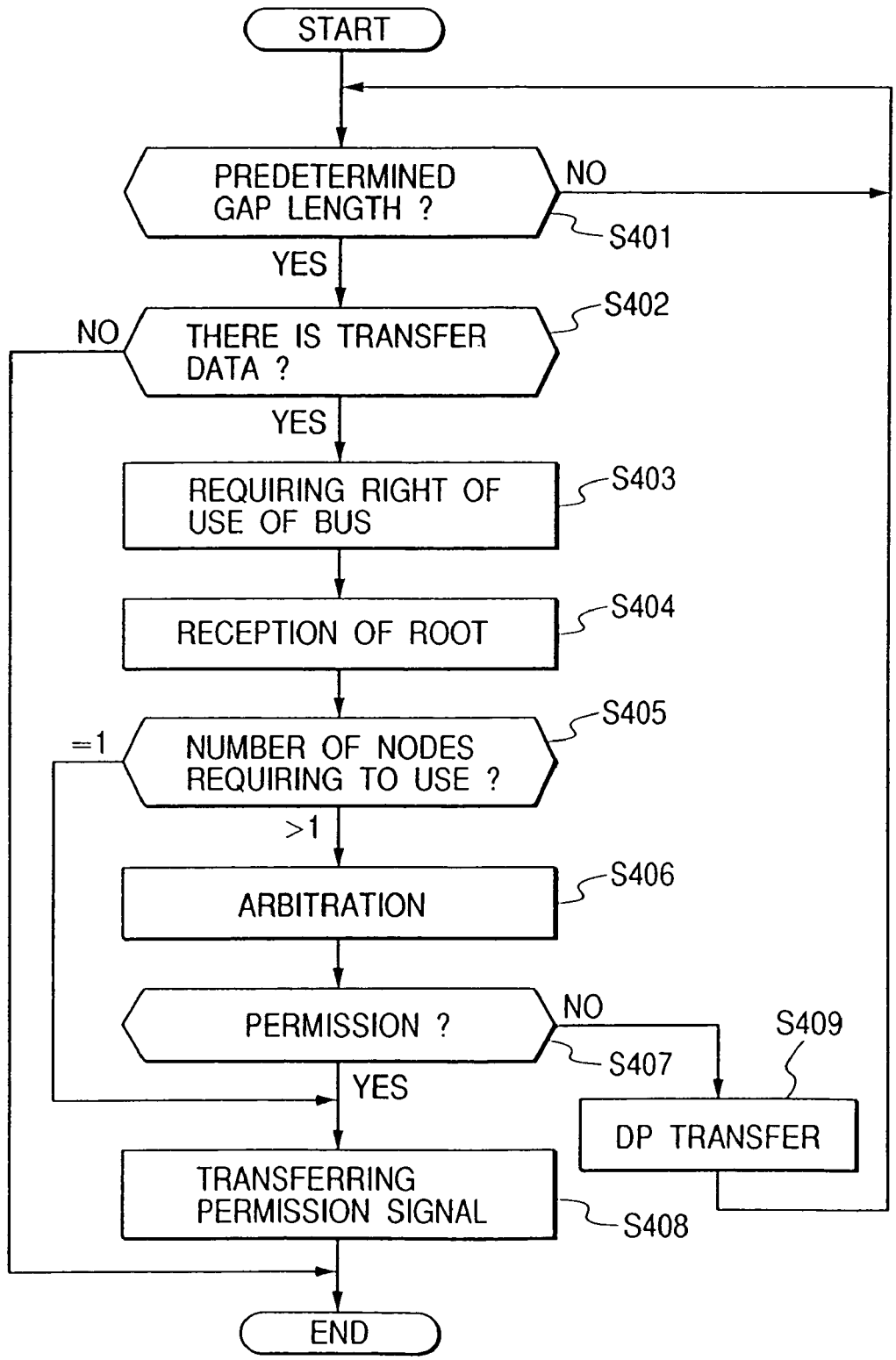
FIG. 13 is a flow chart illustrating an arbitration process for a bus use right.

A series of arbitration operations will be descried with reference to the flow chart shown in FIG. 13. The idle state of the bus becomes necessary in order for the node to start data transfer. In order to confirm whether the bus is presently idle after the completion of previous data transfer, each node judges that data transfer is possible, if a gap length (e.g., subaction gap) of a predetermined idle time independently preset for each transfer mode lapses.

At Step S401 it is judged whether a predetermined gap length preset for each transfer data type such as Async data and Iso data is obtained, in order to check whether the bus is presently in the idle state. Unless the predetermined gap length is obtained, a bus use right permitting the start of data transfer cannot be requested so that the arbitration operation stands by until the predetermined gap length is obtained. If the predetermined gap length is obtained at Step S401, it is judged at Step S402 whether there is data to be transferred. If not, the operation stands by, whereas if there is transfer data, the flow advances to Step S403 whereat a bus use right is requested to the root node to reserve the bus. A signal representative of the bus use right request is relayed by each apparatus of the network as shown in FIG. 12A and eventually received by the root node at Step S404.

Next, when the root node receives at least one bus use right request at Step S404, at Step S405 the root node checks the number of nodes from which the bus use right request was issued at Step S403. If the number of nodes is "1", the node is permitted to use the bus immediately thereafter (Step S408).

If there is a plurality of use right requested nodes, the root node performs at Step S406, an arbitration for determining one node which is permitted to use the bus. This arbitration is performed fairly and a use permission is given equally to nodes without giving it to the same node at each arbitration. Of the plurality of use requested nodes, one node is given the use permission through arbitration by the root node at Step S407 and a bus use permission signal is transmitted to this node at Step S408. The node received this permission signal starts transferring data (packet) immediately after the predetermined gap length having a preset idle time.

To the other use requested nodes not given the use permission at Step S407, a DP (Data Prefix) packet indicating an arbitration failure is transmitted at Step S409. Upon reception of this packet, the flow returns to Step S401 and stands by until the predetermined gap length is obtained in order to again issue a bus use request.

Asynchronous Transfer

Figure 14:
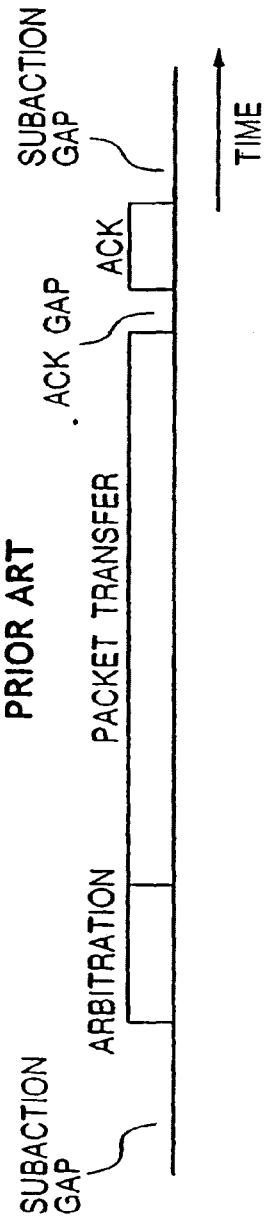
FIG. 14 is a diagram showing a time sequential transition state of an asynchronous transfer.

Asynchronous transfer transfers data asynchronously. A time sequential transition state is shown in FIG. 14. In FIG. 14, the first subaction gap indicates a bus idle time. After this idle time continues a predetermined period, each node wishing to transfer data judges that the bus can be used and requests for arbitration to acquire the bus. When a bus use permission is obtained through arbitration, the data is transferred in the form of packet. The node receiving the transfer data returns a reception confirmation of the transfer data by transmitting either an ack signal (reception confirmation response code) or a response packet after a short ack gap. The ack signal is constituted of four-bit information and four-bit check sum. The four-bit information contains information indicating a reception success, a busy state, or a pending state.

Figure 15:
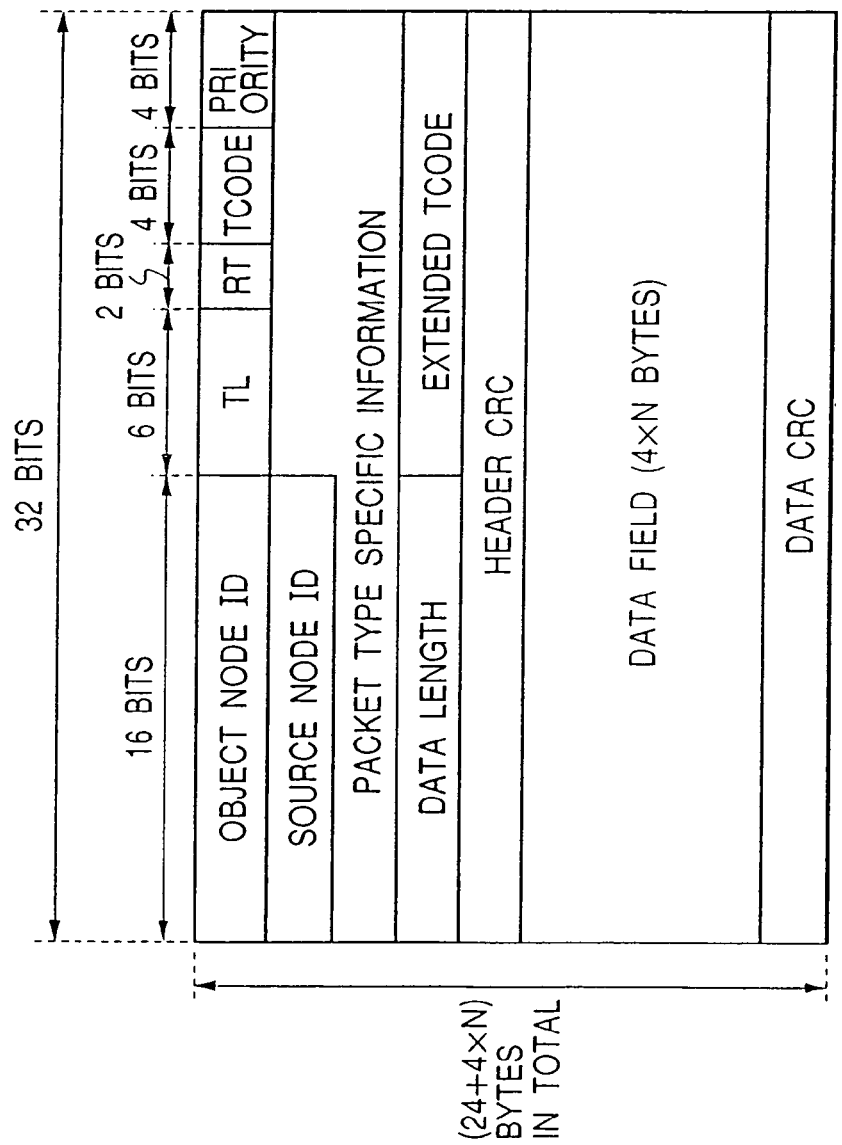
FIG. 15 is a diagram showing an example of a packet format of the asynchronous transfer.

FIG. 15 shows an example of a packet format used by asynchronous transfer. A packet for asynchronous transfer includes a data field, an error correction data CRC field and a header field. As shown in FIG. 15, the header field stores therein an object node ID, a source node ID, a transfer data length, various codes and the like. Asynchronous transfer is one-to-one communications between each node and a partner node. An asynchronous transfer packet transferred from a transfer source node is distributed to respective nodes on the network. However, a packet destined to other nodes different from the object node is neglected so that only the node destined to the object node can be read.

Isochronous Transfer

Isochronous transfer transfers data isochronously. The isochronous transfer which may be called the most characteristic feature of the 1394 serial bus, is particularly suitable for a mode necessary for real time transfer of data such as multimedia data including video data and audio data. The asynchronous transfer is one-to-one data transfer, whereas the isochronous transfer provides a broadcast function of transferring data from one node to all other nodes equally.

Figure 16:
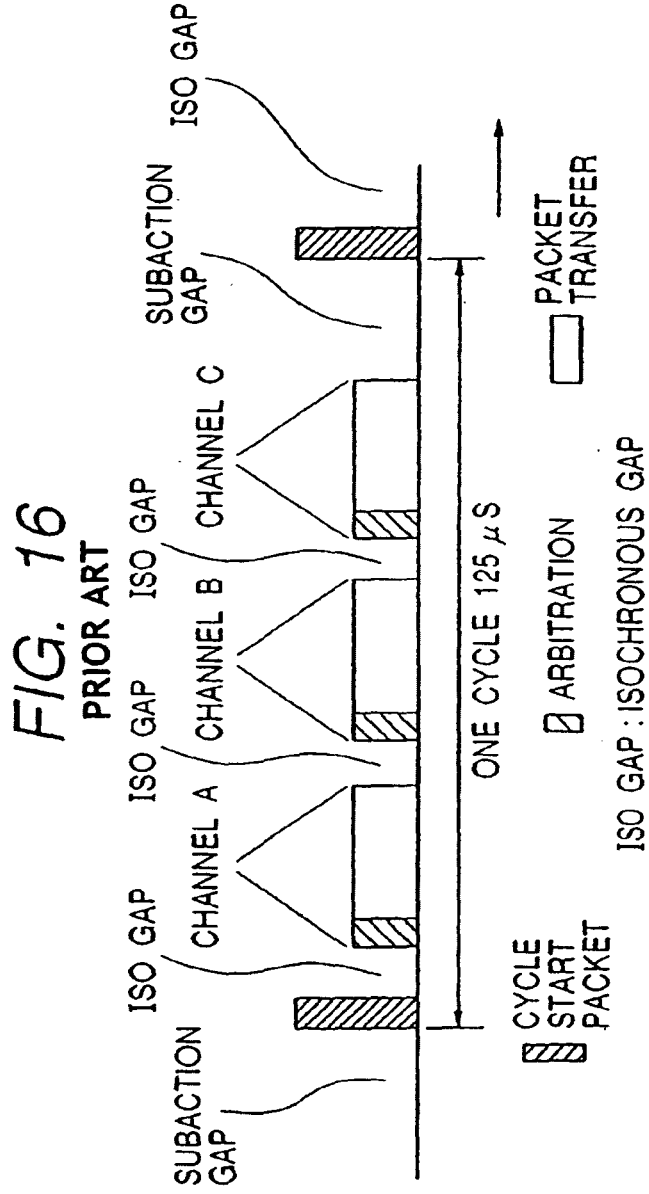
FIG. 16 is a diagram showing a time sequential transition state of an isochronous transfer.
Figure 15:
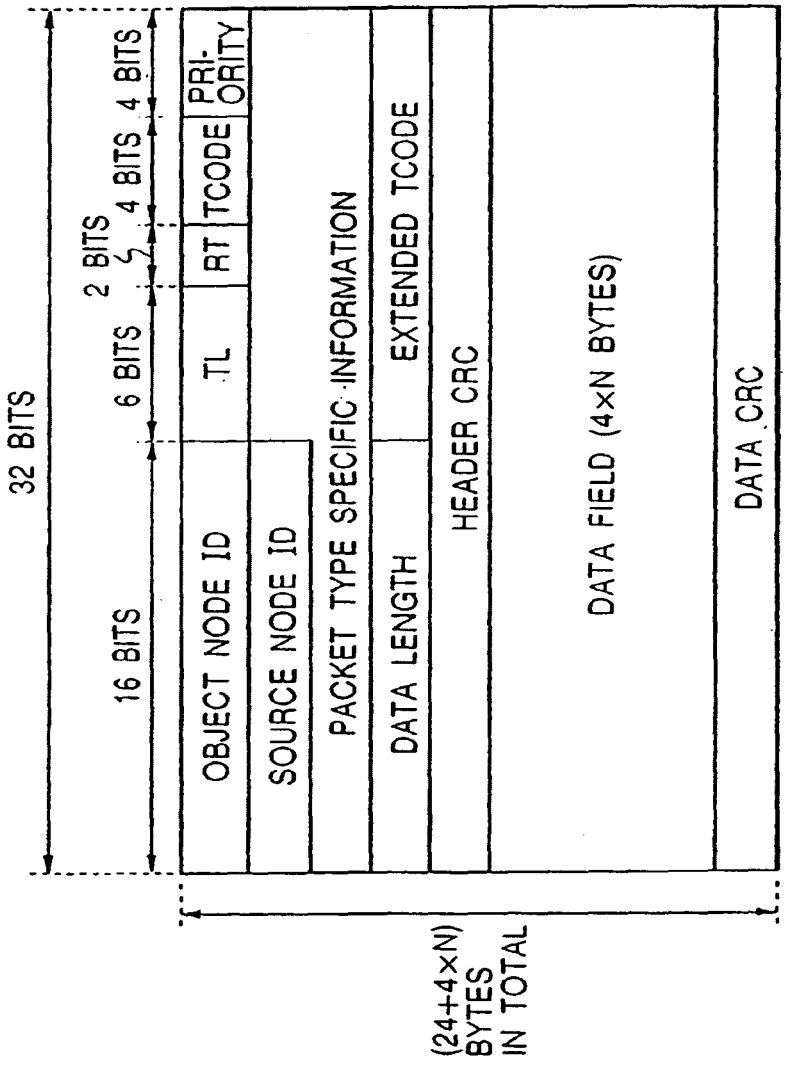
Figure 17:
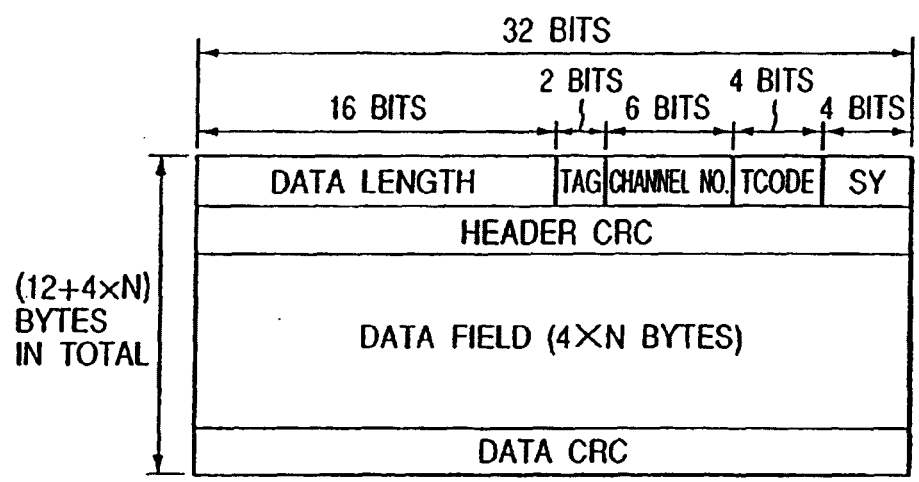
Figure 18:
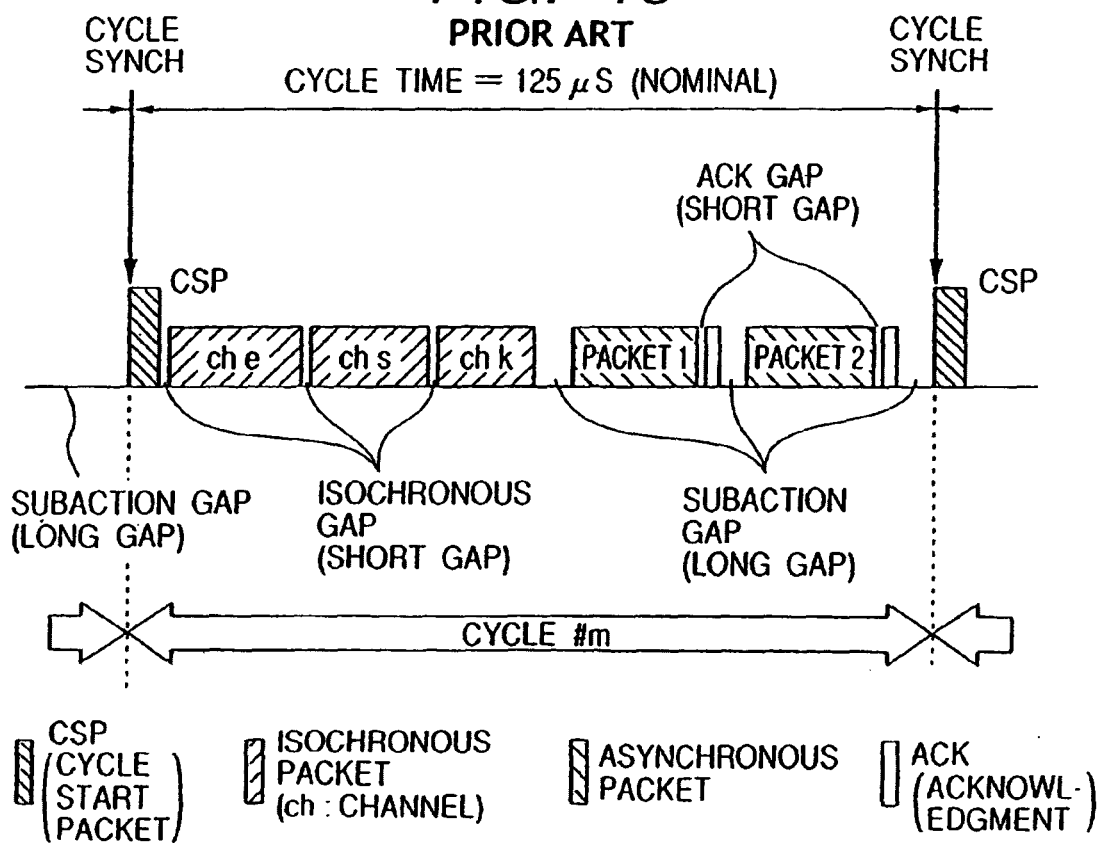
Figure 19:
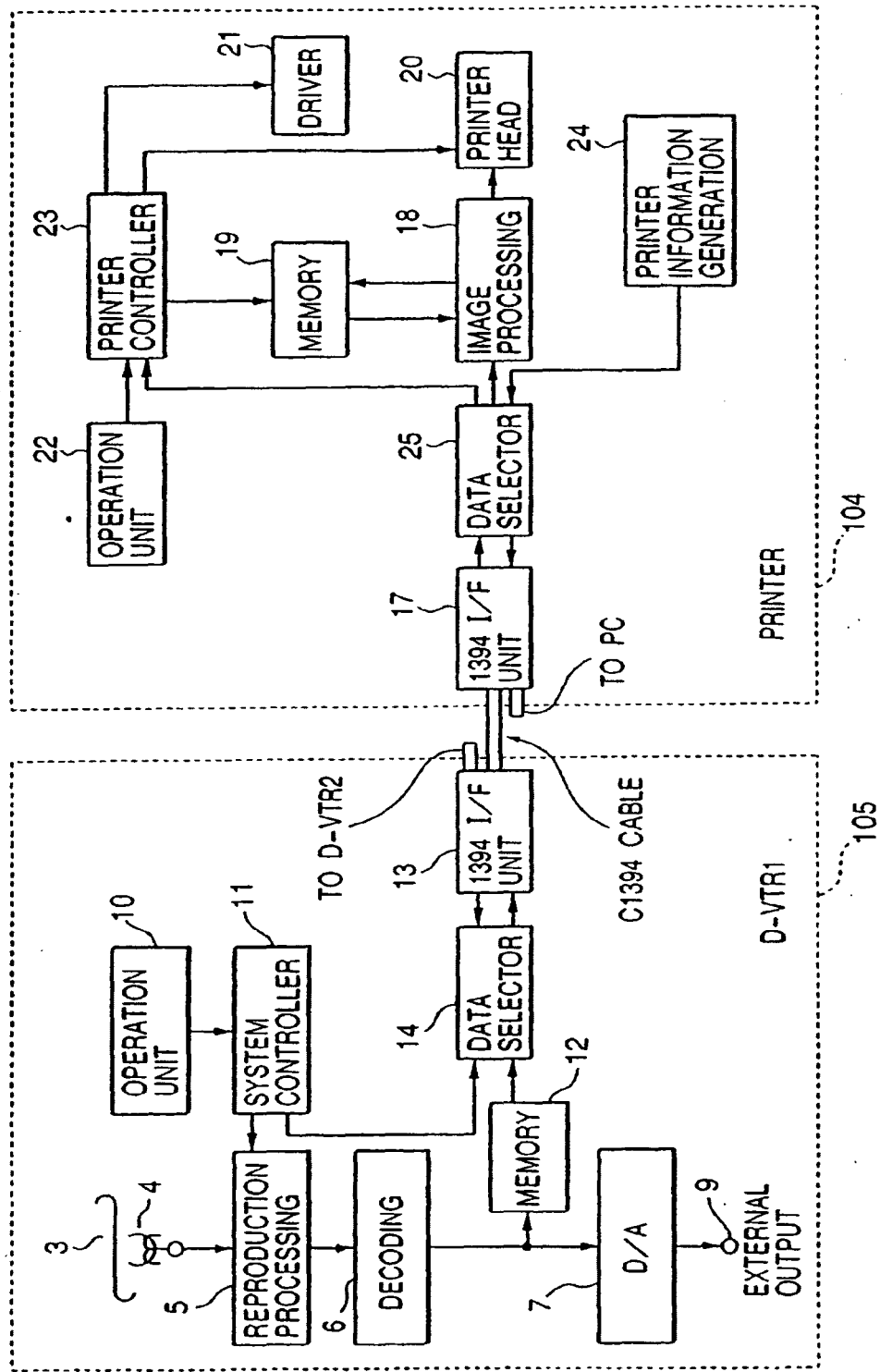
Figure 33:
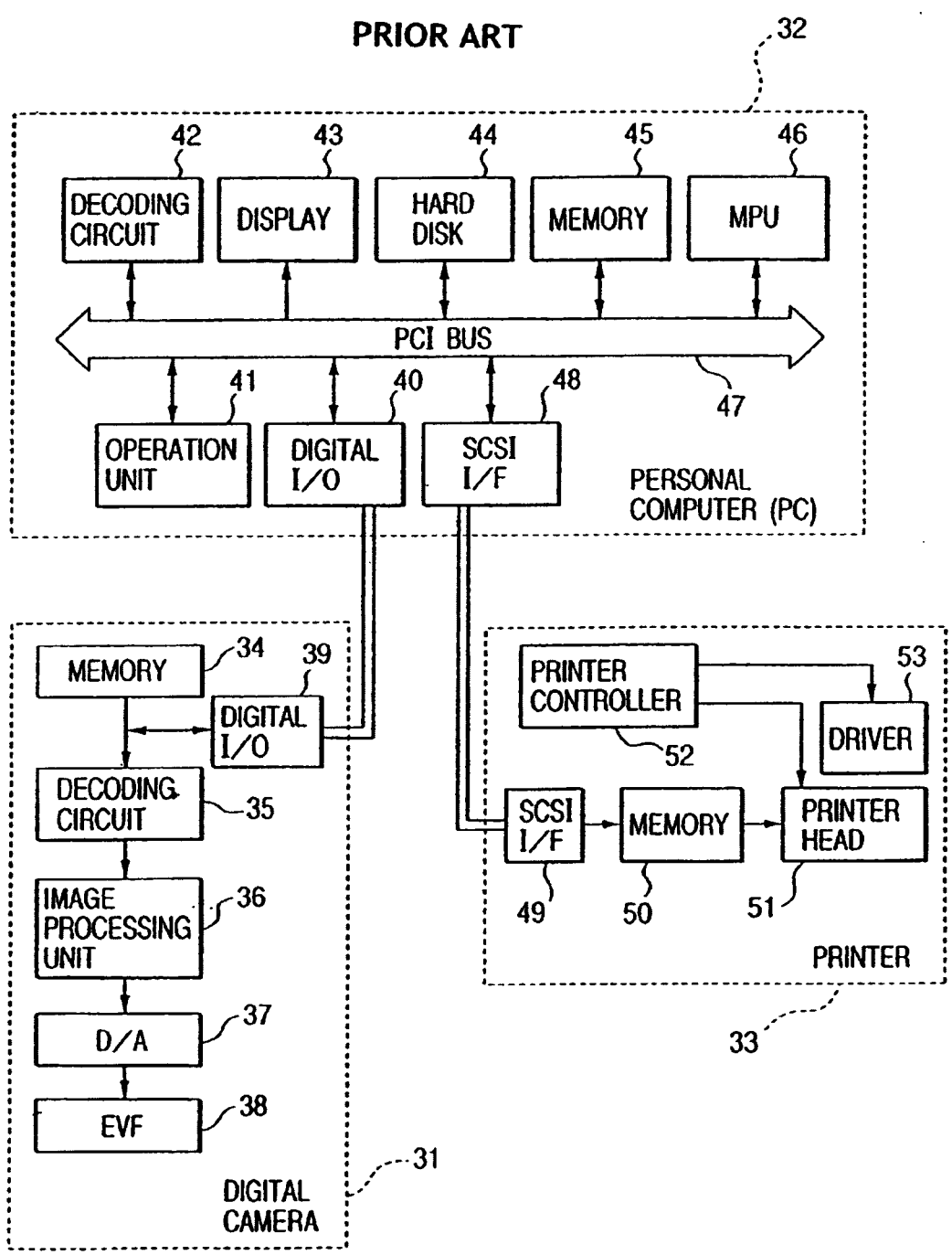
FIG. 33 is a diagram showing an example of a conventional data communications system using SCSi.

FIG. 16 is a diagram showing a time sequential transition state of isochronous transfer. The isochronous transfer is performed at a predetermined time interval on the bus. This time interval is called an isochronous cycle which is 125 $\mu$s. A cycle start packet indicates a start time of each cycle and has a roll of adjusting time at each node. The cycle start packet is transmitted from a node called a cycle master. The cycle start packet indicating the start of each cycle is transmitted after a lapse of a predetermined idle time (subaction gap) after the completion of data transfer during the period one cycle before. This cycle start packet is transmitted at an time interval of 125 $\mu$s.

A plurality type of packets with channel IDes of channel A, channel B and channel C shown in FIG. 16 can be discriminately transmitted during one cycle. Therefore, real time data transfer between a plurality of nodes can be performed during one cycle. The reception node can receive the data having only a desired channel ID. The channel ID is not a destination address but it is only a theoretical number of data. Therefore, each packet is broadcast from one source node to all other nodes.

Prior to transmission of an isochronous packet, arbitration is performed similar to the asynchronous transfer. However, since the isochronous transfer is not one-to-one communications like the asynchronous transfer, the isochronous transfer does not use the ack signal (reception confirmation response code). An iso gap (isochronous gap) shown in FIG. 16 corresponds to an idle period necessary for confirming a bus idle state prior to performing isochronous transfer. After this idle period, a node wishing to perform isochronous transfer judges that the bus is idle, and can request for arbitration before data transfer.

Figure 17:
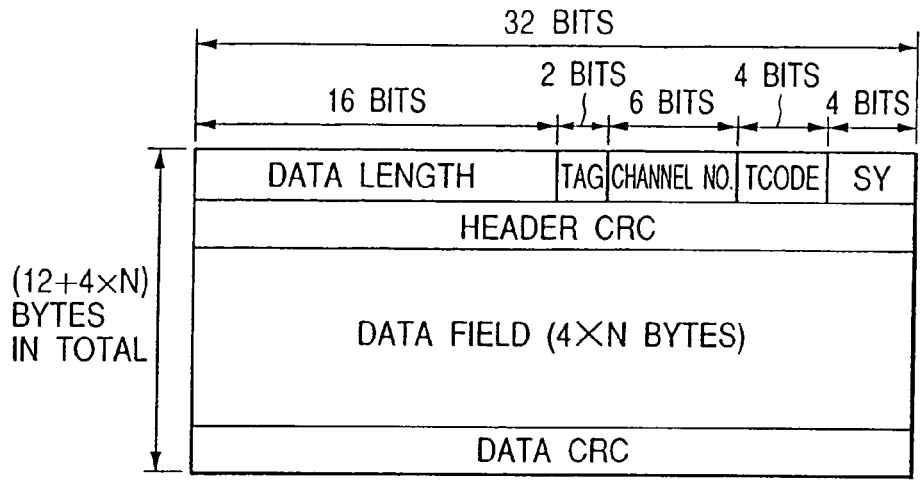
FIG. 17 is a diagram showing an example of a packet format of the isochronous transfer.

FIG. 17 shows an example of the packet format of isochronous transfer. The packet of each channel has a data field, an error correction data CRC field and a header field. As shown in FIG. 17, the header field stores therein a transfer data length, a channel number, various codes, error correction header CRC and the like.

Bus Cycle

Figure 18:
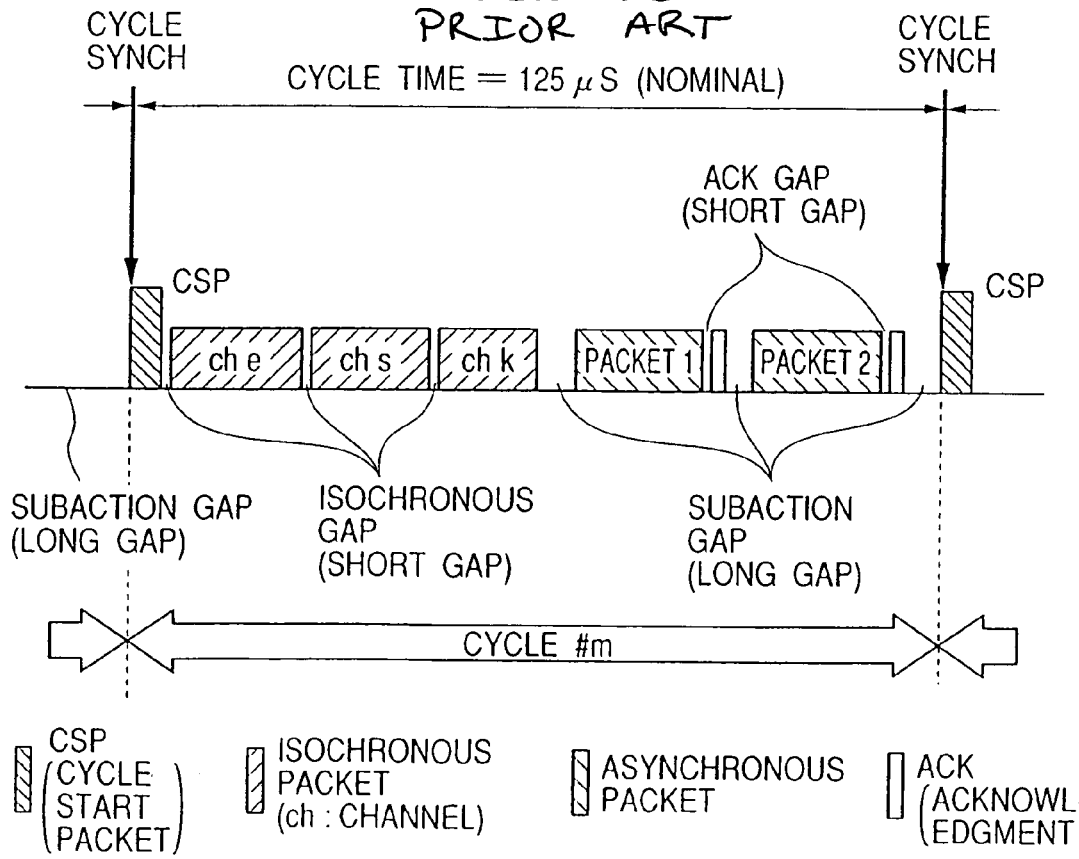
FIG. 18 is a diagram showing a time sequential transition state of a combination of the isochronous transfer and asynchronous transfer.

In a practical data transfer on the 1394 serial bus, isochronous transfer and asynchronous transfer can be mixed. FIG. 18 shows a time sequential transition state of mixed isochronous and asynchronous transfers on the bus. As shown, the isochronous transfer is executed with a priority over the asynchronous transfer. The reason for this is that after the cycle start packet, the isochronous transfer can be activated at a gap length (isochronous gap) shorter than an idle period gap length (subaction gap) necessary for activating the asynchronous transfer.

In a general bus cycle shown in FIG. 18, when the cycle #m starts, a cycle start packet is transmitted from the cycle master to each node. Each node adjusts time by using this cycle start packet. After a predetermined idle period (isochronous gap), a node which wishes isochronous transfer requests for arbitration in order to transfer a packet.

In the example shown in FIG. 18, packets of channel e, s and k are sequentially and isochronously transferred. This operation from arbitration request to packet transfer is repeated as many times as the number of channels. After all the isochronous transfers during the cycle #m are completed, the asynchronous transfers are executed. When the idle time lapses by the amount of the subaction gap allowing the asynchronous transfer, the node wishing asynchronous transfer judges that it is possible to request for arbitration.

The asynchronous transfer is permitted only when the subaction gap for activating the asynchronous transfer is obtained during the period after the completion of asynchronous transfer and before the time (cycle synch) when the next cycle start packet is transmitted.

In the cycle #m shown in FIG. 18, the isochronous transfers for three channels and the asynchronous transfers for two packets 1 and 2 including ack signals are executed. After the asynchronous packet 2 is transferred, it becomes the time (cycle synch) for the next cycle #(m+1) so that the data transfer during the cycle #m is terminated until this time.

If it becomes the time (cycle synch) for the next cycle start packet during an asynchronous or isochronous transfer operation, the transfer operation is not intercepted by all means, but the idle period after the completion of this transfer operation is awaited and then the cycle start packet for the next cycle is transmitted. More specifically, if one cycle continues longer than 125 $\mu$s, the next cycle is shortened correspondingly more than the nominal 125 $\mu$s.

Although the period of each cycle can be prolonged or shortened more than the nominal 125 $\mu$s, the isochronous transfer is executed always at each cycle in order to preserve the real time transfer, whereas the asynchronous transfer is passed if necessary to the next or following cycle when the cycle time is shortened. Considering also such delay information, the cycle master adjusts time at each node.

Figure 19:
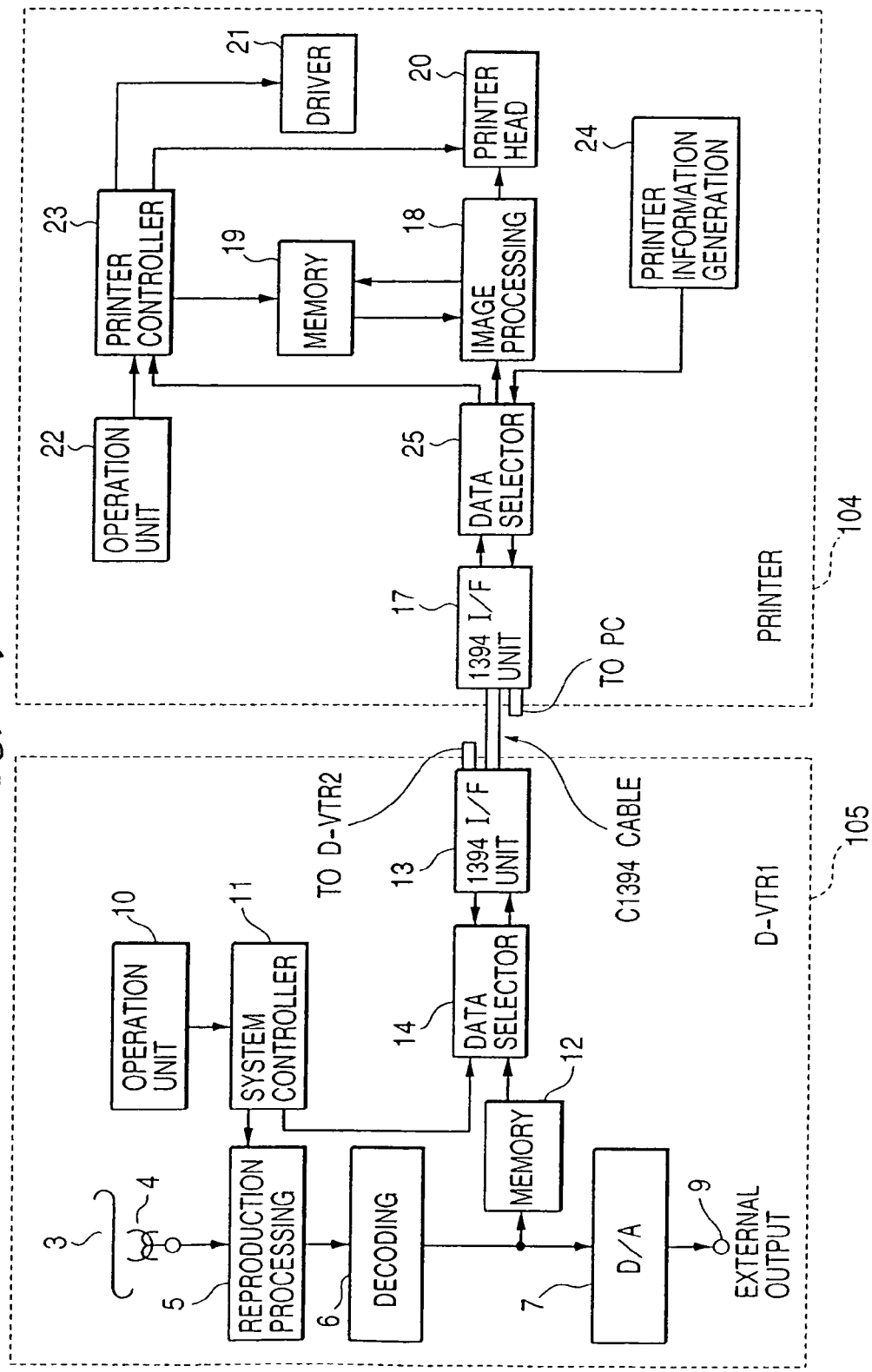
FIG. 19 is block diagram of an information transfer path including IEEE 1394 I/F units.

FIG. 19 is a block diagram showing a portion of the printer 104 and D-VTR 105 in the network configuration shown in FIG. 1. The characteristic features of this invention will be described with reference to FIGS. 19 to 32.

In D-VTR 105 shown in FIG. 19, reference numeral 3 represents a magnetic tape, reference numeral 4 represents a recording/reproducing head, reference numeral 5 represents a reproduction processing unit, reference numeral 6 represents a video decoding unit, reference numeral 7 represents a D/A converter, reference numeral 9 represents an output terminal, reference numeral 10 represents an operation unit, reference numeral 11 represents a system controller for VTR, reference numeral 12 represents a frame memory, reference numeral 13 represents a 1394 interface (I/F) unit, and reference numeral 14 represents a selector for selecting specific data from a plurality type of data. In FIG. 19, only the reproducing system of D-VTR 105 is shown.

In the printer 104 shown in FIG. 19, reference numeral 17 represents a 1394 interface (I/F) unit for the printer, reference numeral 18 represents an image processing unit for rasterizing image data so as to print it at the printer, reference numeral 19 represents a memory for storing rasterized image data, reference numeral 20 represents a printer head, reference numeral 21 represents a driver for driving the printer head 20 and feeding a print sheet, reference numeral 22 represents an operation unit for the printer, reference numeral 23 represents a printer controller for controlling the whole operation of the printer 104, reference numeral 24 represents a printer information generation unit for generating printer information such as the operation state, resolution, and color/monochrome print performance of the printer 104, and reference numeral 25 represents a data selector.

In D-VTR 105 constructed as above, image data recorded on the magnetic tape 3 is read with the recording/reproducing head 4, and the reproduction processing unit 5 converts the read image data into data of the reproduction format. Since the read image data was recorded after it was encoded by a predetermined home use digital video band compression method such as DCT (discrete cosine transform) and VLC (variable length coding), the decoding unit 7 executes a predetermined decoding process. After the image data is converted into analog signals by the D/A converter 7, it is output via the external terminal 9 to an external apparatus.

If desired image data and the like is to be transferred to another node by using a 1394 serial bus (1394 cable C), the image data decoded by the decoding unit 6 is temporarily stored in the frame memory 12, and transferred via the data selector 14 to the 1394 I/F unit 13 and transferred via the 1394 cable C, for example, to the printer 104 and PC 103. The data selector 14 transfers the image data as well as various control data from the system controller 11 to the 1394 I/F unit 13. If the transferred image data is data to be directly printed on the printer 104, the printer 104 receives the image data via the 1394 I/F unit 17, whereas if the image data is data to be transferred to another node such as PC 103, the image data is transferred via the 1394 I/F node 17 to the object node.

A reproduction operation or the like of D-VTR 105 is instructed from the operation unit 10. In accordance with an instruction entered from the operation unit 10, the system controller 11 controls the VTR reproduction processing unit and other necessary circuits. Depending upon an entered instruction, for example, the system controller 11 supplies a control command to the printer 104 to transfer image data to the printer 104 via the data selector 14, 1394 I/F unit 13, and 1394 cable C.

Printer data such as printer operation state data supplied from the printer 104 via the 1394 cable C can be received at the system controller 11 via the 1394 I/F unit 13 and data selector 14. If the printer data is not necessary for D-VTR 105, it is not supplied to the system controller 11 but is transferred to D-VTR 106 via the 1394 I/F unit 13 and 1394 cable C (refer to the connection state shown in FIG. 1). The printer data may be transferred to PC 103 via the 1394 I/F unit 17 and 1394 cable of the printer 104.

The data selectors 14 and 25 of D-VTR 105 and printer 104 select input/output data and discriminately supply the selected data to proper circuit elements.

Next, the operation of the printer 104 will be described. Data input to the 1394 I/F unit 17 is classified into each data type by the data selector 25. Data to be printed is supplied to the image processing unit 18 whereat it is processed to be converted into data suitable for printing, and stored as print image data in the memory 19 under the control of the printer controller 23. The printer controller 23 operates to transfer the print image data read from the memory 19 to the printer head 20 to print it out. The control of the printer head 20 and the control of paper feed are performed by the driver 21 under the control of the printer controller 23. That is, the printer controller 23 controls the print operation indirectly. The operation unit 22 of the printer 104 enters instructions for various operations such as paper feed, reset, ink check, and printer standby/stop. In accordance with an entered instruction, each circuit portion is controlled by the printer controller 23.

If data input to the 1394 I/F unit 17 is command data for the printer 104 issued from PC 103, D-VTR 105 or the like, this command data is transferred via the data selector 25 to the printer controller 23 which then controls each circuit portion of the printer. The printer information generation unit 24 generates printer information such as a printer operation state, a message indicating a print end or a print ready state, an alarm message indicating paper jamming, operation error, ink presence/absence or the like, and print image information. This printer information can be supplied to another port via the data selector 25 and 1394 I/F unit 17.

In accordance with the output printer information, PC 103 and D-VTR 105 execute a display process and data process matching the printer state. A user looking at a message and print image information displayed on PC in accordance with the printer information (also on D-VTR 105 if it has a direct print function), can enter a proper command from PC 103 (also from D-VTR 105) to supply it via the 1394 serial bus to the printer 104 so that the operation of each circuit portion of the printer 104 and the operation of the image processing unit 18 can be controlled by the printer controller 23.

As above, image data and various types of command data are transferred via the 1394 serial bus interconnecting PC 103, D-VTR 105 and printer 104. The method of transferring data from D-VTR 105 is in conformity with the previously described 1394 serial bus specifications. Over the 1394 serial bus, video data (and audio data) is mainly transferred as Iso data by the isochronous transfer method, and command data is transferred as Async data by the asynchronous transfer method.

Some data is more preferably transferred through asynchronous transfer than through isochronous transfer. In such a case, the asynchronous transfer method is used always. Printer data supplied from the printer is transferred as Async data by the asynchronous transfer method. However, data having a large capacity, such as image data, is transferred as Iso data by the isochronous transfer method.

In the network configured as shown in FIG. 1 by using the 1394 serial bus, data can be bidirectionally transferred from D-VTR 105 and printer 104 to PC 103, D-VTR 106, DVD player 107, CD player 108, AV amplifier 102 and TV monitor 101 according to the 1394 serial bus specifications.

The TV monitor 101, AV amplifier 102, PC 103, D-VTR 106, DVD player 107, and CD player 108 each have function control units specific to each apparatus. However, they have the data selector and 1394 I/F unit similar to those of D-VTR 105 and printer 104 which are essential for data communications over the 1394 serial bus so as to properly transfer input/output data to and from each circuit block of the apparatus. The outline of IEEE 1394 technologies have been described above.

Figure 20:
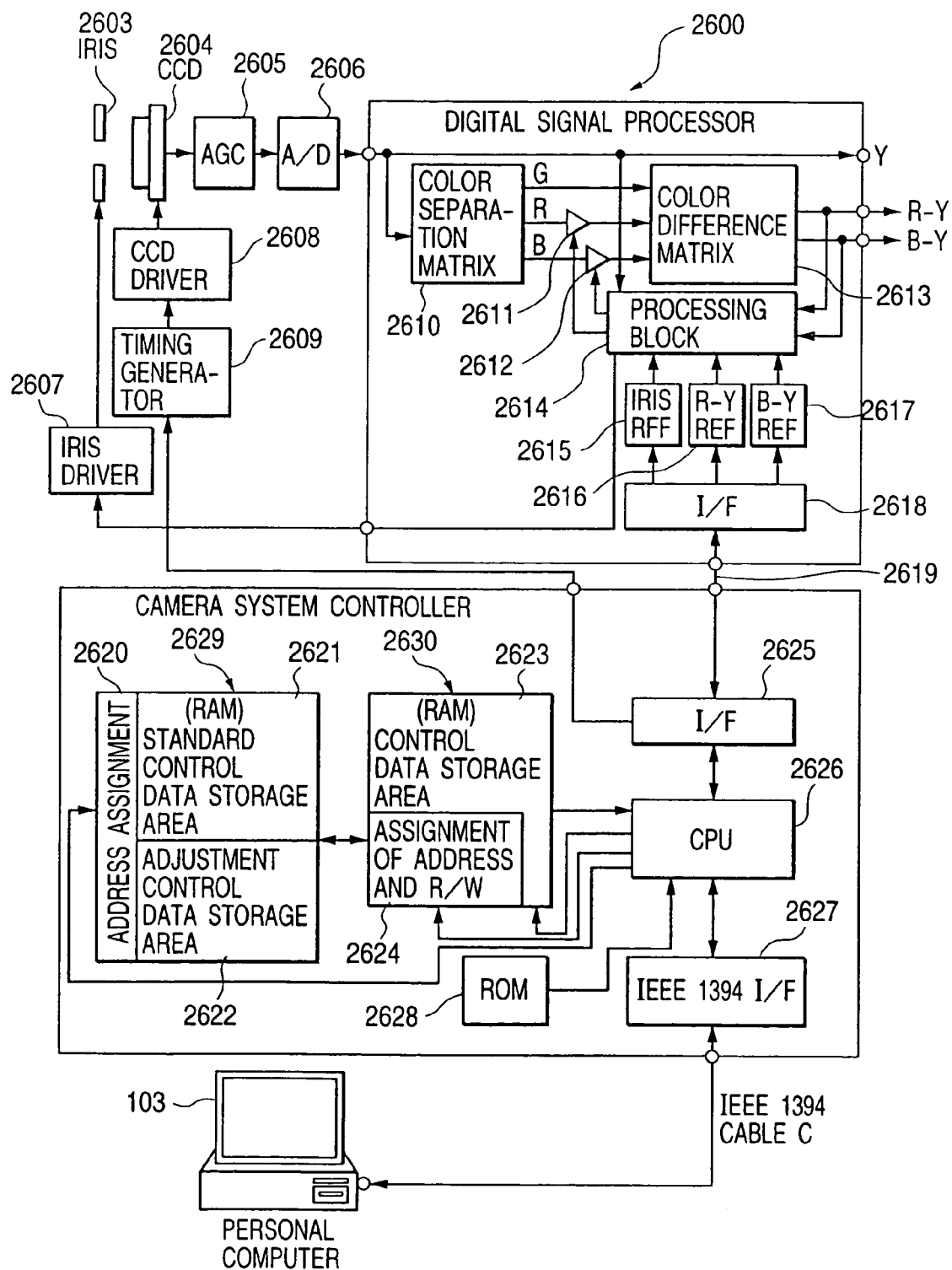
FIG. 20 is a block diagram showing the outline structure of a video camera according to an embodiment of the invention.

FIG. 20 is a block diagram of a video camera 2600 having an IEEE 1396 serial I/F unit. The video camera 2600 is mainly classified into an image pickup unit, a digital signal processor 2601, and a camera system controller 2602, the image pickup unit being constituted of an unrepresented optical lens unit, an iris stop 2603, a CCD 1604, an AGC circuit 2605, an A/D converter 2606, an iris stop driver 2607, a CCD driver 2608, and a timing generator 2609.

Image light focussed on an image pickup plane of CCD 2604 via the optical lens unit and iris stop 2603 is photo-electrically converted by CCD 2604 into analog image signals. The analog image signal is amplified by the AGC circuit 2605 and converted by the A/D converter 2606 into a digital signal which is input to the digital signal processor 2601.

Of the image signal input to the digital signal processor 2601, a luminance component Y is input to a signal processing block 2614 whereat the level of the luminance component is compared with a reference signal generated by an iris stop control reference signal generator 2615. A comparison result from the signal processing block 2614 is supplied to the iris stop driver 1607 to automatically control the iris stop 2603 so that an iris stop value suitable for exposure light can be obtained always.

Of the image signal input to the digital signal processor 2601, a color signal component is input to a color separation matrix 2610. The color separation matrix 2610 separates the color signal into three color signal components of R (red), G (green) and B (blue). Of these, the R and B color signal components are input to level control circuits 2611 and 2612 to control the levels thereof. The G color signal component and the R and B color signal components output from the level control circuits 2611 and 2612 are input to a color difference matrix 2613 to be converted into R-Y and B-Y color difference signals.

Similar to the iris stop value control, for the level control of the color signal components, the levels of the R-Y and B-Y color difference signals output from the color difference matrix 2613 are compared by the signal processing block 2614 with the reference signals generated by R-Y and B-Y level control reference signal generators 2616 and 2617, and a comparison result is supplied from the signal processing block 2614 to the level control circuits 2611 and 2612. With this level control for the color signal components, a proper white balance can be obtained always.

A time for accumulating electric charges corresponding to the amount of light focussed on the image pickup plane of CCD 2604 in each cell of CCD 2604, i.e., a shutter speed, is controlled by a CCD drive signal supplied from the timing generator 2609 to CCD 2604 via the CCD driver 2608. The timing generator 2609 is connected to an I/F unit 2625 of the camera system controller 2602, and controls the CCD accumulation time in accordance with a control command from a CPU 2626. The output levels of the iris stop control reference signal generator 2615 and R-Y and B-Y level control reference signal generators 2616 and 2617 are also controlled in accordance with control signals supplied from the camera system controller 2602 via IF units 2625 and 1618.

The camera system controller 2602 of the video camera 2600 can communicate with an external PC 103 via a 1394 cable C and a 1394 I/F unit 2627. With this communications function, it is possible to control the video camera 2600 externally from PC 103. Namely, in accordance with camera control commands from PC 103, CPU 2626 supplies signals for changing the levels of signals to be output from the iris stop control reference signal generator 2615 and R-Y and B-Y level control reference signal generators 2616 and 1617, to thereby change reference values for the iris stop value, R-Y and B-Y levels and control the iris stop value, color hue and density from the external.

The reference values of the levels of signals to be output from the iris stop control reference signal generator 2615 and R-Y and B-Y level control reference signal generators 2616 and 1617, are stored in a standard control data storage area 2621 of a RAM 2629. Usually, data in this area 2621 is transferred to a control data storage area 2623 of a RAM 2630 and then the control condition data is supplied to the iris stop control reference signal generator 2615, R-Y and B-Y level control reference signal generators 2616 and 1617, and timing generator 2609, so that a proper photographing condition can be automatically set.

In controlling the video camera 2600 from PC 103, the camera control commands transmitted from PC 103 to the 1394 I/F unit 2627 are changed to data suitable for the video camera 2600 by CPU 2626 and then supplied to the digital signal processor 2600 via the I/F unit 2625. Data output from the I/F unit 2625 to the digital signal processor 2601 is also stored in an adjustment control data storage area 2622 of RAM 2629, and read by CPU 2626 via the control data storage area 2623 when necessary. In this manner, camera control information supplied from PC 103 is temporarily stored in the video camera 2600 and read when necessary to repeat similar controls.

CPU 2626 controls an access to RAMs 2629 and 2630 via an address assignment unit 2620 and an address and R/W assignment unit 2624. When the photographing condition set by PC 103 is set, the data in the adjustment control data storage area 2622 is written in the control data storage area 2623, whereas when the standard photographing condition is set, the data in the standard control data storage area 2621 is written in the control data storage area 2623.

A ROM 2628 is preset with control programs corresponding to the flow charts shown in FIGS. 7 to 10 and FIG. 13 and the flow chart shown in FIG. 22 to be later described. CPU 2626 executes these control programs. The control programs corresponding to flow charts shown in FIGS. 21, 23, 27, 29 and 30 to be executed by PC 103 and image contents, data and the like shown in FIGS. 24, 25, 26, 28, 31 and 32, respectively to be later described may be stored in an unrepresented storage medium such as a floppy disk, a hard disk and a CD-ROM and supplied to PC 103.

Figure 21:
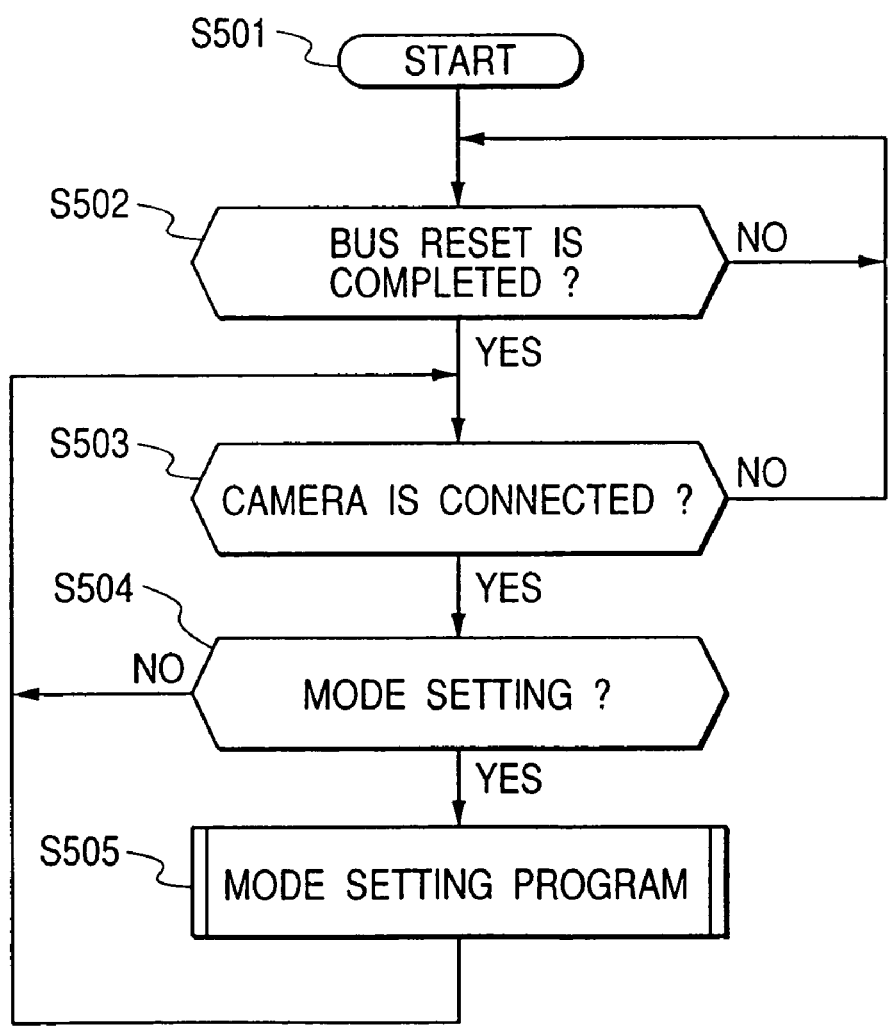
FIG. 21 is a flow chart illustrating processes up to a start of a mode setting program execution by PC shown in FIG. 20.

When a 1394 cable C is connected, the video camera 2600 and PC 103 judge whether a mode setting operation is to be performed or not. Specifically, on the PC 103 side, as shown in FIG. 21, when a routine starts at Step S501, it is checked at Step S502 whether a 1394 cable C is connected. This check is performed by detecting an occurrence of a bus reset.

If a bus reset does not occur, the routine stands by without performing any operation, whereas if there is an occurrence of a bus reset, it is judged at Step S503 whether the video camera 2600 is connected to the 1394 cable C. This judgement whether the video camera 2600 is connected or not, is performed for example by checking the 64-bit address read from the address space of the 1394 serial bus of the video camera 2600.

If it is judged at Step S503 that the video camera 2600 to be controlled is not connected, the routine returns to Step S502. If it is judged that the video camera 2600 to be controlled is connected, it is judged at Step S504 whether the video camera 2600 is ready for reception of a mode setting command from PC 103. This ready state for reception of the mode setting command corresponds to a manual setting mode or the like, as different from a tape reproduction mode of the video camera 2600, i.e., a camera mode, and other various auto modes.

If not in the ready state for reception of the mode setting command, the routine returns to Step S503 whereas it is checked whether the video camera 2600 to be controlled is still connected, to thereafter follow Step S504. If it is judged at Step S504 that the video camera 2600 is ready for reception of the mode setting command, a mode setting program is activated and a mode setting command is supplied from PC 103 to remotely control the video camera 2600.

Figure 22:
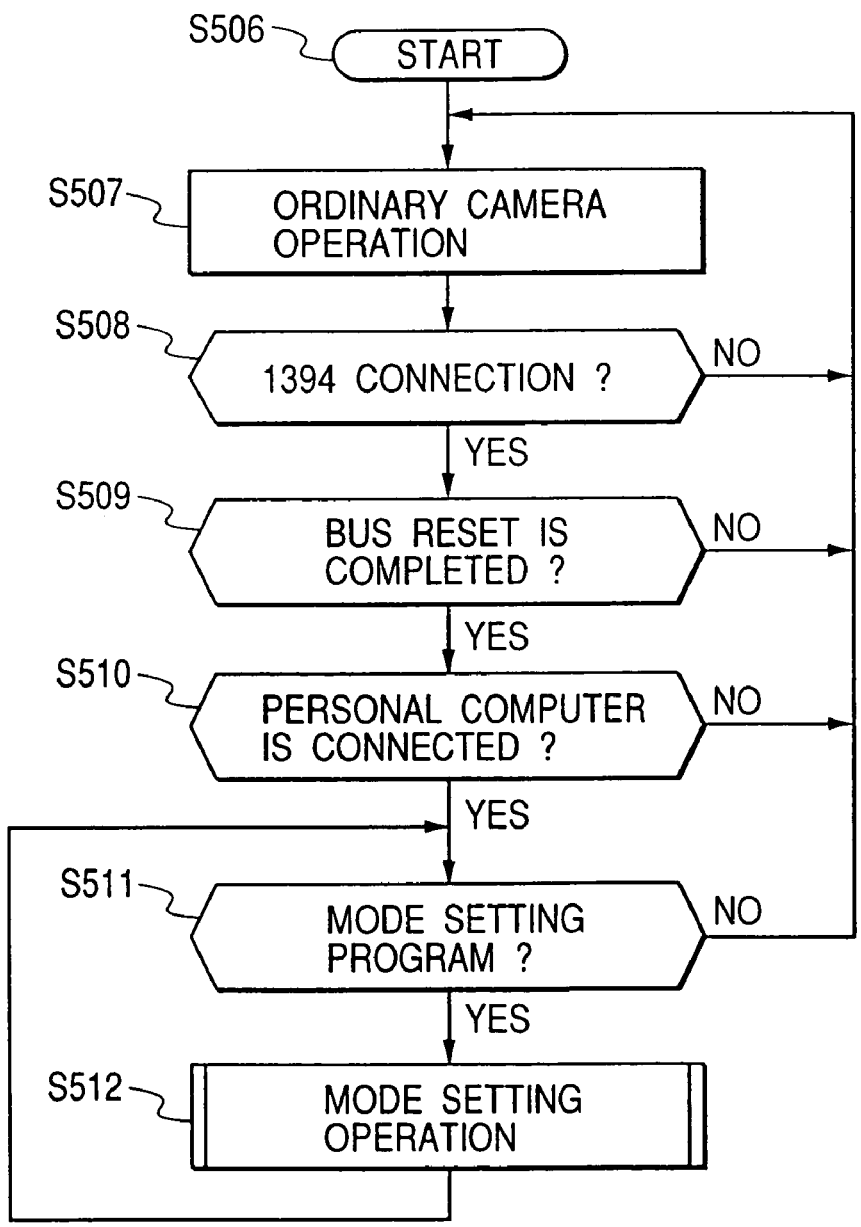
FIG. 22 is a flow chart illustrating processes up to a mode setting operation for the video camera shown in FIG. 20.

On the video camera 2600 side, as shown in the flow chart of FIG. 22, when a routine starts at Step S506, an ordinary camera operation starts at Step S507. The ordinary camera operation is performed under the conditions that the standard control data in the standard control data storage area 2621 is written in the control data storage area 2623 shown in FIG. 20.

While the ordinary camera operation is performed, CPU 2626 always monitors at Step S508 whether a 1394 cable C is connected. As a method of detecting a connection of the 1394 cable C, for example, a change in the bias voltage at the port is detected. If it is not judged at Step S508 that a 1394 cable C was connected, the routine returns to Step S507, whereas if it is judged that a 1394 cable C was connected, at Step S509 the routine stands by until the bus reset is completed, and at Step S510 it is checked whether the connection partner is PC 103. This check is performed for example by checking the 64-bit address read from the address space of the 1394 serial bus of the video camera, similar to that described with the PC 103 side operation.

If the connection partner is PC 103, it is checked at Step S511 whether the PC 103 side operates the mode setting program. This check is performed for example by reading information of the application layer shown in FIG. 3 or confirming Async data transferred between PC 103 and video camera. If it is confirmed at Step S512 that the PC 103 side operates the mode setting program, the routine advances to Step S512 whereat the control reference value and shutter speed are changed and the contents in the control data storage area 2623 are rewritten in accordance with the command from PC 103, to thereby perform the mode setting operation of the video camera 2600.

The video camera 2600 side judges whether the mode setting operation is executed in accordance with a command from PC 103, while the video camera 2600 sequentially executes each of judgement Steps S508 to S511. If any one of the judgement Steps is not satisfied, the ordinary camera operation continues to be executed without following the command from PC 103.

Figure 23:
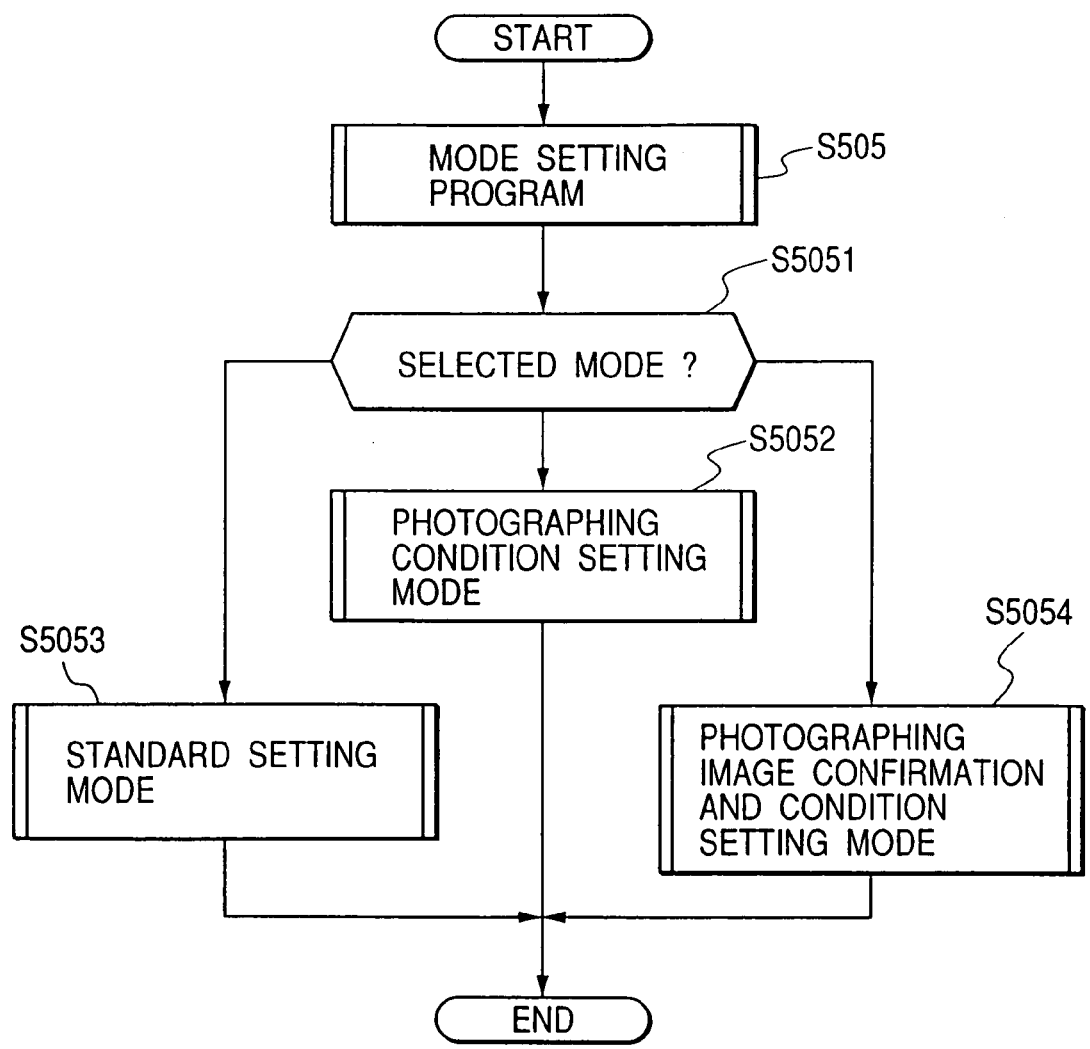
FIG. 23 is a flow chart illustrating the outline of a mode setting program.

When the video camera 2600 executes the mode setting operation in accordance with the command from PC 103, it is necessary for PC 103 to execute the mode setting program as described above. FIG. 23 is a flow chart illustrating the outline of a mode setting program (corresponding to Step S505 in FIG. 21) to be executed by PC 103.

First, at Step S5051 the type of a setting mode selected upon operation of an unrepresented mouse or keyboard is judged. In accordance with the selected setting mode, a program corresponding to one of a photographic condition setting mode at Step S5052, a standard setting mode at Step S5053 and a photographing image confirmation and condition setting mode at Step S5054 is executed.

The details of the photographic condition setting mode at Step S5052, standard setting mode at Step S5053 and photographing image confirmation and condition setting mode at Step S5054 will be given in this order.

Standard Setting Mode

In the standard setting mode, the contents of various photographing conditions for the video camera 2600 are stored in advance in PC 103, and when a typical photographing condition is selected by PC 103, the video camera 2600 is set so as to match the selected photographing condition by PC 103.

Figure 24:
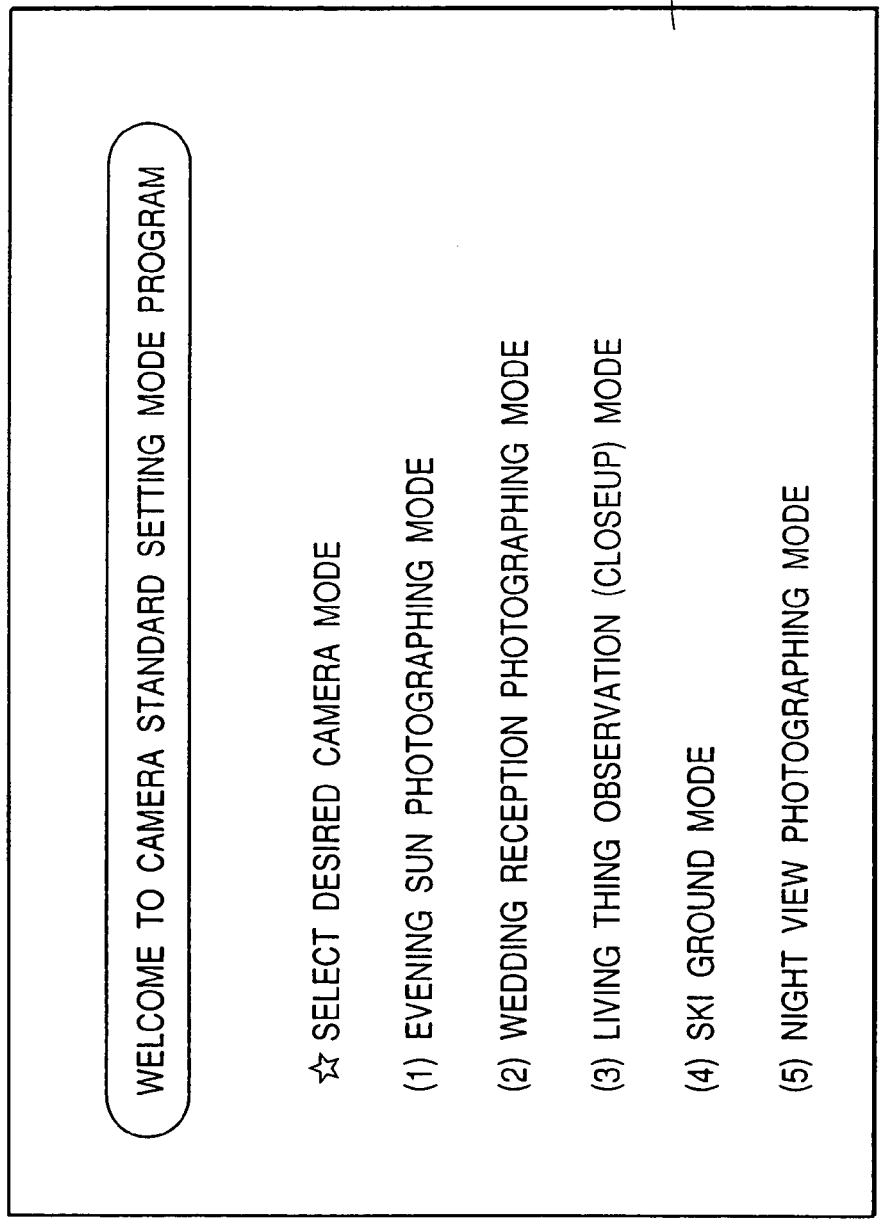
FIG. 24 is a diagram showing a mode selection menu screen.
Figure 25:
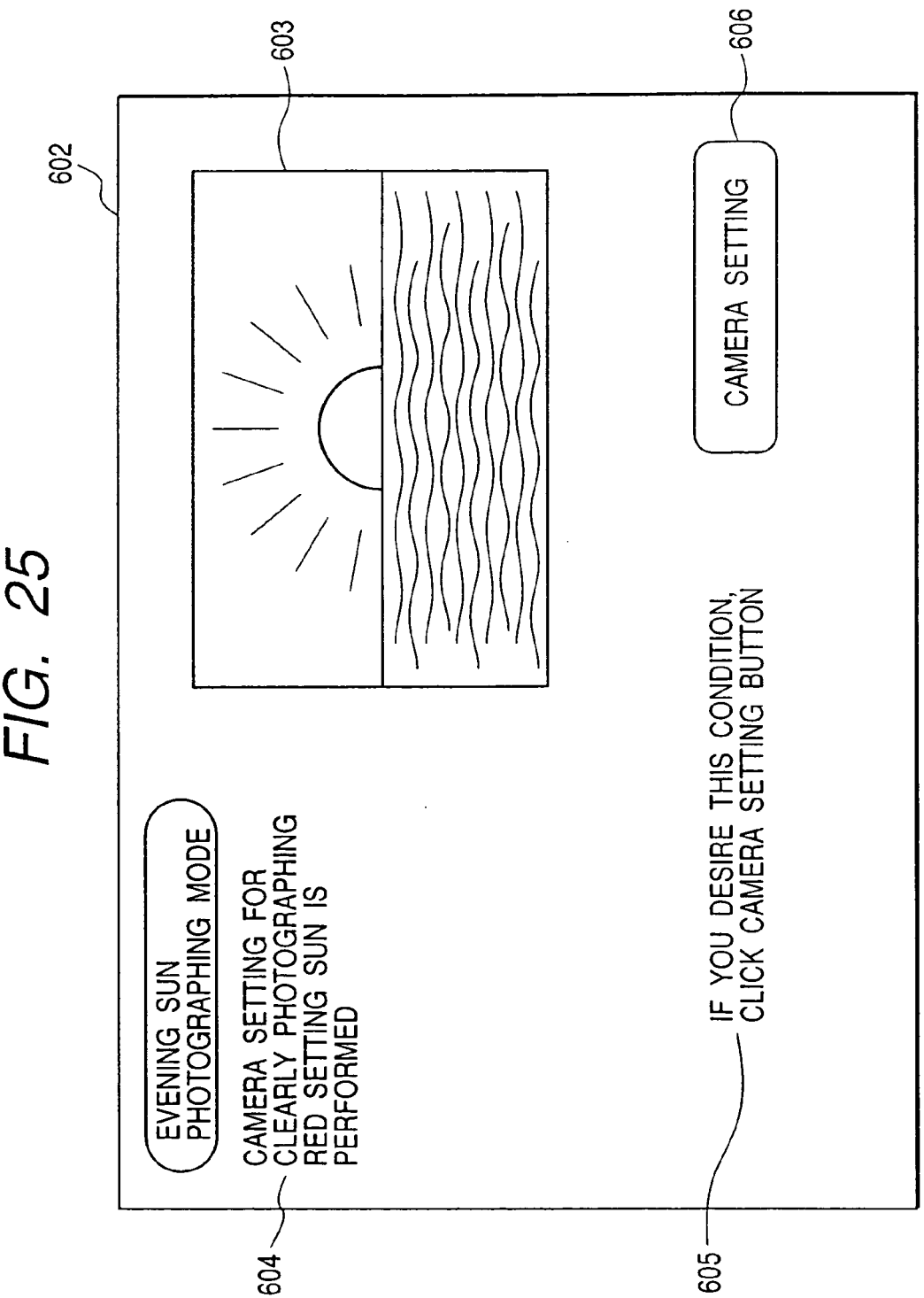
FIG. 25 is a diagram showing a PC screen when an evening sun photographing mode is selected.

When the standard setting mode is selected, a screen 601 shown in FIG. 24 is displayed on the monitor of PC 103. Several photographing scenes are displayed on the screen 601 which are difficult to be taken with a good image quality by using general automatic setting of the video camera 2600. If an evening sun photographing mode is selected with a mouse or the like, a display is changed to a screen 602 shown in FIG. 25. Displayed on this screen 602 are an example 603 of a photographed image of an evening sun, an explanation 604 of the evening sun photographing mode, a mode setting conformation message 605, and a camera setting button 606.

It is usual that setting sun is to be photographed reddish. However, with general automatic setting of the video camera 2600, the auto white balance function operates to suppress red color components and make whitish as much as possible. Therefore, a photographed image is less reddish and a good image like an evening sun cannot be photographed.

When the evening sun photographing mode is selected in the standard setting mode, for example, the levels of signals to be output from the R-Y and B-Y level control reference signal generators 2616 and 2617 shown in FIG. 20 are changed to the values preset in PC 103, so that an image emphasizing red is output from the video camera 2600. At the same time, in order not to make CCD 2600 saturated, a proper preset shutter speed and iris stop value are supplied from PC 103 to the video camera so that an evening sun can be taken more clearly. When an operator of PC 103 clicks the camera setting button 606 shown in FIG. 25, the above-described preset values are transferred from PC 103 to the video camera 2600 which in turn sets its values in accordance with the supplied preset values and stores the supplied preset values.

In the above description, although the white balance, shutter speed and iris stop value are used as the camera setting conditions for the evening sun photographing mode, other parameters such as those enumerated in FIG. 26 may be supplied from PC 103. For example, in a wedding reception photographing mode (refer to FIG. 24), in order to prevent the faces of a bride and bridegroom from becoming whitish, PC 103 controls the iris stop 2603 to be stopped down more or less.

In a living thing observation (closeup) mode (refer to FIG. 24), PC 103 can control to shorten a focal length and provide an optical condition allowing macro photographing. In a ski ground mode (refer to FIG. 24), in order to avoid light diffraction to be caused by an excessive stop down of the iris stop 2603 under high illuminance, PC 103 can control to suppress the iris stop amount to a predetermined value and set a high shutter speed. In a night view photographing mode (refer to FIG. 24), in order to photograph a good color of neon lights, PC 103 can control to set proper values of the iris stop, shutter speed and white balance.

Photographing Condition Setting Mode

Figure 27:
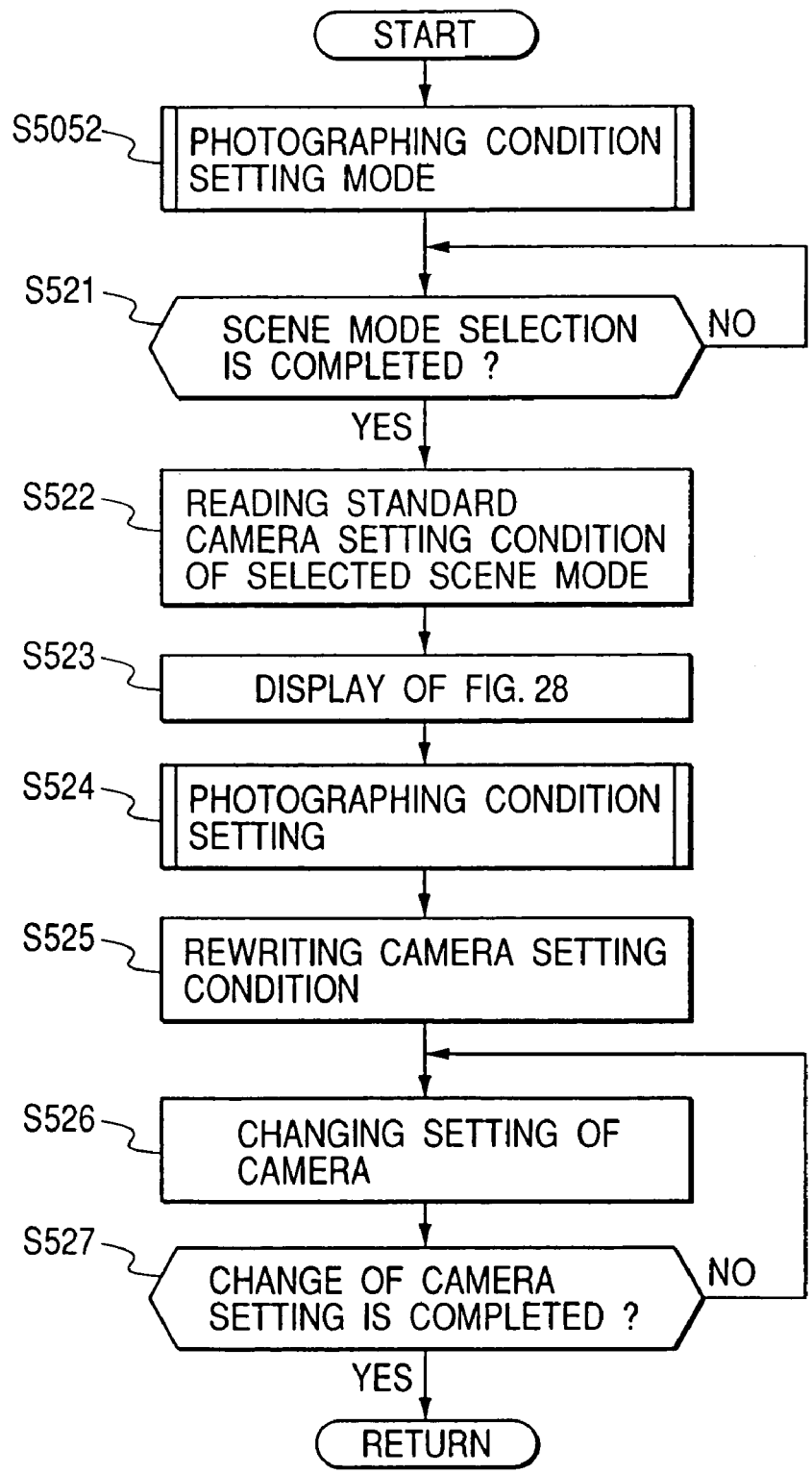
FIG. 27 is a flow chart illustrating processes to be executed in a photographing condition setting mode.

FIG. 27 is a flow chart illustrating the process of the photographing condition setting mode (Step S5052 in FIG. 23) to be executed by PC 103. As the process of the photographing condition setting mode starts, a mode selection screen similar to that shown in FIG. 24 is displayed on the monitor of PC 103, and an operator selects a desired scene. PC 103 stands by until the operator selects a mode of a desired photographing scene (Step S521). After the scene mode is selected, the standard camera setting condition of the selected scene mode is read from the memory of PC 103. Assuming that the operator selects the evening sun photographing mode, the standard camera setting condition read at Step S522 is the same as that selected in the standard setting mode described previously.

Figure 28:
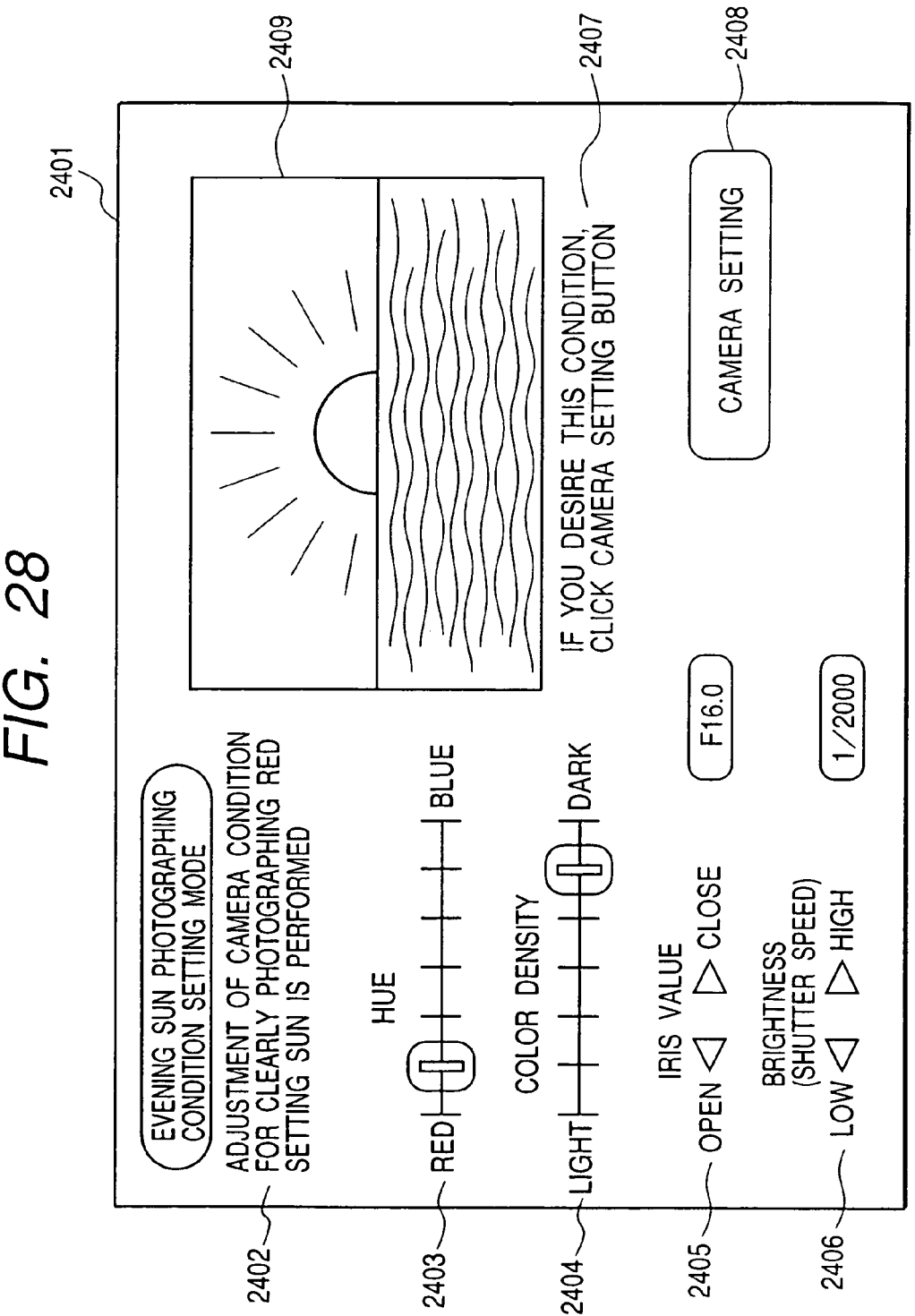
FIG. 28 is a diagram showing a PC screen when an evening sun photographing condition setting mode is executed.

Next, at Step S523 a screen 2401 shown in FIG. 28 is displayed on the monitor of PC 103. Displayed on this screen 2401 shown in FIG. 28 are a mode explanation 2402, an example 2409 of a photographed evening sun, a hue adjustment tab 2403, a color density tab 2404, an iris stop value adjustment tab and iris stop value display 2405, a shutter speed adjustment tab and shutter speed display 2406, a next operation explanation 2407, and a camera setting button 2408.

Figure 29:
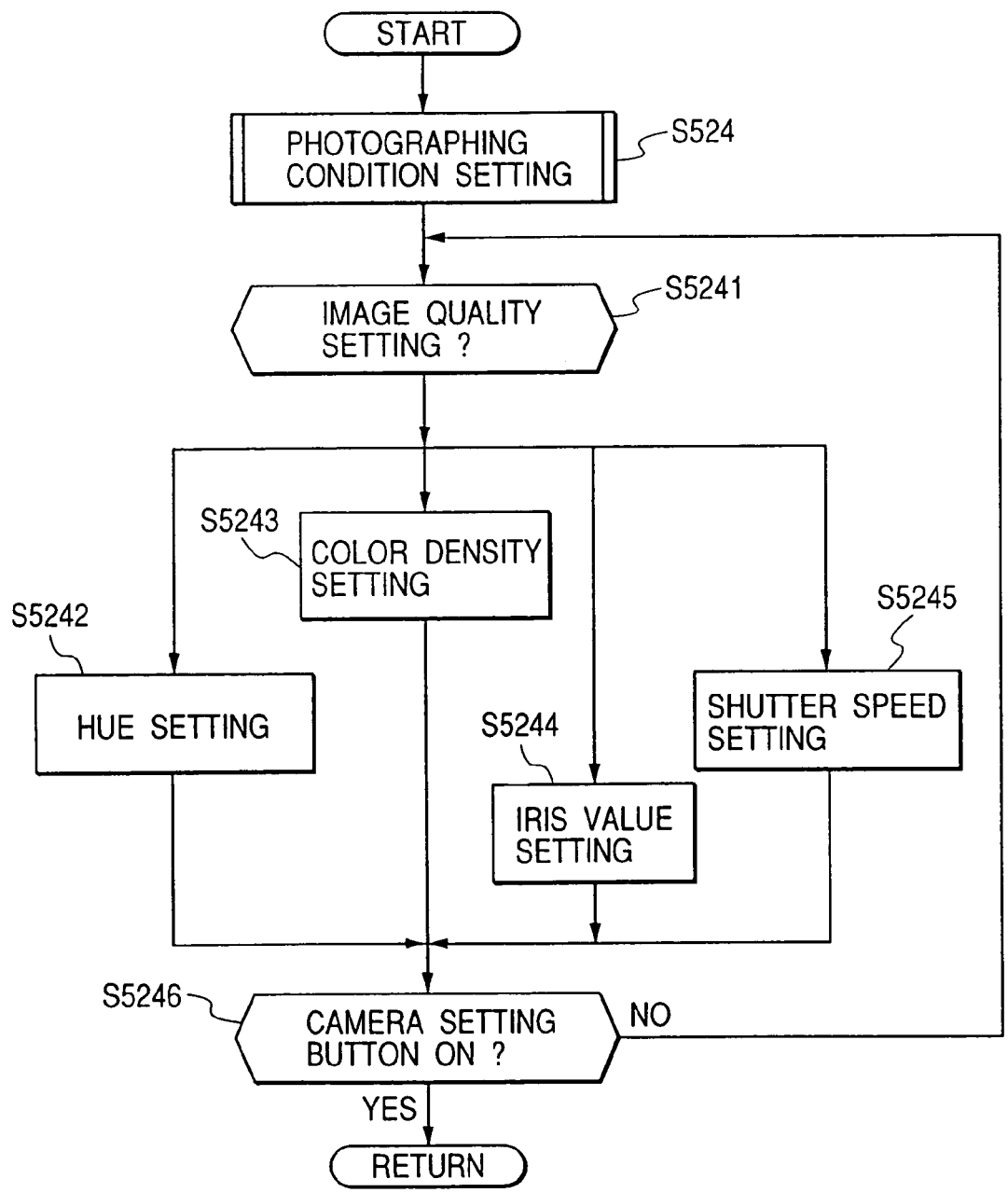
FIG. 29 is a flow chart illustrating a photographing condition setting process.

In the photographing condition setting process at Step S524, the operator moves each adjustment tab with a mouse or the like to change the standard setting state of the video camera 2600 in accordance with a personal preference. FIG. 29 is a flow chart illustrating the details of the photographing setting process at Step S524 shown in FIG. 27.

As the process starts at Step S524 shown in FIG. 27, it is checked at Step S5241 shown in FIG. 29 which item the operator intends to change. More specifically, since each tab displayed at the cursor position of the mouse is operated upon, a coincidence between the cursor position of the mouse and the display position of each tab is detected. For example, if the mouse cursor on the hue adjustment tab 2403 is moved to the left while the right button of the mouse is clicked, the setting contents are changed at Step S5242 to emphasize red color, and at the same time the tab display is moved to the left as the mouse cursor moves.

Similar adjustment and setting contents change are performed at Steps S5243, S5244 and S5245 respectively for color density, iris stop value and shutter speed. It is checked at Step S5246 whether the camera setting button 2408 shown in FIG. 28 is clicked. If not, the routine returns to Step S5241 to accept the next adjustment. If the camera setting button 2408 is clicked, this routine is terminated.

As a series of adjustment operations is performed, the hue, color density, screen brightness and the like of the photographed example 2409 on the screen 2401 shown in FIG. 28 may be changed with a position of each tab to show an image to the operator. In this case, the operator can set the photographing conditions more conveniently and easily.

After the photographing conditions are set in the manner described above, the camera setting conditions are rewritten in PC 103 at Step S525 shown in FIG. 27. Next, at Step S526 PC 103 transfers the above-described various setting values to the video camera 2600 which rewrites the camera setting conditions on the video camera 2600 side. PC 103 checks at Step S527 whether the setting process on the video camera 2600 side is completed. If not, the routine returns to Step S526, whereas if completed, the routine is terminated.

As above, since the operator can adjust and change the standard setting of each photographing mode, the setting state of the video camera 2600 matching the operator's preference can be remotely supplied from PC 103.

Photographing Image Confirmation and Condition Setting Mode

Figure 30:
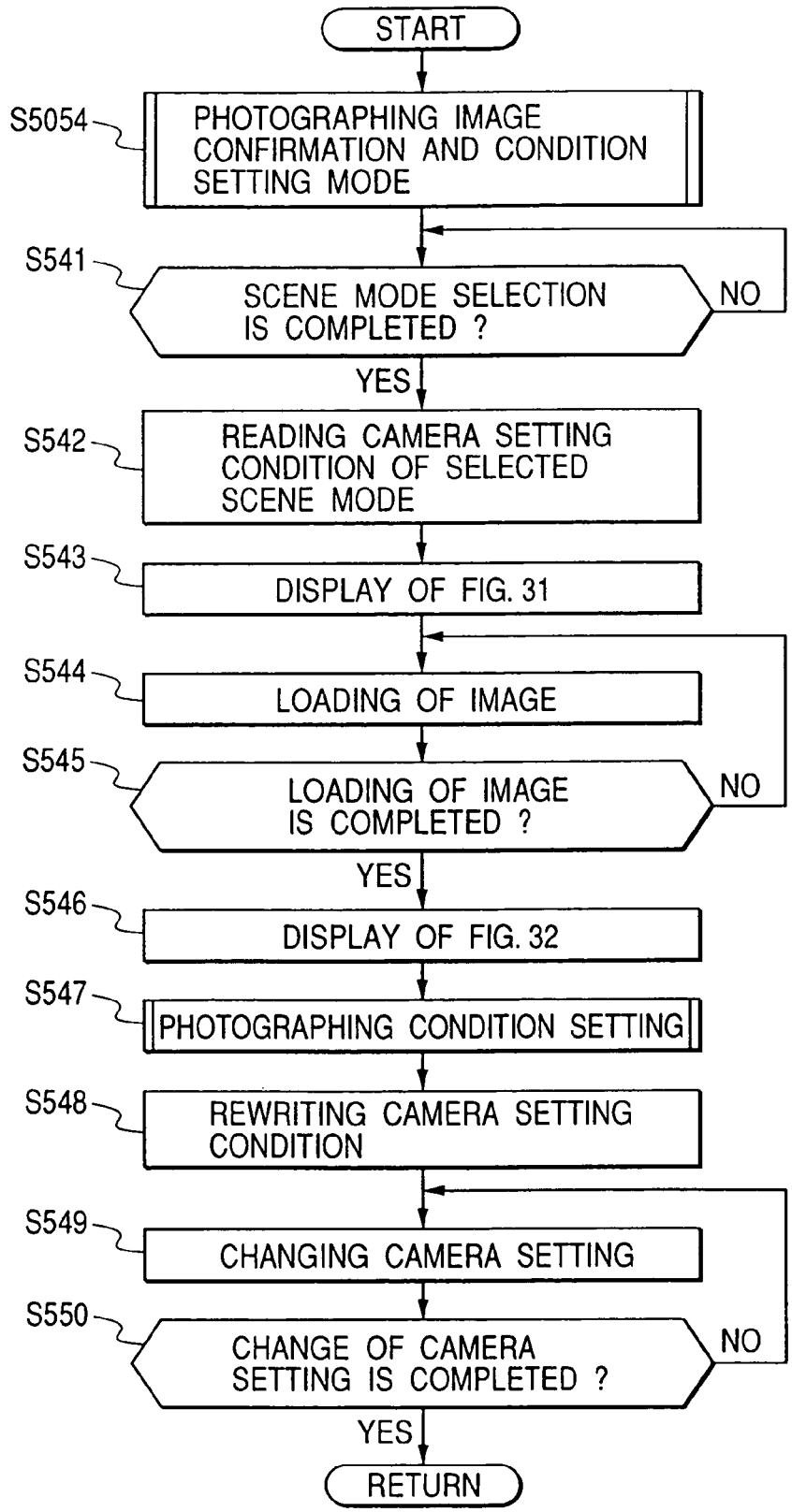
FIG. 30 is a flow chart illustrating processes to be executed in a photographing image confirming and condition setting mode.

FIG. 30 is a flow chart illustrating the details of the process of the photographing image confirmation and condition setting mode at Step S5054 shown in FIG. 23. As the process of the photographing image confirmation and condition setting mode starts, a screen similar to that shown in FIG. 24 is displayed on the monitor of PC 103. The operator selects a desired photographing scene. PC 103 stands by at Step S541 until the operator selects the photographing scene. After the scene mode is selected, at Step S542 the standard camera setting condition of the selected scene mode is read from the memory of PC 103. Assuming that the operator selects the evening sun photographing mode, the standard camera setting condition read at Step S542 is the same as that selected in the standard setting mode described previously.

Figure 31:
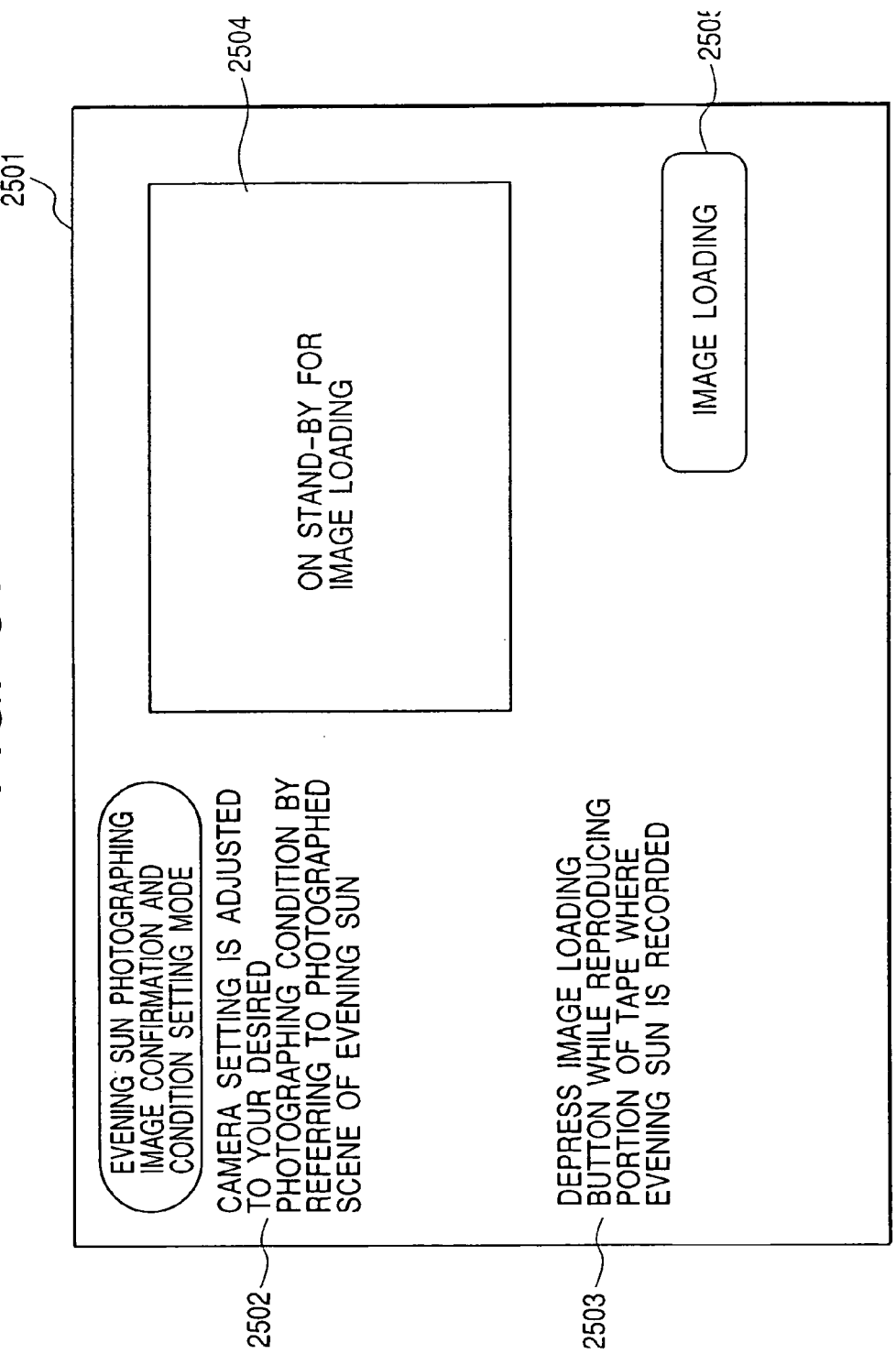
FIG. 31 is a diagram showing a PC screen during the photographing image confirming and condition setting mode.
Figure 32:
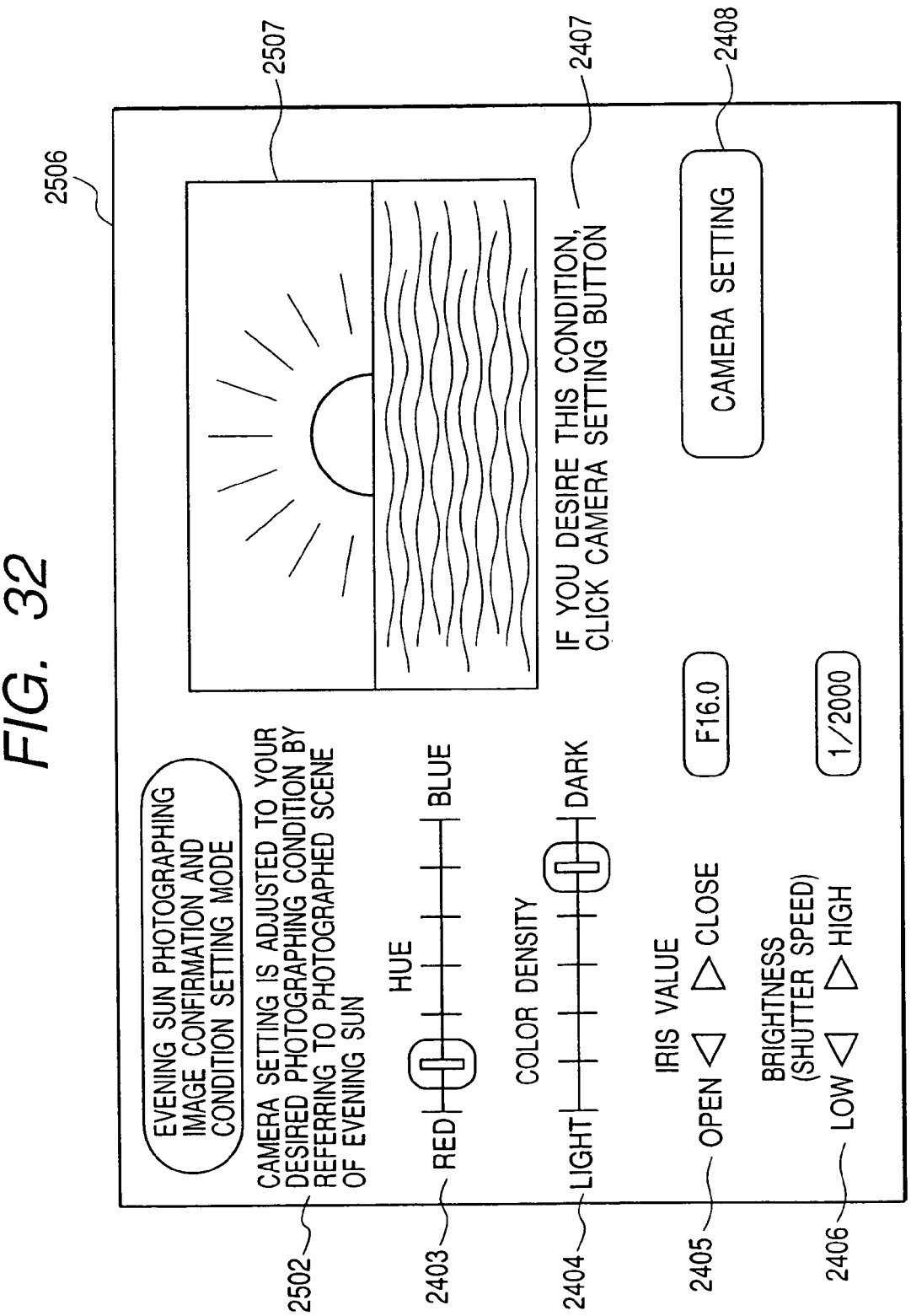
FIG. 32 is a diagram showing a PC screen when a camera is set during the photographing image confirming and condition setting mode.

Next, at Step S543 a screen 2501 shown in FIG. 31 is displayed on the monitor of PC 103. Displayed on this screen 2501 shown in FIG. 31 are a mode explanation 2502, an image loading display 2504, a next operation explanation 2503, and a camera image loading button 2505. In accordance with the display on the screen 2501, the operator searches and selects a proper sample image of a photographed evening sun, while reproducing a tape (not shown) of the video camera 2600. The searched and selected sample image is loaded in PC 103 at Step S544 when the camera loading button 2505 is clicked. Since it takes some time to load the reproduced image from the video camera, whether the image loading is completed is monitored at Step S545. If completed, the screen 2506 shown in FIG. 32 is displayed at Step S546.

Displayed on this screen 2506 are a mode explanation 2502, an image (i.e., an actually photographed evening sun image) 2507 loaded at Step S544, a hue adjustment tab 2403, a color density tab 2404, an iris stop value adjustment tab and iris stop value display 2405, a shutter speed adjustment tab and shutter speed display 2406, a next operation explanation 2407, and a camera setting button 2408.

In the photographing condition setting process at Step S547, the operator moves each adjustment tab with a mouse or the like to change the standard setting state of the video camera 2600 in accordance with a personal preference.

As a series of adjustment operations is performed, the hue, color density, screen brightness and the like of the photographed example 2409 on the screen 2401 shown in FIG. 28 may be changed with a position of each tab to show an image to the operator. In this case, the operator can set the photographing conditions more conveniently and easily.

After the photographing conditions are set in the manner described above, the camera setting conditions are rewritten in PC 103 at Step S548. This process becomes necessary when an image is again photographed under the photographing condition set at Step S547 and this photographing condition is desired to be changed again.

Next, at Step S549 PC 103 transfers the above-described various setting values to the video camera 2600 which rewrites the camera setting conditions on the video camera 2600 side. PC 103 checks at Step S550 whether the setting process on the video camera 2600 side is completed. If not, the routine returns to Step S549, whereas if completed, the routine is terminated.

As above, since the operator can adjust and change the standard setting of each photographing mode, by confirming the actually photographed image, the setting state of the video camera 2600 matching the operator's preference can be remotely supplied from PC 103.

As described above, according to the embodiment, the control contents heretofore fixedly set in a video camera can be changed remotely from PC 103. Since various camera control conditions for various subjects are stored in PC 103 without storing a large amount of control information in a video camera, PC 103 can set the video camera control condition matching a subject to be photographed. An operator of PC 103 can adjust the video camera control condition preset in PC 103 to provide the video camera control condition matching the operator's preference. If the actually photographed image is loaded in PC 103 when the operator adjusts the video camera control condition, an image to be photographed after adjustment can be simulated beforehand on PC 103.

MODIFICATION

The invention is not limited only to the above embodiment. For example, control data such as an iris stop value, shutter speed and white balance stored in PC for a specific photographing condition such as a night scene may be automatically transmitted to a video camera when a connection to the video camera is detected. The invention is also applicable to a video camera for photographing still images in addition to a video camera for photographing moving images.

If an image pickup apparatus and a printer are connected by a 1394 cable, a photographed image (reproduced image) having a definition corresponding to the printer performance (such as a resolution, print speed and full color/mono color) may be automatically transmitted to the printer by detecting the printer performance, or the photographed image may be automatically transmitted at a transmission speed matching the printer performance to print it out. In this case, information of the printer performance read from the printer information generation unit 24 may be positively transmitted from the printer to the image pickup apparatus or it may be transmitted from the printer in response to an inquiry from the image pickup apparatus.

As described so far, according to the invention, an image pickup control apparatus for controlling an image pickup apparatus via a data communications interface unit, comprises: storage means for storing control data for controlling the image pickup apparatus; connection detecting means for detecting a connection to the image pickup apparatus via the data communications interface unit; and transmission control means for transmitting the control data stored in the storage means to the image pickup apparatus when the connection detecting means detects a connection to the image pickup apparatus. Accordingly, the image pickup apparatus can be remotely and reliably controlled from another apparatus.

Many widely different embodiments of the present invention may be constructed without departing from the spirit and scope of the present invention. It should be understood that the present invention is not limited to the specific embodiments described in the specification, except as defined in the appended claims.

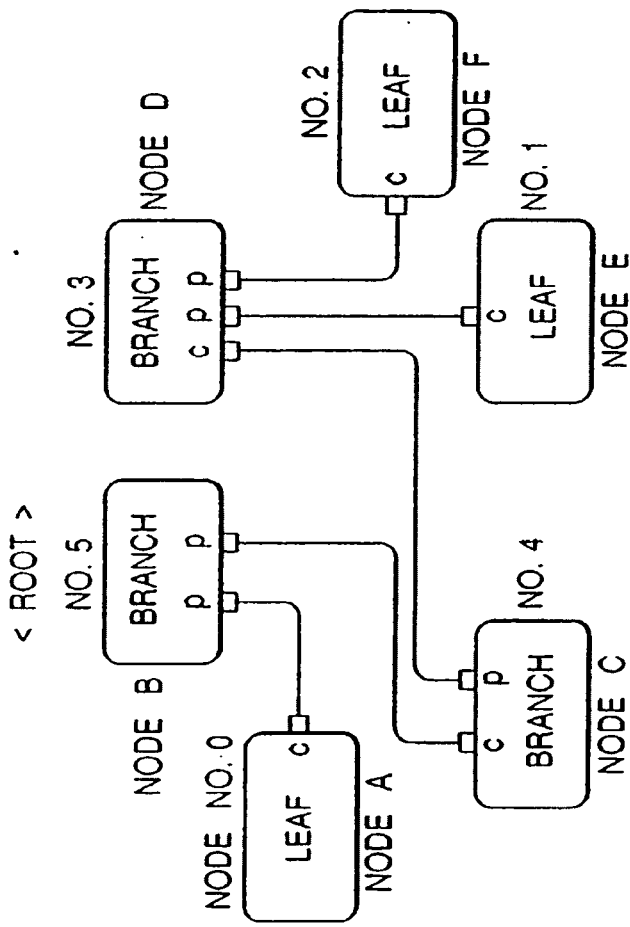

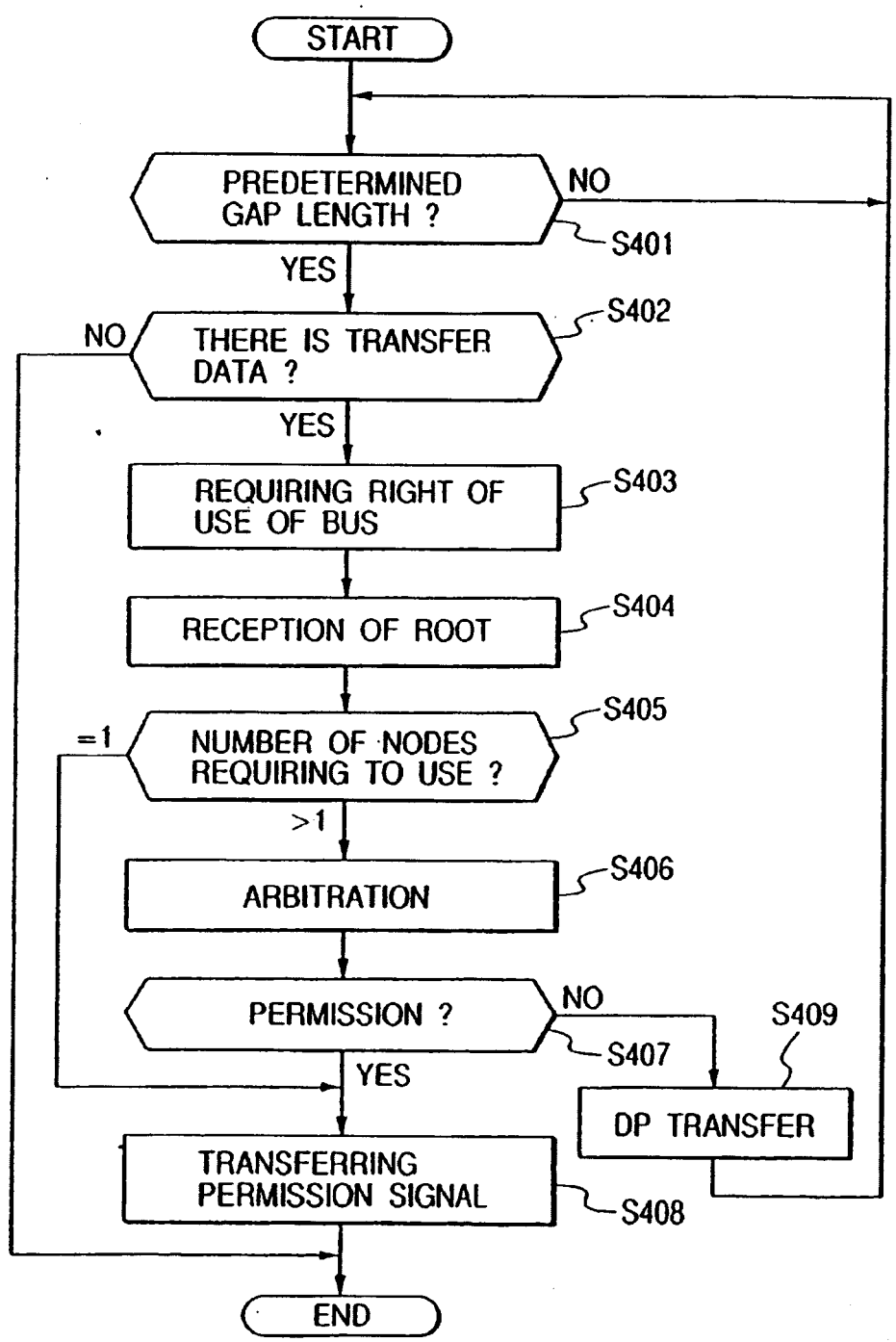

What is claimed is:

1. An image pickup control apparatus, for controlling an image pickup apparatus via a data communications interface unit, the image pickup control apparatus comprising:
   a connection detecting unit which detects a connection to the image pickup apparatus via the data communications interface unit;
   a setting unit which displays a plurality of photographing conditions with each of which a plurality of kinds of control data are associated, selects a desired photographing condition from among the plurality of displayed photographing conditions to display the plurality of kinds of control data associated with the selected photographing condition, and changes the plurality of kinds of control data in accordance with an input instruction;
   a control unit which is communicatively coupled to said connection detecting unit and said setting unit, wherein in a case that said connection detection unit detects the connection to the image pickup apparatus, said control unit effects control so as to transmit to the image pickup apparatus the plurality of kinds of control data changed by said setting unit;
   a display control unit which displays a model image corresponding to the control data for the desired photographing condition selected by said selection unit; and
   a change unit which changes the control data corresponding to the model image by referring to the model image displayed by said display control unit, wherein said control unit transmits the control data changed by said change unit to the image pickup apparatus.

2. An image pickup control apparatus according to claim 1, wherein said display control unit displays the model image corresponding to the control data changed by said change unit.

3. An image pickup control apparatus according to claim 1, further comprising a rewrite unit which changes the control data to the control data changed by said change unit.

4. An image pickup control method for controlling an image pickup apparatus via a data communications interface unit, the method comprising:
   a connection detecting step of detecting a connection to the image pickup apparatus via the data communications interface unit;

a setting step of displaying a plurality of stored photographing conditions each of which has a plurality of kinds of control data associated therewith, selecting a desired photographing condition from among the plurality of displayed photographing conditions to display the plurality of kinds of control data associated with the selected photographing condition, and changing the plurality of kinds of control data in accordance with an input instruction;

a control step of effecting control so as to transmit to the image pickup apparatus the plurality of kinds of control data changed in said setting step, in a case that said connection detecting step detects the connection to the image pickup apparatus;

a display control step of displaying a model image corresponding to the control data for the desired photographing condition selected in said selection step; and a change step of changing the control data corresponding to the model image by referring to the model image displayed in said display control step, wherein said control step transmits the control data changed in said change step to the image pickup apparatus.

5. An image pickup control method according to claim 4, wherein said display control step displays the model image corresponding to the control data changed in said change step.

6. An image pickup control method according to claim 4, further comprising a rewrite step of changing the control data to the control data changed in said change step.

7. A storage medium storing a control program for controlling an image pickup apparatus via a data communications interface unit, the program comprising:

a connection detecting routine of detecting a connection to the image pickup apparatus via the data communications interface unit;

a setting routine of displaying a plurality of photographing conditions with each of which a plurality of kinds of control data are associated, selecting a desired photographing condition from among the plurality of displayed photographing conditions to display the plurality of kinds of control data associated with the selected photographing condition, and changing the plurality of kinds of control data in accordance with an input instruction;

a control routine of effecting control so as to transmit to the image pickup apparatus a plurality of kinds of control data changed in said selection setting routine, in a case that said connection detecting routine detects the connection to the image pickup apparatus;

a display control routine of displaying a model image corresponding to the control data for the desired photographing condition selected in said selection routine; and a change routine of changing the control data corresponding to the model image by referring to the model image displayed in said display control routine, wherein said control routine transmits the control data changed in said change routine to the image pickup apparatus.

8. A storage medium according to claim 7, wherein said display control routine displays the model image corresponding to the control data changed in said change routine.

9. A storage medium according to claim 7, further comprising a rewrite routine of changing the control data to the control data changed in said change routine.

* * * * *

UNITED STATES PATENT AND TRADEMARK OFFICE
CERTIFICATE OF CORRECTION

| | |
|---|---|
| PATENT NO. | : 6,980,233 B1 |
| APPLICATION NO. | : 09/348500 |
| DATED | : December 27, 2005 |
| INVENTOR(S) | : Masahide Hirasawa |

It is certified that error appears in the above-identified patent and that said Letters Patent is hereby corrected as shown below:

IN THE DRAWINGS:

Delete drawing sheets 1-19 and 33, and subtitute therefor, drawing sheets 1-19 and 33. (Attached)

COLUMN 2:
Line 29, "PCes" should read --PCs--.
Line 33, "a" should be deleted.
Line 35, "is" should read --are--.

COLUMN 6:
Line 35, "cross sectional" should read --cross-sectional--.

COLUMN 9:
Line 30, "cross sectional" should read --cross-sectional--.

COLUMN 13:
Line 65, "IDes" should read --IDs--.

COLUMN 14:
Line 11, "IDes" (both occurrences) should read --IDs--.

COLUMN 16:
Line 11, "IDes" should read --IDs--.

UNITED STATES PATENT AND TRADEMARK OFFICE
CERTIFICATE OF CORRECTION

PATENT NO. : 6,980,233 B1
APPLICATION NO. : 09/348500
DATED : December 27, 2005
INVENTOR(S) : Masahide Hirasawa It is certified that error appears in the above-identified patent and that said Letters Patent is hereby corrected as shown below:

<u>COLUMN 26</u>:
Line 33, "are" should read --is--.

Signed and Sealed this

Seventeenth Day of October, 2006

JON W. DUDAS
*Director of the United States Patent and Trademark Office*

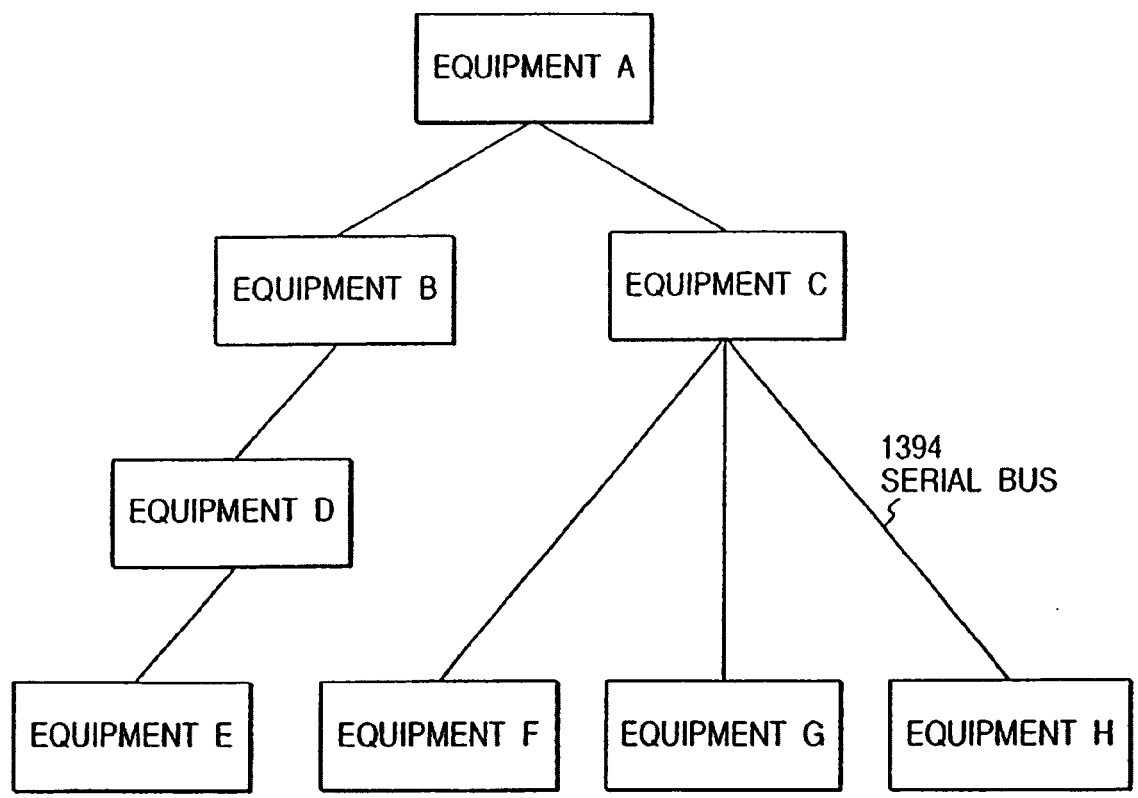

ELECTRIC POWER SUPPLY CONDUCTOR (8-40V MAX. DC CURRENT 1.5A)

TWO TWISTED PAIR SIGNAL CONDUCTORS

SIGNAL CONDUCTOR SHIELD (SIGNAL OF EXCLUSIVE OR BETWEEN Data AND Strobe)

FIG. 8
PRIOR ART

```
START
  ↓
BUS RESET ? ──NO──┐
  │ YES          │
  ↓              │
FL=LEAF  S202    │
  ↓              │
PORT CONFIRMATION  S203
  ↓              ↑
NUMBER OF UNDEFINED PORTS ?  S204
 =0 │  =1       │ >1
    │           │
    │    CHILD DECLARATION  S205
    │           │
FL=ROOT S208    │    FL=BRANCH  S206
    ↓           │       ↓
ROOT            │    PARENT
CONFIRMATION    │    ACCEPTANCE  S207
    S209        │
    ↓           ↓
         END
```

S201